(12) United States Patent
Taki et al.

(10) Patent No.: US 6,222,892 B1
(45) Date of Patent: *Apr. 24, 2001

(54) SYNCHRONIZATION MESSAGE RECEPTION PROCESSING APPARATUS

(75) Inventors: Yoshitaka Taki, Kawasaki; Kazuhiko Hata, Yokohama; Junji Yamamoto, Kawasaki, all of (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/828,891

(22) Filed: Mar. 31, 1997

(30) Foreign Application Priority Data

Oct. 4, 1996 (JP) ..................................... 8-264081

(51) Int. Cl.⁷ ................................. H04L 7/00; H04L 7/04
(52) U.S. Cl. ......................... 375/354; 375/356; 375/357; 375/362
(58) Field of Search .................................. 375/354, 357, 375/356, 362

(56) References Cited

U.S. PATENT DOCUMENTS

| | | |
|---|---|---|
| 5,136,617 | 8/1992 | Stenard . |
| 5,153,824 | 10/1992 | Lalanne et al. . |
| 5,734,687 * | 3/1998 | Kainulainen .................... 375/357 |

* cited by examiner

Primary Examiner—William Luther
(74) Attorney, Agent, or Firm—Staas & Halsey, LLP

(57) ABSTRACT

A synchronization message detecting unit detects a synchronization message from a line signal received from a line terminating unit. A synchronization message processing unit controls whether or not to select a clock reference received from the line as an active reference according to a quality level represented by the synchronization message. In this case, when an installed state detecting unit has determined that the synchronization message detecting unit has not been installed, the synchronization message processing unit does not select a clock reference corresponding to the synchronization message detected by the synchronization message detecting unit determined as a non-installed unit as the active reference.

17 Claims, 49 Drawing Sheets

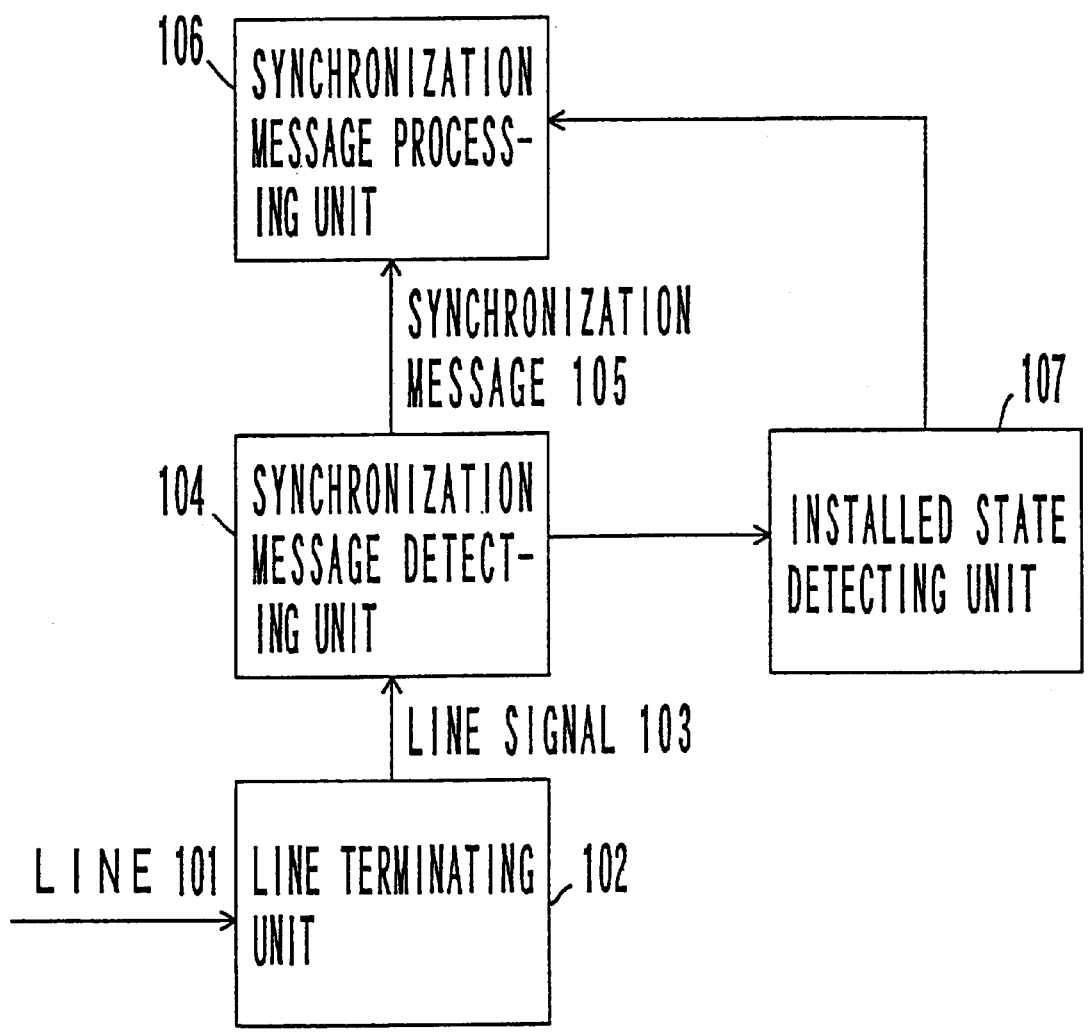
F I G. 1

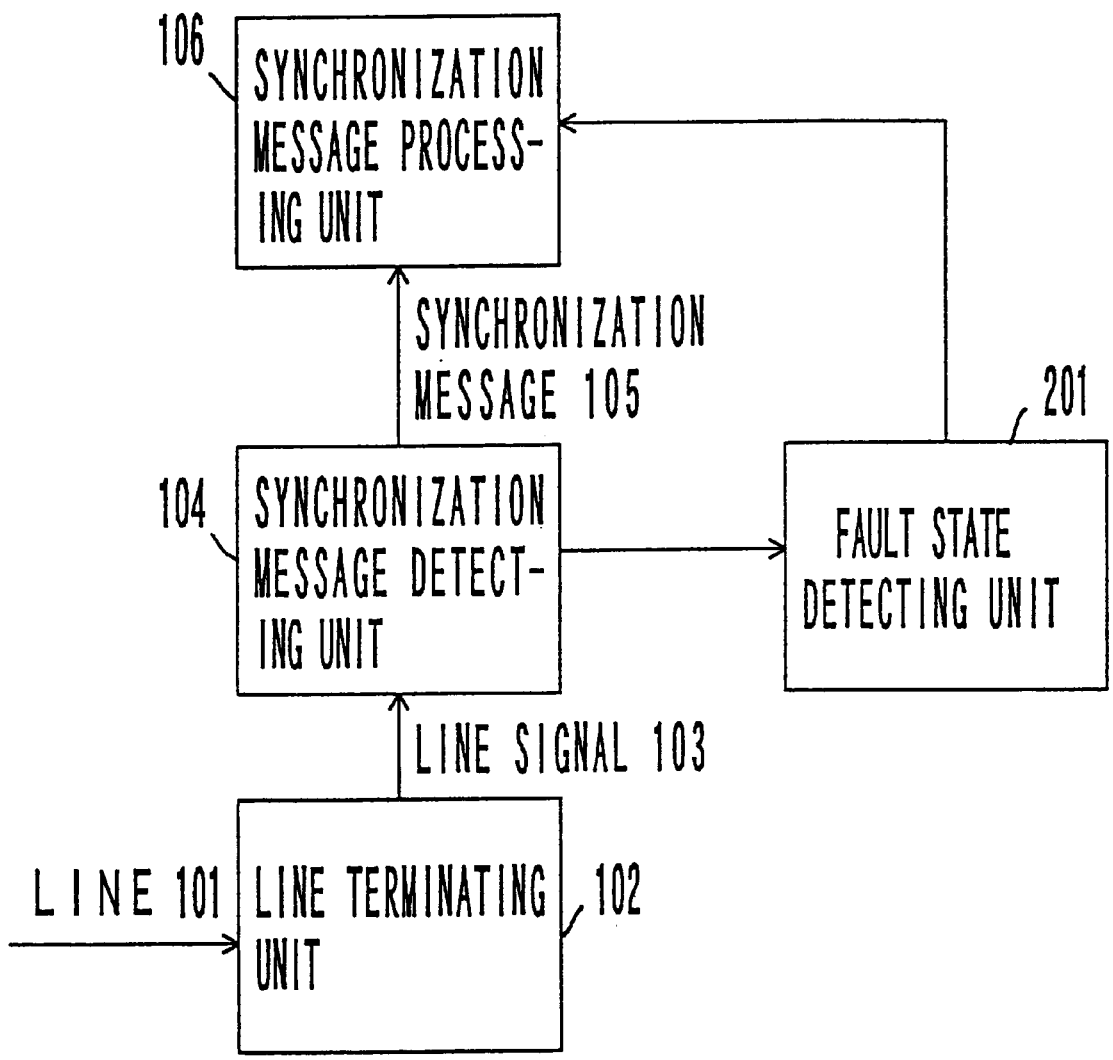
F I G. 2

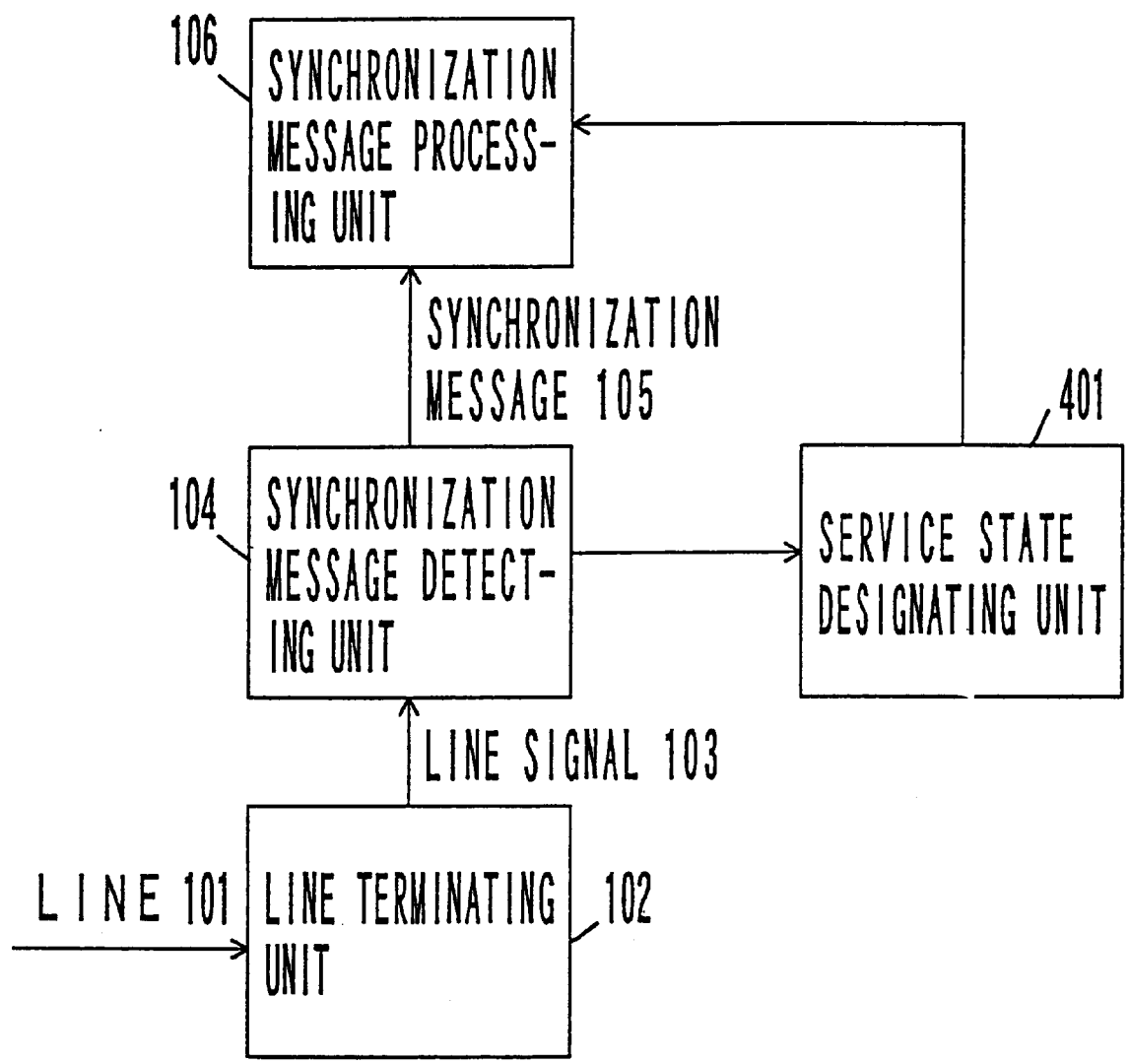
F I G. 4

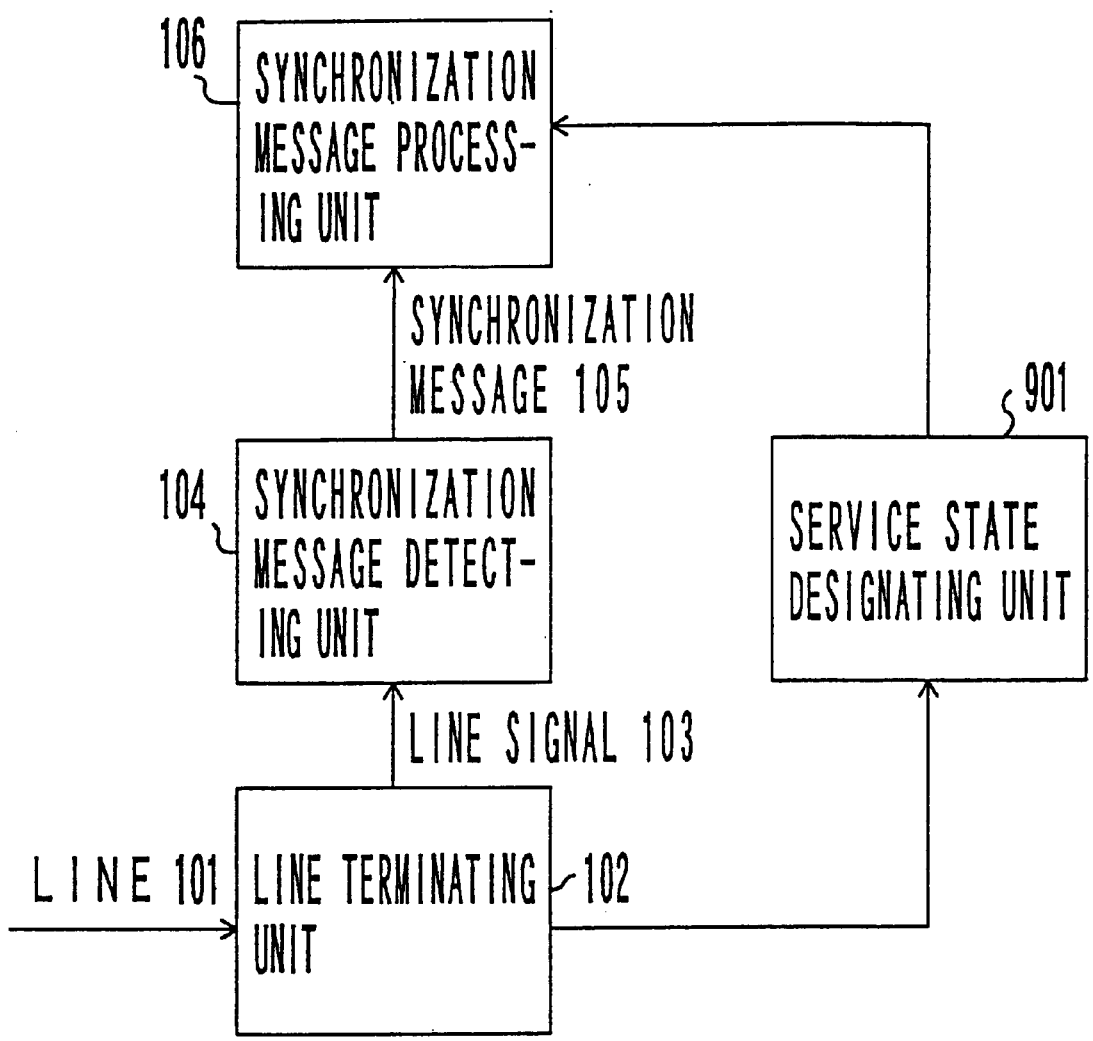
F I G. 9

| FRAME NO. | FRAME BIT | | | |
|---|---|---|---|---|
| | NO. | FPS | CRC | DL |
| 1 | 0 | - | - | X |
| 2 | 193 | - | C1 | - |
| 3 | 386 | - | - | X |
| 4 | 579 | 0 | - | - |
| 5 | 772 | - | - | X |
| 6 | 965 | - | C2 | - |
| 7 | 1158 | - | - | X |
| 8 | 1351 | 0 | - | - |
| 9 | 1544 | - | - | X |
| 10 | 1737 | - | C3 | X |
| 11 | 1930 | - | - | - |
| 12 | 2123 | 1 | - | X |
| 13 | 2316 | - | - | - |
| 14 | 2509 | - | C4 | X |
| 15 | 2702 | - | - | - |
| 16 | 2895 | 0 | - | X |
| 17 | 3088 | - | - | - |
| 18 | 3281 | - | C5 | X |
| 19 | 3474 | - | - | X |
| 20 | 3667 | 1 | - | - |
| 21 | 3860 | - | - | X |
| 22 | 4053 | - | C6 | - |
| 23 | 4246 | - | - | X |
| 24 | 4439 | 1 | - | - |

FRAMES ARE SENT IN THE ORDER OF FRAME 1.
FPS : Framing Pattern Sequence (...001011...)
CRC : Cyclic Redundancy check channel (bits C1 - C6)
DL : 4-kb/s Data Link   X IS DESIGNATED TO BE DL

FIG. 13

| Transport Overhead | | | | Path Overhead | |
|---|---|---|---|---|---|
| Section Overhead | Framing<br>A1 | Framing<br>A2 | Trace/Growth<br>(STS-ID)<br>J0/Z0[a] | Trace | J1 |
| | BIP-8<br>B1/Undefined[a] | Orderwire<br>E1/Undefined[a] | User<br>F1/Undefined[a] | BIP-8 | B3 |
| | Data Com<br>D1/Undefined[a] | Data Com<br>D2/Undefined[a] | Data Com<br>D3/Undefined[a] | Signal Label | C2 |
| Line Overhead | Pointer<br>H1 | Pointer<br>H2 | Pointer Action<br>H3 | Path Status | G1 |
| | BIP-8<br>B2 | APS<br>K1 | APS<br>K2 | User Channel | F2 |
| | Data Com<br>D4/Undefined[a] | Data Com<br>D5/Undefined[a] | Data Com<br>D6/Undefined[a] | Indicator | H4 |
| | Data Com<br>D7/Undefined[a] | Data Com<br>D8/Undefined[a] | Data Com<br>D9/Undefined[a] | Growth | Z3 |
| | Data Com<br>D10/Undefined[a] | Data Com<br>D11/Undefined[a] | Data Com<br>D12/Undefined[a] | Growth | Z4 |
| | Sync Status/<br>Growth<br>S1/Z1[a] | REI-L[b]/Growth<br>M0 or M1/Z2[a] | Orderwire<br>E2/Undefined[a] | Tandem<br>Connection | Z5 |

FIG. 15

| CONTENTS OF QUALITY LEVEL | ABBREVIATION | QUALITY LEVEL | DS1 ESF DATA LINK | S1 BYTE |
|---|---|---|---|---|
| Stratum 1 Traceable | PRS | 1 | 00000100011111111 | 0001 |
| Synchronization-Traceable Unknown | STU | 2 | 00001000011111111 | 0000 |
| Stratum 2 Traceable | ST2 | 3 | 00001100011111111 | 0111 |
| Stratum 3 Traceable | ST3 | 4 | 00010000011111111 | 1010 |
| +-20ppm Clock Traceable | SIC | 5 | 00100101011111111 | 1100 |
| Stratum 4 Traceable | ST4 | 6 | 00101000011111111 | — |
| Don't Use for Synchronization | DUS | 7 | 00110000011111111 | 1111 |
| Network Provider Specific Synchronization | RES | USER ASSIGNED | 01000000011111111 | 1110 |

FIG. 16

DS1 ESF DATA LINK IS SENT FROM RIGHT SIDE BITS.
S1 BYTE IS SENT FROM LEFT SIDE BITS.

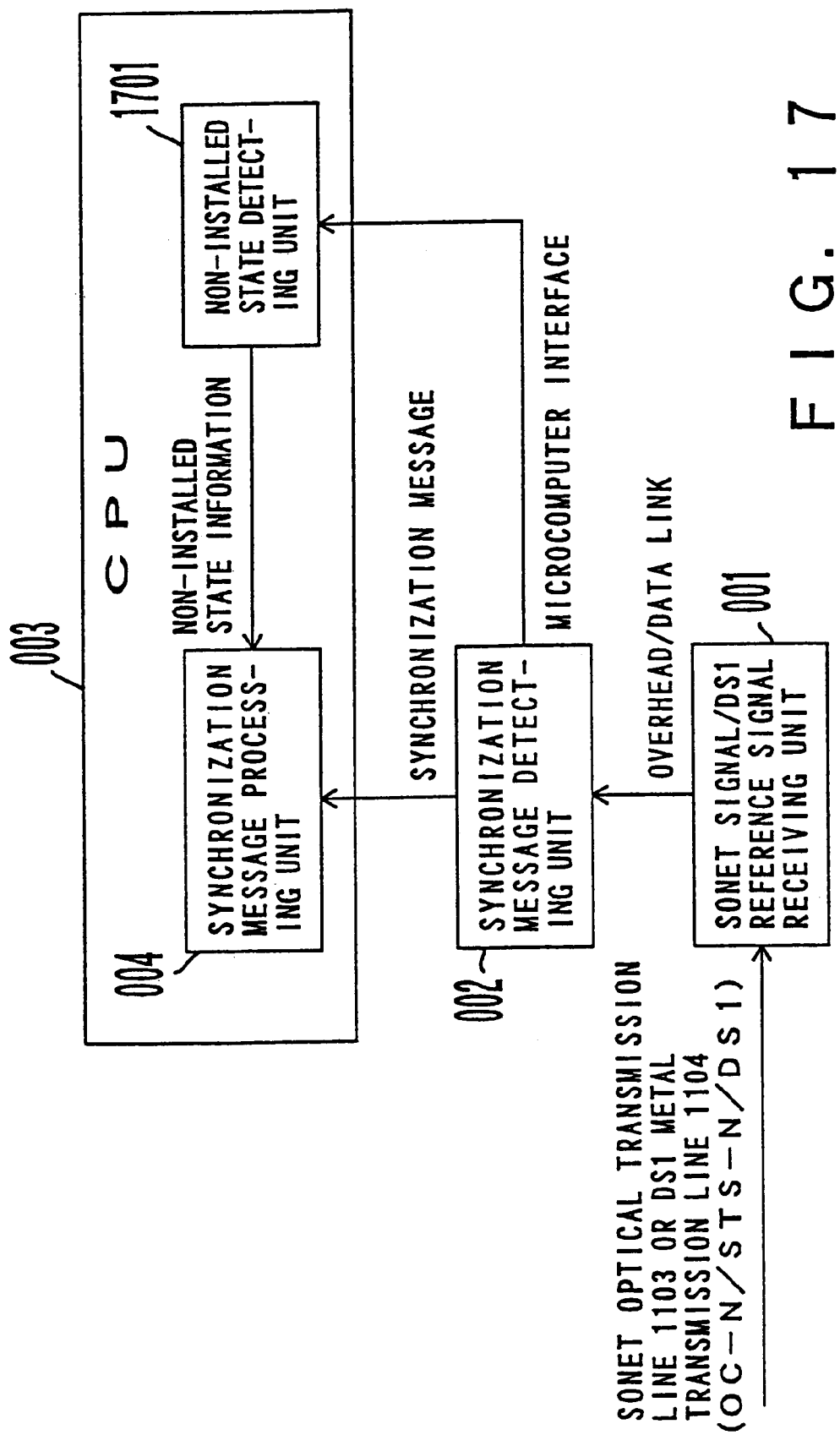

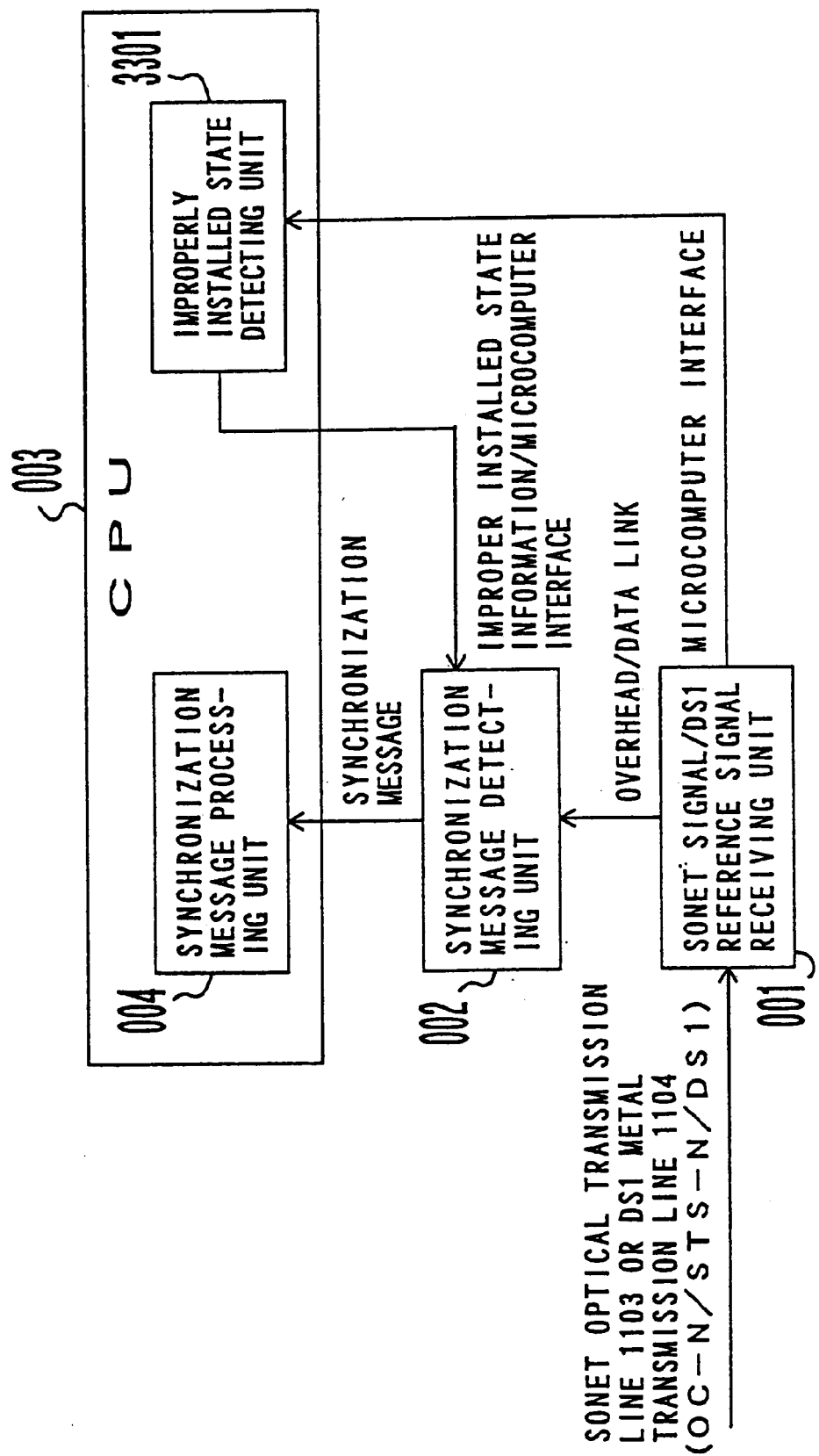
F I G. 33

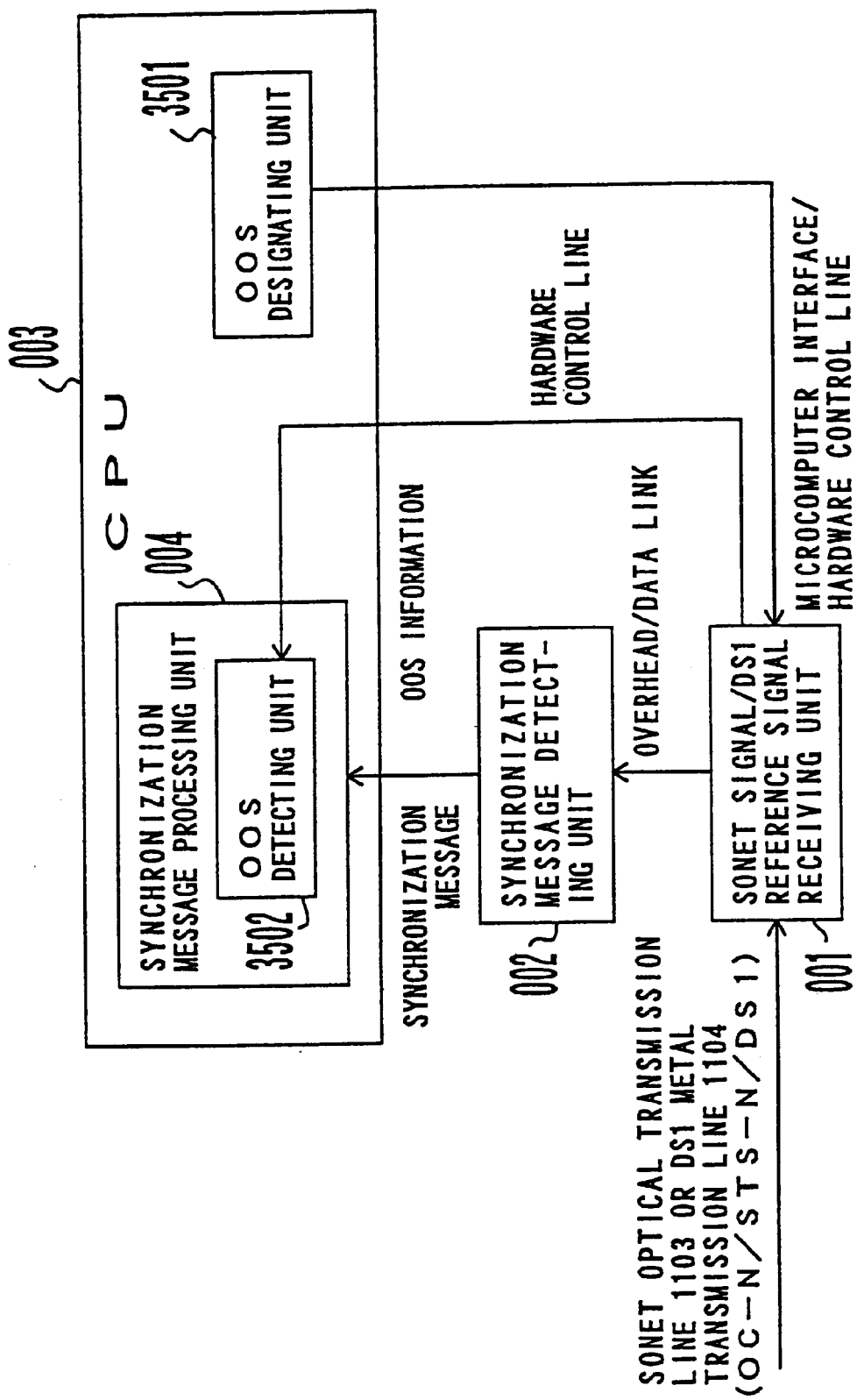
F I G. 35

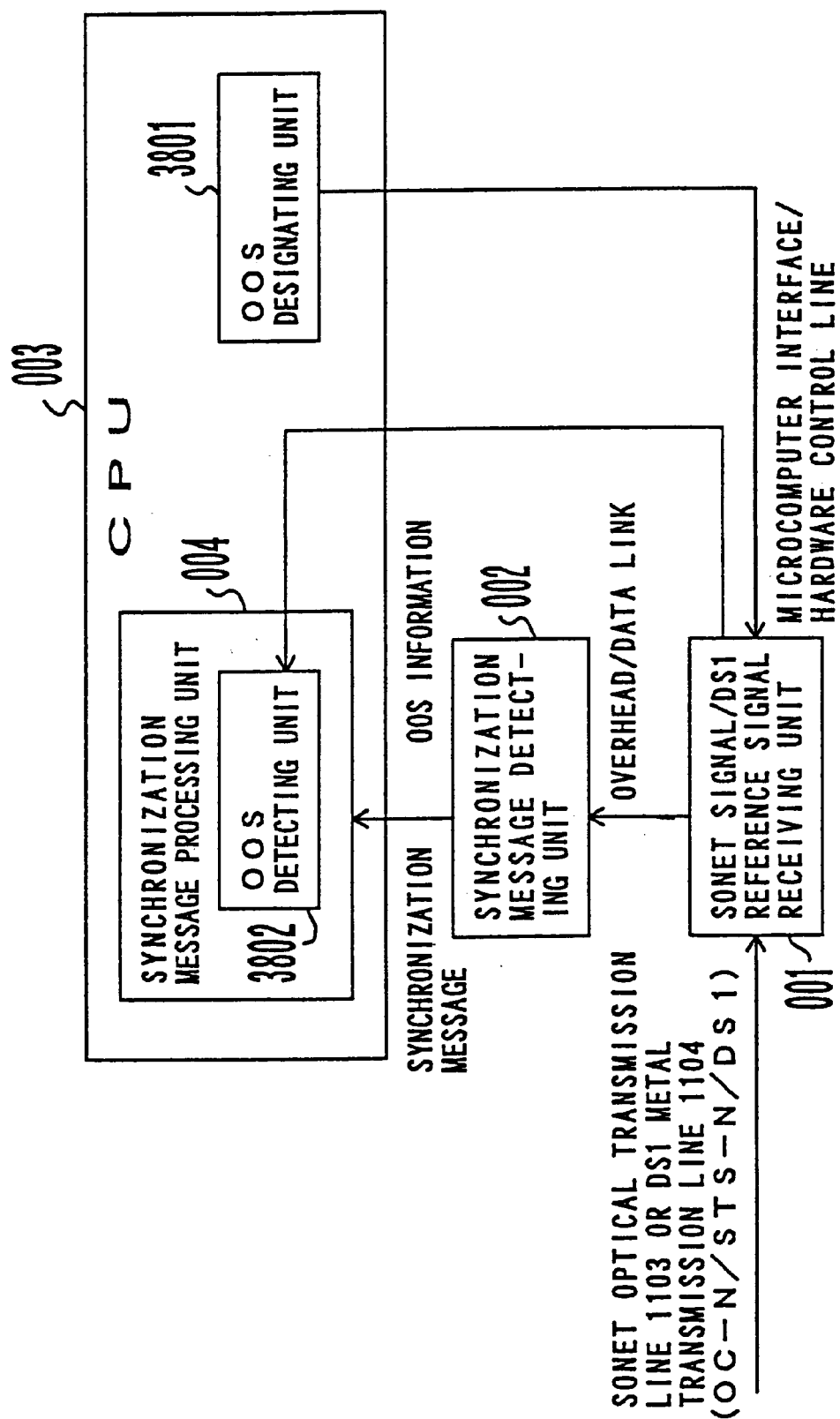
F I G. 38

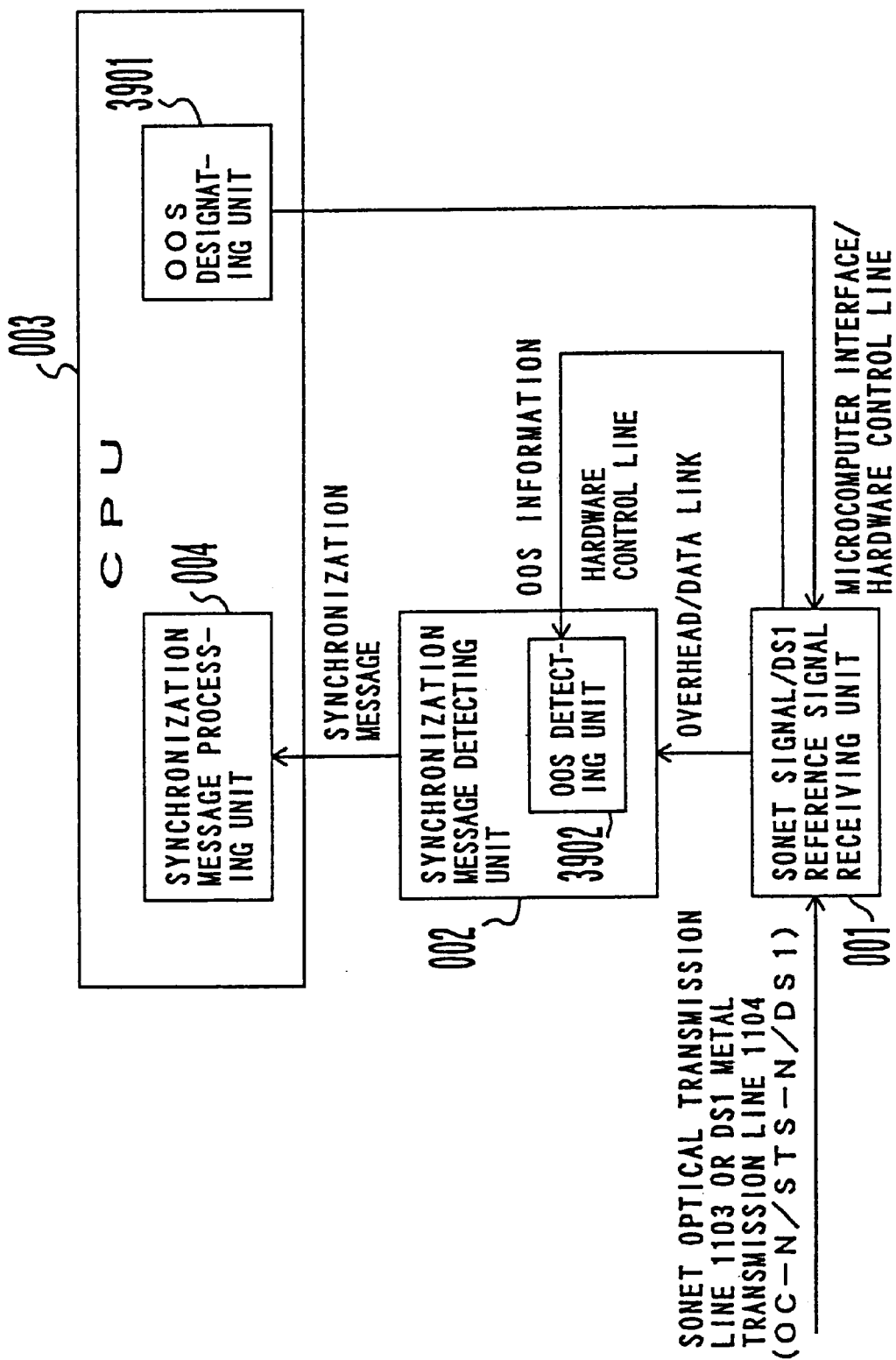
F I G. 3 9

| PRIORITY LEVEL | REFERENCE |
|---|---|
| 1 | BITS INPUT PRIMARY |
| 2 | BITS INPUT SECONDARY |
| 3 | GROUP #1 WORK LINE |
| 4 | GROUP #1 PROTECTION LINE |
| 5 | GROUP #2 WORK LINE |
| 6 | GROUP #2 PROTECTION LINE |
| 7 | HOLD OVER CLOCK |

F I G. 4 6

SYNCHRONIZATION MESSAGE RECEPTION PROCESSING APPARATUS

BACKGROUND OF THE INVENTION

1. Field of the Invention

The present invention relates to a clock selecting technology for use with a synchronous network such as an optical communications network.

2. Description of the Related Art

In a particular network, clocks should be synchronized over the entire network. Such a network is referred to as a synchronous network.

As an example of such a synchronous network, there are transmission units which are interconnected with optical transmission lines corresponding to the SONET (Synchronous Optical Network) standard that is a United States synchronous network communication standard. Part of transmission units within the network are connected to exchanges directly or through repeating units.

In such a network environment, one clock generating unit supplies a high accuracy clock reference to transmission units in the network.

In recent years, synchronization messages that represent quality levels of various clock references supplied to transmission units, have been defined. Thus, each transmission unit is required to have a function for detecting, controlling, and sending such synchronization messages. The synchronization messages are sent as overhead information (control information) on the optical transmission lines or the like.

In this case, as a function for processing synchronization messages, each transmission unit is required to have a function for comparing synchronization messages received along with a plurality of clock references received from a plurality of transmission lines with which that transmission unit is terminated, so as to allow that transmission unit to synchronize with a clock reference having the highest quality level. In addition, each transmission unit is required to have a function for outputting a synchronization message corresponding to a quality level of a current clock reference as overhead information on a SONET optical transmission line with which the transmission unit is terminated. It is supposed that such functions will be widely used in the synchronous networks.

However, since a synchronization message is a new concept, in the conventional US synchronous network or the like, definitions with respect to transmission/reception of messages that represent quality levels of clock references such as synchronization messages and definitions with respect to switching of clock references according to reception of such messages, have not been made. In addition, definitions in the case that the quality of a clock reference of a received signal cannot be assured due to an occurrence of a fault of a system timing selecting unit, have not been made.

In the mode for processing a synchronization message, when a unit having the function for detecting the synchronization message from a received SONET signal or the like is non-installed, the synchronization message cannot be detected from the received signal. Thus, even if a remote station has sent a message that represents the prohibition of the use of the synchronization message as a clock reference to the local unit, the message cannot be detected. When the clock signal is used as a clock reference, a loop in which a clock with the same quality level is referenced in a particular region of the network take place. Thus, a clock with a higher quality level cannot be referenced. In other words, a timing loop may occur. This is a first problem of the conventional synchronous network.

Moreover, in the mode for processing a synchronization message, when a unit fault takes place in a unit that detects the synchronization message from a received SONET signal or the like, the synchronization message cannot be detected. Even if the synchronization message can be detected, its validity cannot be assured. Thus, even if a remote station has sent a message that represents the prohibition of the use of the synchronization message as a clock reference to the local unit, the synchronization message cannot be detected. When the clock signal is used as a clock reference, a timing loop may take place. This is a second problem of the conventional synchronous network and the like. A unit fault means a state in which a unit does not operate. Examples of a unit fault are the states in which an oscillator of a unit stops outputting a signal, an output signal stops, and an LSI becomes defective.

When a unit that does not have the function for detecting a synchronization message is installed instead of a unit that has the function for detecting a synchronization message (namely, an improper unit is installed), the synchronization message cannot be detected. Thus, even if a remote station has sent a message that represents the prohibition of the use of the synchronization message as a clock reference to the local unit, the synchronization message cannot be detected from the received signal. When the clock signal is used as a clock reference, a timing loop may take place. This is a third problem of the conventional synchronous network.

In the mode for processing a synchronization message, a unit that has a function for detecting a synchronization message from the SONET signal or the like, may be in a so-called out-of-service state (OOS state). The OOS state of the unit is treated as a non-installed state of the unit. At this point, the unit does not detect various alarms. Thus, when a unit fault takes place in the OOS state of the unit, a unit fault alarm is not sent. In addition, the validity of a detected message is not assured. Thus, when such a message is used, a malfunction such as a timing loop may take place. This is a fourth problem of the conventional synchronous network.

In the mode for processing a synchronization message, when a unit that has a function for receiving a SONET signal or the like is non-installed, the signal cannot be received. Thus, even if a remote station has sent a message that represents the prohibition of the use of the corresponding clock signal as a clock reference to the local unit, the message cannot be detected. When the clock signal is used as a clock reference, a timing loop may take place. This is a fifth problem of the conventional synchronous network.

In the mode for processing a synchronization message, when a unit fault takes place in a unit that has a function for receiving a SONET signal or the like, overhead data that contain a synchronization message cannot be extracted from the received signal. Even if the overhead data can be extracted, the validity of the message detected by a synchronization message detecting unit corresponding to the extracted overhead data is not assured. Thus, even if a remote station has sent a message that represents the prohibition of the use of the signal as a clock reference, the message cannot be detected. When the signal is used as a clock reference, a timing loop may take place. This is a sixth problem of the conventional synchronous network.

When a unit that does not have a function for receiving a SONET signal or the like has been improperly installed instead of a unit that has a function for receiving a SONET signal or the like, (for example, a unit that has a function for receiving an STS-1 (Synchronous Transport Signal 1: 51.84

Mbps) has been installed instead of a unit that has a function for receiving an OC-3 (Optical Carrier 3: 155.52 Mbps)), even if the improperly installed unit receives a correct signal and can detect a synchronization message, the validity of the synchronization message detected from the received signal of an incorrectly structured network is not assured. Thus, even if the remote station has sent a message that represents the prohibition of the use of the signal as a clock reference, the message cannot be detected. Thus, when the signal is used as a clock reference, a timing loop may take place. This is a seventh problem of the conventional synchronous network.

In the mode for processing a synchronization message, a unit that has a function for receiving a SONET signal or the like may be in the OOS state. At this point, the unit does not detect various alarms. Thus, in the OOS state, when a unit fault takes place, a unit fault alarm is not sent. In addition, the validity of the detected overhead data is not assured. Thus, the validity of a message detected from the overhead data is not assured. Consequently, when such a message is directly used, a malfunction such as a timing loop may take place. This is an eighth problem of the conventional synchronous network.

In the mode for processing a synchronization message, a line through which a SONET signal or the like is received may be in the OOS state. At this point, various alarms are not detected from the line. Thus, when a line fault takes place in the OOS state, a line fault alarm is not sent. In addition, the validity of overhead data received from the line is not assured. Thus, the validity of a message detected from the overhead data is not assured. Consequently, when such a message is directly used, a malfunction such as a timing loop may take place. This is a ninth problem of the conventional synchronous network.

When the accuracy represented by a synchronization message detected from a received signal (SONET signal or the like) is lower than the accuracy of an internal clock of the transmission unit, normally, a clock reference detected from the received signal (SONET signal or the like) is not selected. However, if such a clock reference is mistakenly selected, even if there is a clock reference with a high quality level (namely, the internal clock in this case), the quality of the entire synchronous network may deteriorate. This is a tenth problem of the conventional synchronous network.

SUMMARY OF THE INVENTION

The present invention is made considering the above-described point of view. An object of the present invention is to allow a unit that detects a synchronization message to be restored to a normal state even if the unit becomes in a state in which it cannot correctly detect a synchronization message or a clock reference.

According to the present invention, a synchronization message detecting unit detects a synchronization message from a line signal received by a line terminating unit from a line. A synchronization message processing unit controls whether or not to select a clock reference received from the line as an active reference corresponding to a quality level represented by the synchronization message. In this case, when an installed state detecting unit has determined that the synchronization message detecting unit has not been installed, the synchronization message processing unit does not select a clock reference corresponding to the synchronization message detected by the synchronization message detecting unit determined as a non-installed unit as the active reference.

Thus, since a malfunction such as a timing loop can be prevented, the performance (stability and quality assurance) of the synchronous network can be improved.

BRIEF DESCRIPTION OF DRAWINGS

These and other objects, features and advantages of the present invention will become more apparent in light of the following detailed description of best mode preferred embodiments thereof, as illustrated in the accompanying drawings.

FIG. 1 is a block diagram of the present invention (No. 1);

FIG. 2 is a block diagram of the present invention (No. 2);

FIG. 4 is a block diagram of the present invention (No. 4);

FIG. 9 is a block diagram of the present invention (No. 9);

FIG. 13 is a schematic diagram showing a data format of DS1 frame bits;

FIG. 15 is a schematic diagram showing a data format of an overhead of SONET;

FIG. 16 is a schematic diagram showing the contents of quality levels;

FIG. 17 is a schematic diagram showing the structure of a first preferred embodiment;

FIG. 33 is a schematic diagram showing the structure of a seventeenth preferred embodiment;

FIG. 35 is a schematic diagram showing the structure of a nineteenth preferred embodiment;

FIG. 38 is a schematic diagram showing the structure of a twenty-second preferred embodiment;

FIG. 39 is a schematic diagram showing the structure of a twenty-third preferred embodiment;

FIG. 46 is a schematic diagram showing the structure of a source priority list according to each of the preferred embodiments;

DESCRIPTION OF THE PREFERRED EMBODIMENTS

Theoretical Description

Before explaining each preferred embodiment of the present invention, the theoretical structures of the present invention will be described.

Figure 11:
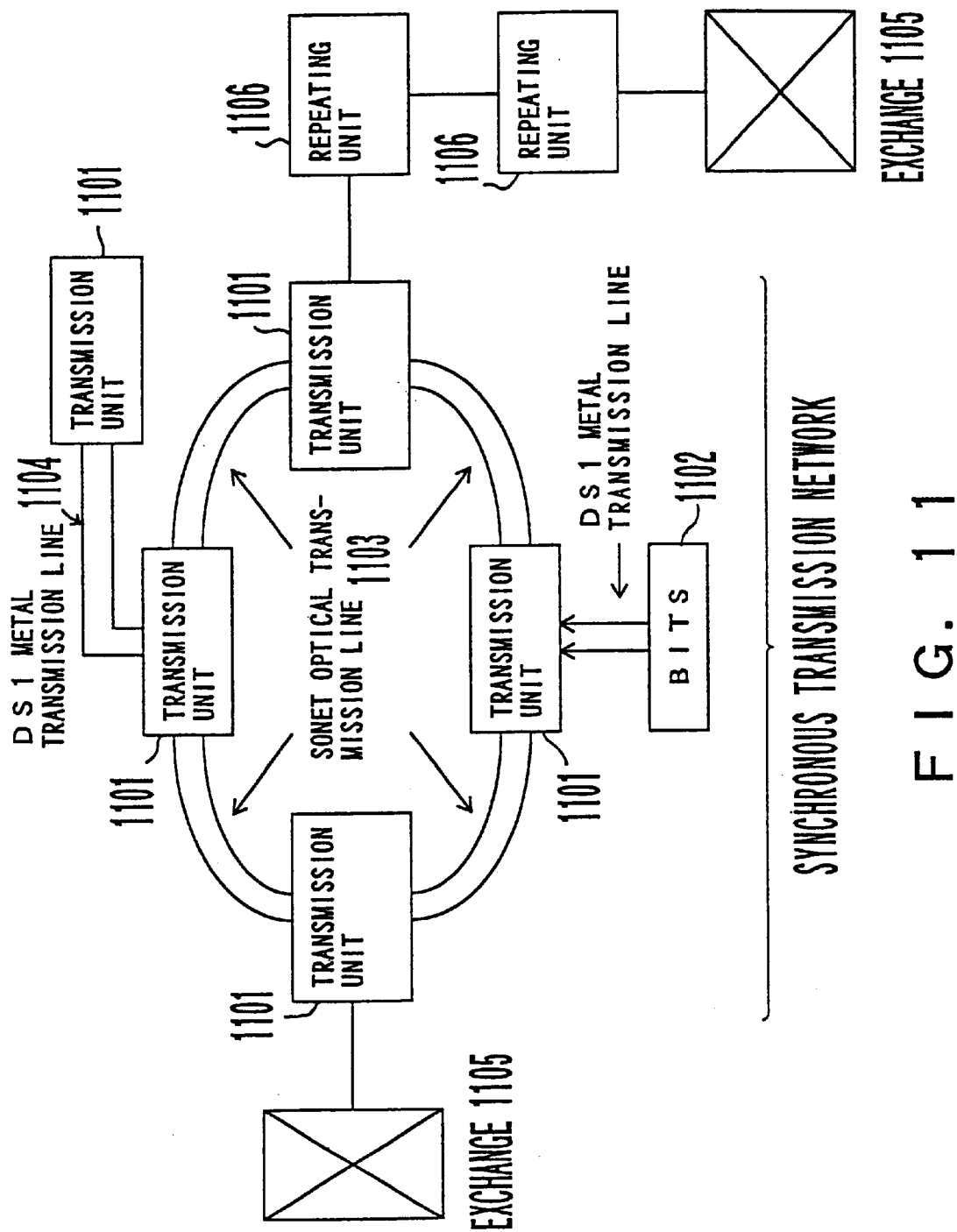
FIG. 11 is a schematic diagram showing the fundamental structure of a synchronous transmission network according to each of the preferred embodiments.

As a fundamental structure, the present invention is an apparatus, disposed in a transmission unit (a transmission unit 1101 as shown in FIG. 11) that composes a network, for selecting one of a plurality of clock references received by the transmission unit as an active reference for controlling the transmission unit, or an active reference for supplying a timing to an external unit connected to the transmission unit, corresponding to the quality level of each of the clock references sent with each of clock references.

Figure 3:
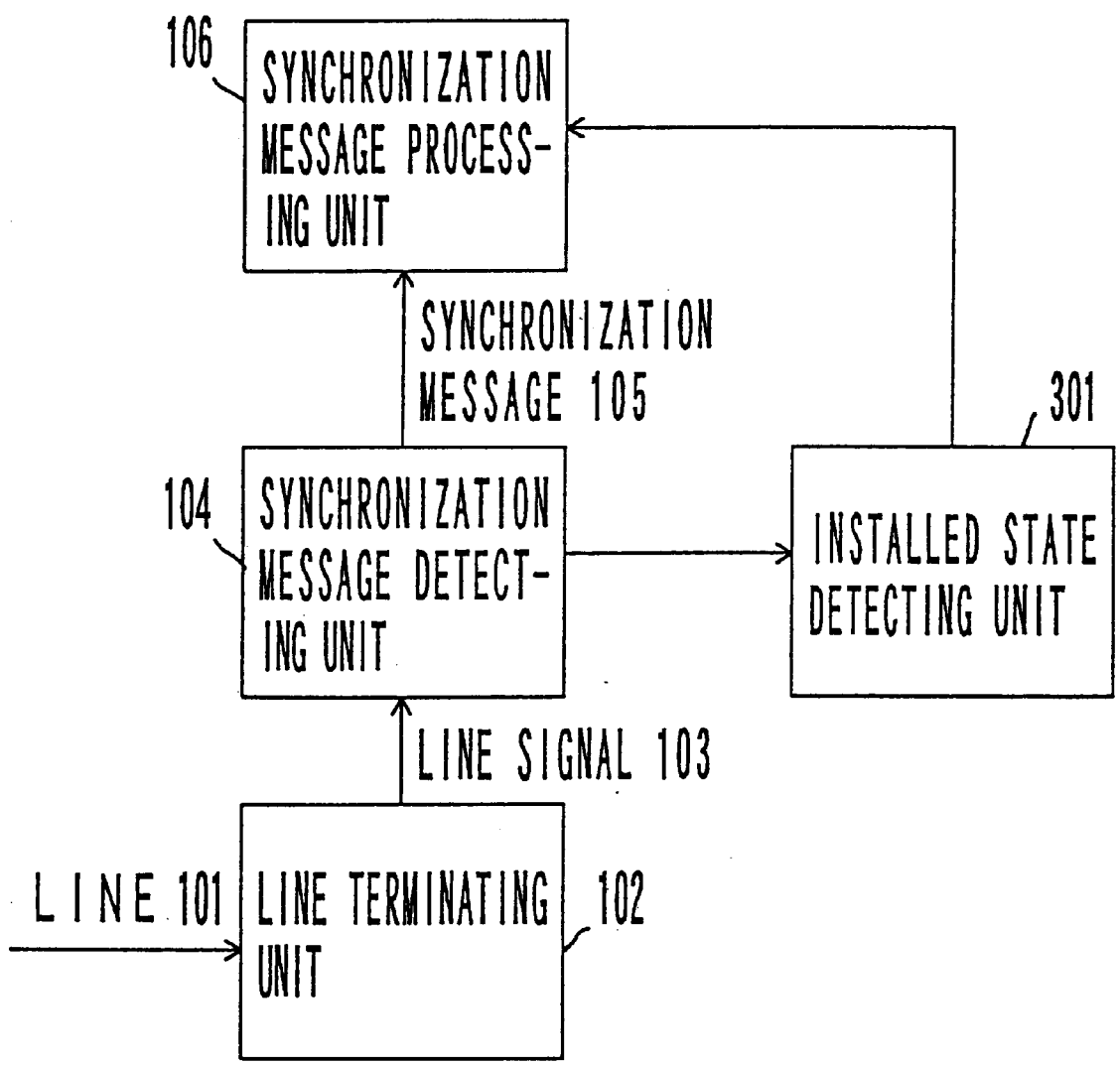
FIG. 3 is a block diagram of the present invention (No. 3)

A first aspect of the present invention based on the above-described fundamental structure has structures shown in FIGS. 1 to 3.

As a fundamental structure, a line terminating unit 102 (a SONET signal/DS1 reference signal receiving unit 001, a B/U unit 4801, and a DMUX unit 4807 shown in subsequent figures) terminates a line 101 (a SONET optical transmission line 1103 and a DS1 metal transmission line 1104).

A synchronization message detecting unit 104 (a synchronization message detecting unit 002, a DS1 ESF data link detecting unit 4803, and an S1 detecting unit 4809 shown in subsequent figures) detects a synchronization message 105 from a received signal, for example, a line signal 103 (a SONET signal and a DS1 signal shown in subsequent figures) that the line terminating unit 102 receives from the line 101.

A synchronization message processing unit 106 (a CPU 003 and a CPU 4804) determines whether or not to select a clock reference received from the line 101 as an active reference corresponding to the quality level represented by the synchronization message 105 detected by the synchronization message detecting unit 104.

A state detecting unit detects the state of the synchronization message detecting unit. In practice, the state detecting unit is accomplished by at least one of an installed state detecting unit 107 shown in FIG. 1, a fault state detecting unit 201 shown in FIG. 2, and an installed state detecting unit 301 shown in FIG. 3. The installed state detecting unit 107 (a non-installed state detecting unit 1701 or 1801 and a CPU 4804) shown in FIG. 1 detects the state that represents whether or not the synchronization message detecting unit has been installed. The fault state detecting unit 201 (a unit fault detecting unit 1901 or 2001, a CPU 003, a DS1 ESF data link detecting unit 4803, an S1 detecting unit 4809, and a CPU 4804, as shown in FIG. 2) detects a fault state of the synchronization message detecting unit. The installed state detecting unit 301 shown in FIG. 3 (an improperly installed state detecting unit 2101 and a CPU 4804) detects the state representing whether or not the synchronization message detecting unit has been improperly installed.

When the state detecting unit has detected that the synchronization message detecting unit 104 is not in the normal state, the synchronization message processing unit 106 does not select a clock reference corresponding to a synchronization message 105 detected by the synchronization message detecting unit 104 as an active reference. More specifically, when the installed state detecting unit 107 shown in FIG. 1 has detected that the synchronization message detecting unit 104 has not been installed, when the fault state detecting unit 201 shown in FIG. 2 has detected the fault state of the synchronization message detecting unit 104, or when the installed state detecting unit 301 shown in FIG. 3 has detected that the synchronization message detecting unit 104 has not been properly installed, the synchronization message processing unit 106 does not select this clock reference as the active reference.

According to the structure of the first aspect of the present invention, when the state detecting unit has detected that the synchronization message detecting unit 104 is not in the normal state, the clock reference corresponding to the synchronization message 105 processed by the synchronization message detecting unit 104 is not selected as the active reference. Thus, since a malfunction such as a timing loop is prevented from taking place, the performance, stability, and quality assurance) of the synchronous network can be improved.

A second aspect of the present invention based on the above-described fundamental structure has the structure shown in FIG. 4.

A line 101, a line terminating unit 102, a line signal 103, a synchronization message detecting unit 104, a synchronization message 105, and a synchronization message processing unit 106 of the structure of the second aspect shown in FIG. 4 are the same as those of the structure of the first aspect shown in FIG. 1.

A service state designating unit 401 (an OOS designating unit 2201 or 2301 and a CPU 4804) designates a service state of the synchronization message detecting unit 104.

When the service state designating unit 401 has designated the synchronization message detecting unit 104 to the out-of-service (OOS) state, the synchronization message processing unit 106 does not select a clock reference corresponding to a synchronization message 105 detected by the synchronization message detecting unit 104 as an active reference.

According to the structure of the second aspect of the present invention, when the synchronization message detecting unit 104 has been designated to the out-of-service state, the clock reference corresponding to the synchronization message 105 the unit 104 processes is prevented from being selected as the active reference. Thus, since a malfunction such as a timing loop is prevented from taking place, the performance, stability, and quality assurance) of the synchronous network can be improved.

Figure 5:
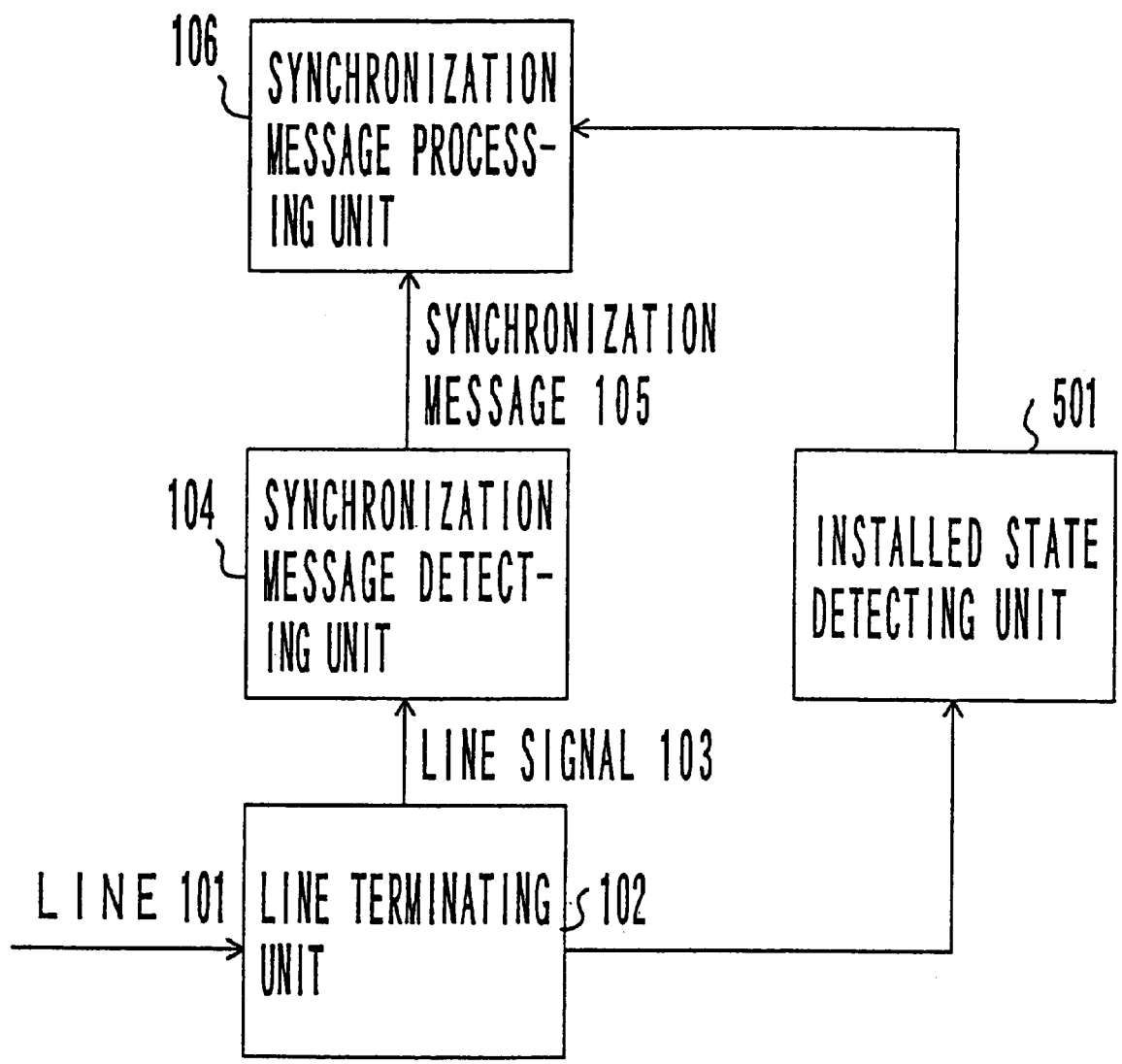
FIG. 5 is a block diagram of the present invention (No. 5)
Figure 6:
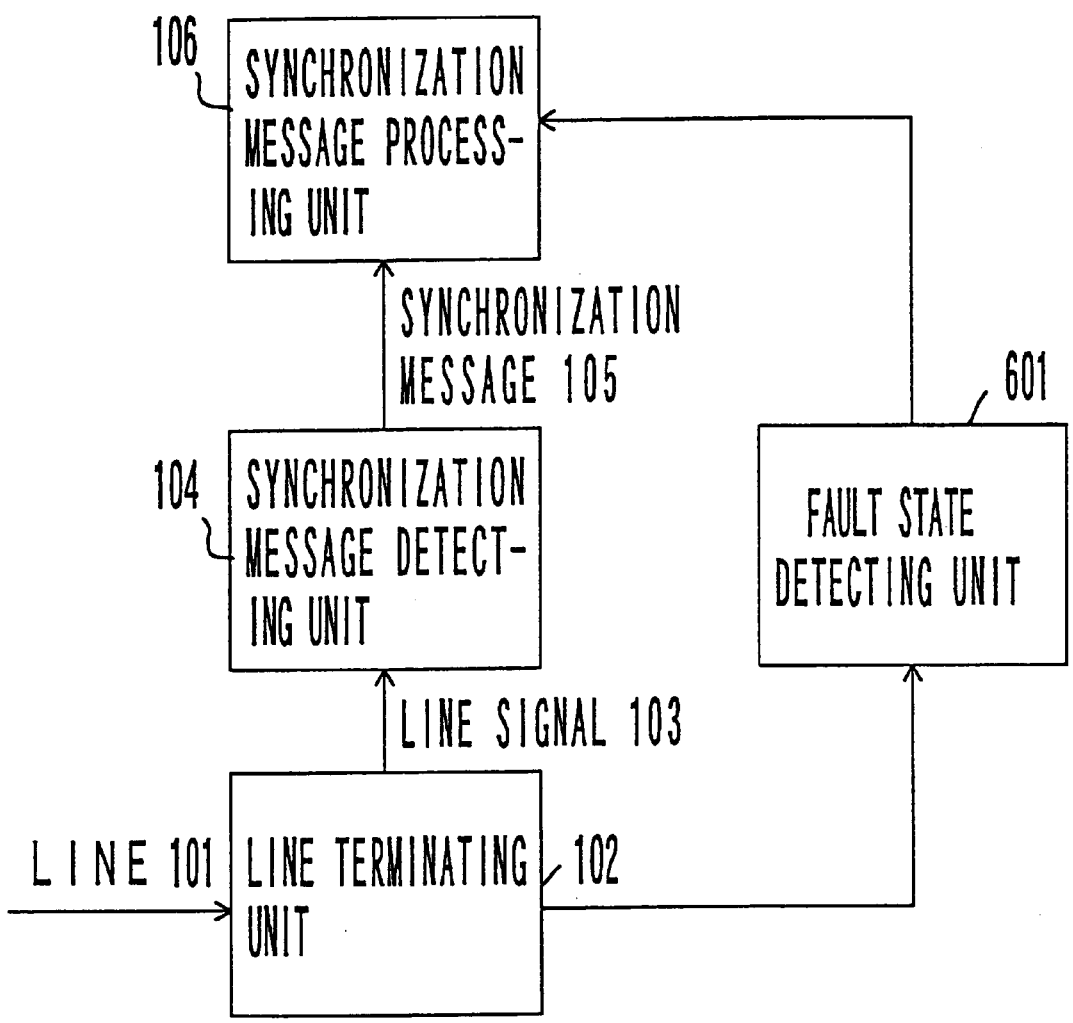
FIG. 6 is a block diagram of the present invention (No. 6)
Figure 7:
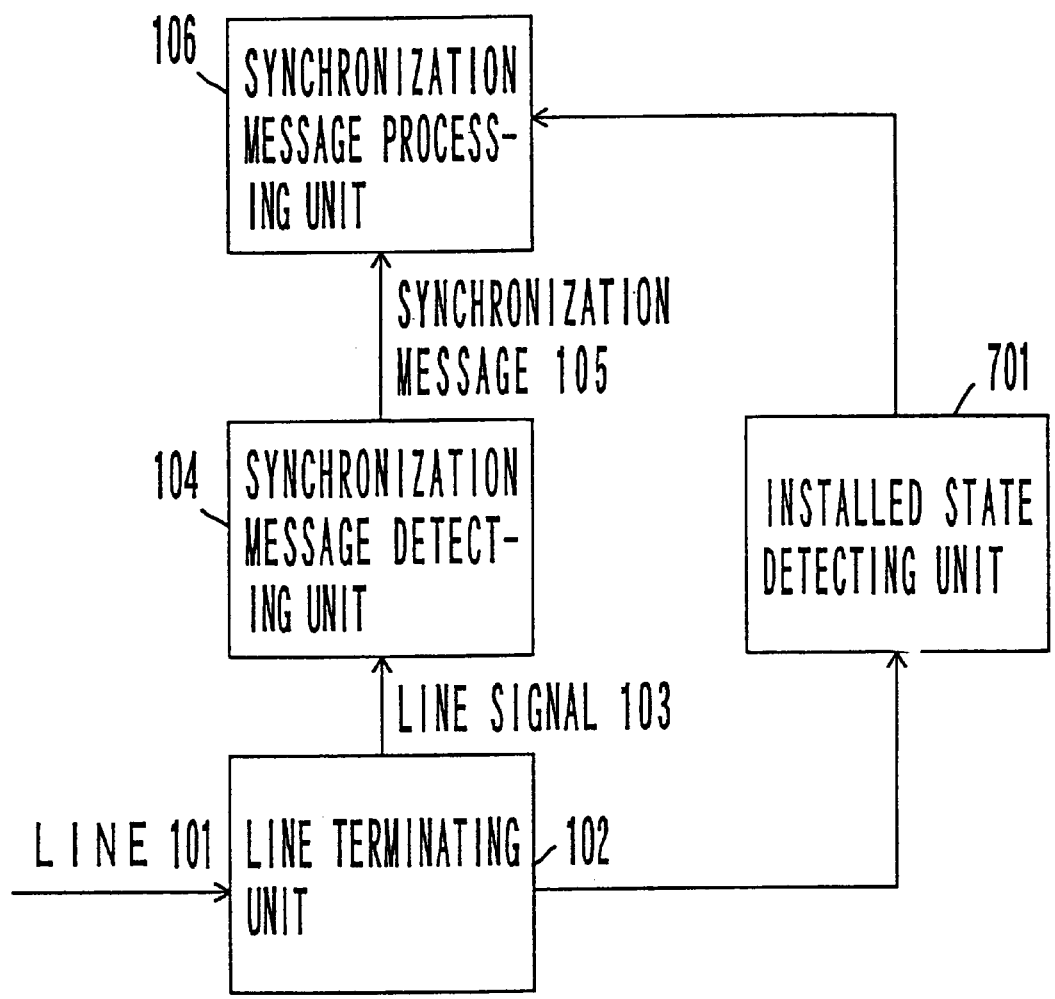
FIG. 7 is a block diagram of the present invention (No. 7)

A third aspect of the present invention based on the above-described fundamental structure has structures shown in FIGS. 5 to 7.

A line 101, a line terminating unit 102, a line signal 103, a synchronization message detecting unit 104, a synchronization message 105, and a synchronization message processing unit 106 of the structure of the third aspect shown in each of FIGS. 5 to 7 are the same as those of the structure of the first aspect shown in FIG. 1.

A state detecting unit detects the state of the line terminating unit 102. In practice, the state detecting unit is accomplished by at least one of an installed state detecting unit 501 shown in FIG. 5, a fault state detecting unit 601 shown in FIG. 6, and an installed state detecting unit 701 shown in FIG. 7. The state detecting unit 501 shown in FIG. 5 (a non-installed state detecting unit 2401, 2501, 2601, or 2701, a CPU 4804, a DS1 ESF data link detecting unit 4803, and an S1 detecting unit 4809) detects the state that represents whether or not the line terminating unit 102 has been installed. A fault state detecting unit 601 shown in FIG. 6 (a unit fault detecting unit 2801, 2901, 3001, or 3101, a CPU 003, a B/U unit 4801, a DMUX unit 4807, and a CPU 4804) detects the fault state of the line terminating unit 102. An installed state detecting unit 701 shown in FIG. 7 (an improperly installed state detecting unit 3201 or 3301 and a CPU 4804) detects the state that represents whether or not the line terminating unit 102 has been properly installed.

When the state detecting unit has detected that the line terminating unit 102 is not in the normal state, the synchronization message processing unit 106 does not select a clock reference corresponding to a synchronization message 105 detected by the synchronization message detecting unit 104 through the line terminating unit 102 as an active reference. In practice, when the installed state detecting unit 501 shown in FIG. 5 has detected that the line terminating unit 102 has not been installed, when the fault state detecting unit 601 shown in FIG. 6 has detected a fault state of the line terminating unit 102, or when the installed state detecting unit 701 has detected that the line terminating unit 102 has not been properly installed, the synchronization message processing unit 106 does not select this clock reference as the active reference.

According to the structure of the third aspect of the present invention, when the state detecting unit has detected that the line terminating unit 102 has not been correctly installed, in practice, when the installed state detecting unit 501 has detected that the line terminating unit 102 has not been installed, when the fault state detecting unit 601 has detected the fault state of the line terminating unit 102, or the installed state detecting unit 701 has detected that the line terminating unit 102 has not been properly installed), the clock reference corresponding to the synchronization message 105 processed by the synchronization message detecting unit 104 through the line terminating unit 102 is prohibited from being selected as the active reference. Thus, since a malfunction such as a timing loop is prevented from taking place, the performance, stability, and quality assurance) of the synchronous network can be improved.

Figure 8:
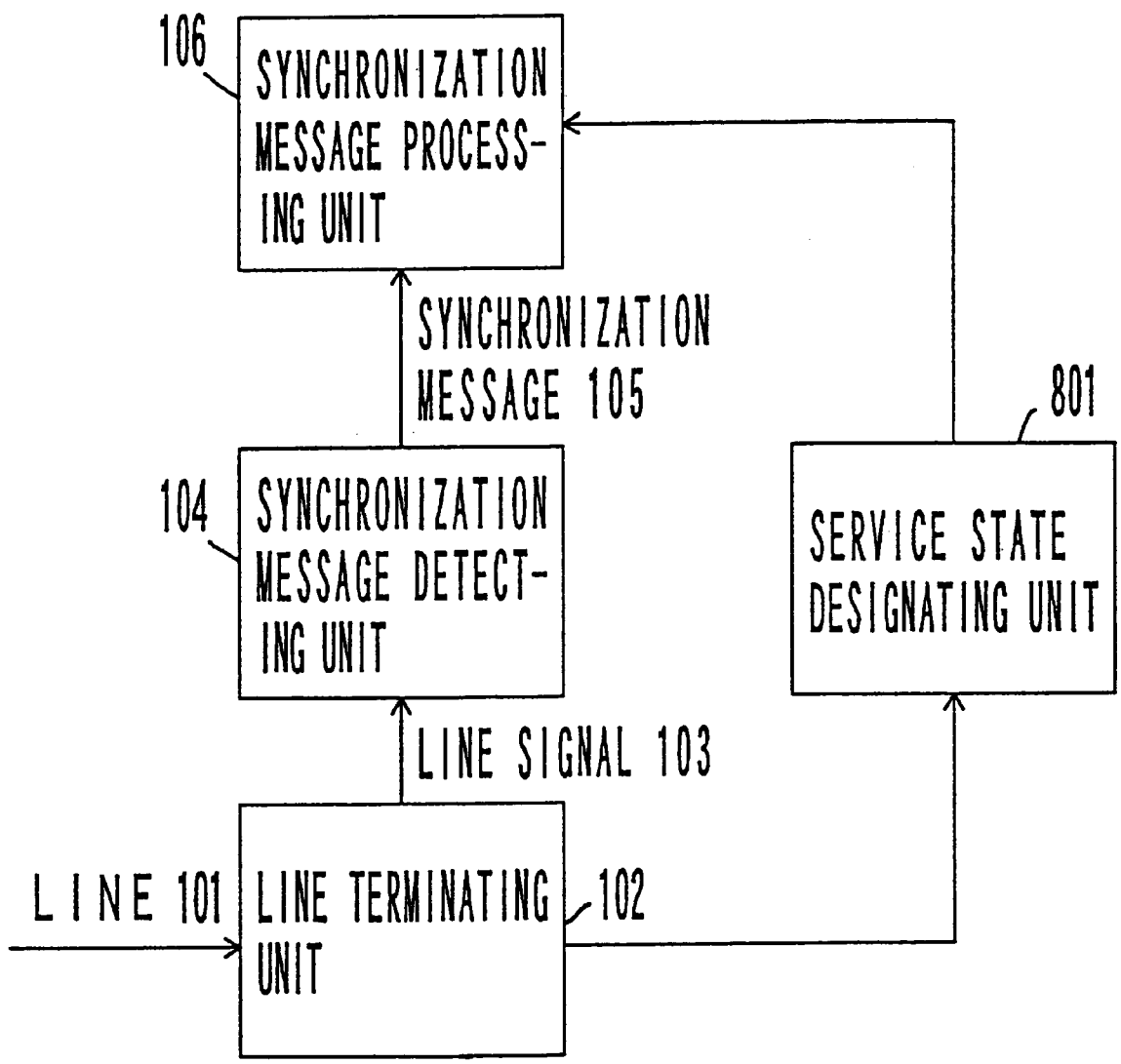
FIG. 8 is a block diagram of the present invention (No. 8)

A fourth aspect of the present invention based on the above-described fundamental structure has the structure shown in FIG. 8.

A line 101, a line terminating unit 102, a line signal 103, a synchronization message detecting unit 104, a synchronization message 105, and a synchronization message processing unit 106 of the structure of the fourth aspect shown in FIG. 8 are the same as those of the structure of the first aspect shown in FIG. 1.

A service state designating unit 801 (an OOS designating unit 3401, 3501, or 3601 and a CPU 4804) designates a service state of the line terminating unit 102.

When a service state designating unit 801 has designated the line terminating unit 102 to the out-of-service state, the synchronization message processing unit 106 does not select a clock reference corresponding to a synchronization message 105 detected by the synchronization message detecting unit 104 through the line terminating unit 102 as an active reference.

According to the structure of the fourth aspect of the present invention, when the line terminating unit 102 is designated to the out-of-service state, the clock reference corresponding to the synchronization message 105 processed by the synchronization message detecting unit 104 through the line terminating unit 102 is prohibited from being selected as the active reference. Thus, since a malfunction such as a timing loop is prevented from taking place, the performance, stability, and quality assurance) of the synchronous network can be improved.

A fifth aspect of the present invention based on the above-described fundamental structure has the structure shown in FIG. 9.

A line 101, a line terminating unit 102, a line signal 103, a synchronization message detecting unit 104, a synchronization message 105, and a synchronization message processing unit 106 of the structure of the fifth aspect shown in FIG. 9 are the same as those of the structure of the first aspect shown in FIG. 1.

A service state designating unit 901 (an OOS designating unit 3701, 3801, or 3901, and a CPU 4804) designates a service state of the line 101.

When a service state designating unit 901 has designated the line 101 to the out-of-service state, the synchronization message processing unit 106 does not select a clock reference corresponding to a synchronization message 105 detected by the synchronization message detecting unit 104 through the line 101 and the line terminating unit 102 that terminates the line 101 as an active reference.

According to the structure of the fifth aspect of the present invention, when the line 101 has been designated to the out-of-service state, the clock reference corresponding to the synchronization message 102 processed by the synchronization message detecting unit 104 through the line terminating unit 102 which terminates the line 101 is prohibited from being selected as the active reference. Thus, since a malfunction such as a timing loop is prevented from taking place, the performance, stability, and quality assurance of the synchronous network can be improved.

Figure 10:
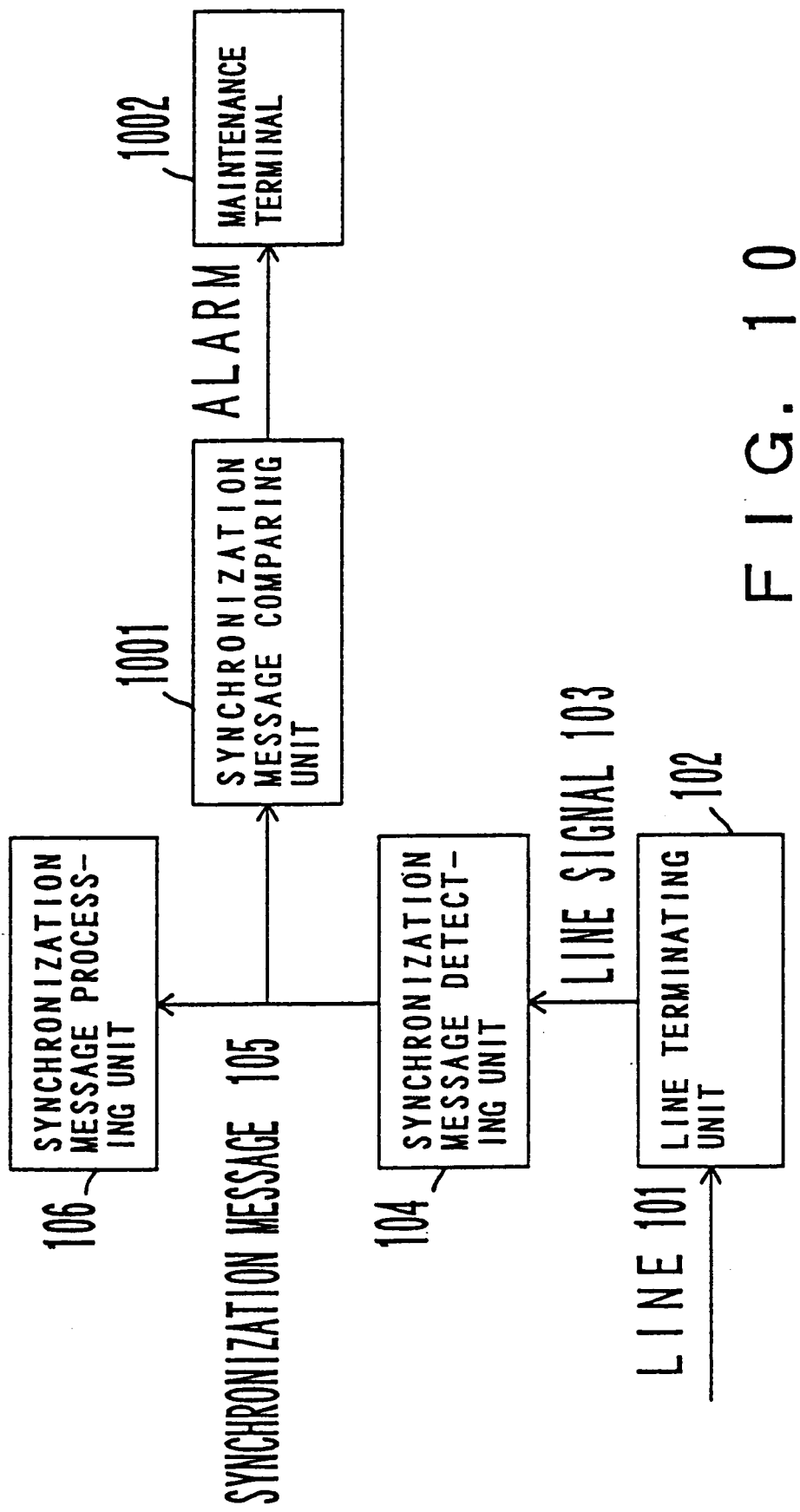
FIG. 10 is a block diagram of the present invention (No. 10)

Last, a sixth aspect of the present invention based on the above-described fundamental structure has the structure shown in FIG. 10.

A line 101, a line terminating unit 102, a line signal 103, a synchronization message detecting unit 104, a synchronization message 105, and a synchronization message processing unit 106 of the structure of the sixth aspect shown in FIG. 10 are the same as those of the structure of the first aspect shown in FIG. 1.

A synchronization message comparing unit 1001 (a synchronization message comparing unit 4001, 4101, or 4201, and a CPU 4804) compares the quality level represented by the synchronization message 105 detected by the synchronization message detecting unit 104 with the accuracy of the internal clock of the local transmission unit. When the quality level represented by the synchronization message 105 is lower than the accuracy of the internal clock, the synchronization message comparing unit 1001 outputs an alarm to a maintenance terminal 1002 (a maintenance terminal 4805) connected to the local transmission unit.

When the synchronization message comparing unit 1001 has detected that the quality level represented by the synchronization message 105 detected by the synchronization message detecting unit 104 is lower than the accuracy of the internal clock of the local transmission unit, the synchronization message processing unit 106 does not select a clock reference corresponding to the synchronization message 105 detected by the synchronization message detecting unit 104 as a active reference.

According to the structure of the sixth aspect of the present invention, when the quality level represented by the synchronization message 105 that the synchronization message detecting unit 104 has detected is lower than the accuracy of the internal clock of the local transmission unit, the clock reference corresponding to the synchronization message 105 is prohibited from being selected as the active reference. Thus, since a malfunction such as a timing loop is prevented from taking place, the performance, stability, and quality assurance) of the synchronous network can be improved. In addition, since an alarm is sent to the maintenance terminal, a mis-operation can be prevented.

DETAILED DESCRIPTION OF THE PREFERRED EMBODIMENTS

Next, with reference to the accompanying drawings, preferred embodiments of the present invention will be described based on the above described theoretical structures.

<Fundamental Structure of Preferred Embodiments of Present Invention>

First, the fundamental structure of the preferred embodiments of the present invention will be described.

FIG. 11 is a schematic diagram showing the fundamental structure of a synchronous network according to each of the preferred embodiments of the present invention.

A plurality of transmission units 1101 are interconnected with optical transmission lines 1103 corresponding to, for example, the SONET (Synchronous Optical Network) standard. In addition, some of the transmission units 1101 are connected with, for example, DS1 metal transmission lines 1104. Some of the transmission units 1101 are connected to exchanges 1105 directly or through repeating units 1106 or the like.

In such a network environment, a clock generating unit 1102 that is referred to as a BITS (Building Integrated Timing Supply) supplies a clock reference with a high accuracy to transmission units 1101 in the network through the DS1 metal transmission lines 1104.

According to each of the preferred embodiments of the present invention, a synchronization message is sent with a DS1 ESF data link, as is a control link in the DS1 metal transmission lines 1104.

Figure 12:
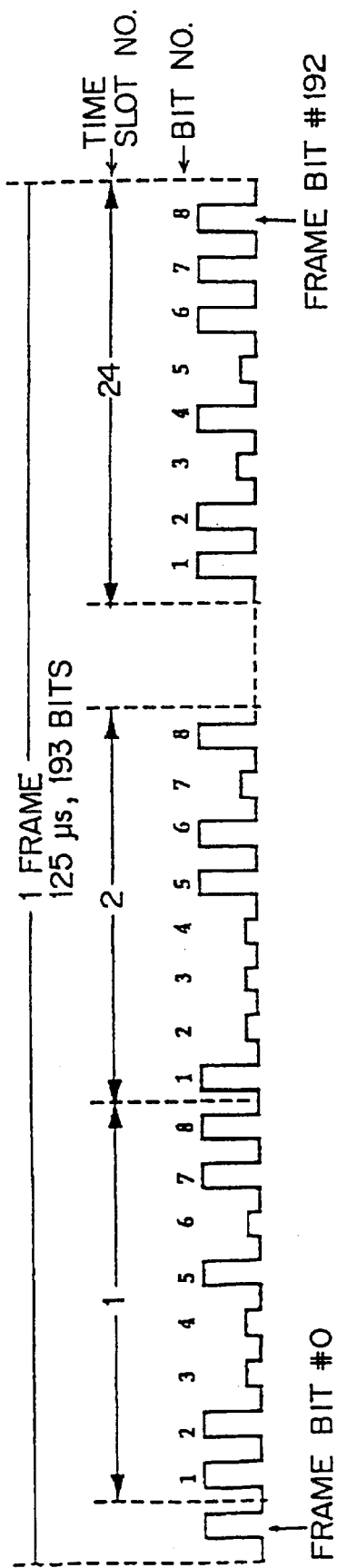
FIG. 12 is a schematic diagram showing a DS1 data format.

FIG. 12 is a schematic diagram showing a data format on a DS1 metal transmission line 1104. In this format, one frame (125 μs (micro seconds), 193 bits) is composed of data in 24 time slots. Data in each time slot is composed of eight bits. One multi-frame is composed of 24 frames. Data of one frame is sent in the order of frame bit #0 to frame bit #192 in FIG. 12. Data of one multi-frame is sent in the order of frame 1 to frame 24.

FIG. 13 is a schematic diagram showing a data format of DS1 frame bits. A data link with a transmission rate of 4 kb/s (kilobits/sec) is composed of 13 bits and denoted by an "X" in the field DL shown in FIG. 13 of frame bits #0 to #4439 of one multi-frame composed of 24 frames. Thus, the DS1 ESF data link is formed. In FIG. 13, the FPS field represents a framing pattern sequence for extracting frames. The CRC field represents cyclic redundancy check channels for detecting/correcting data errors.

On the other hand, in the SONET optical transmission lines 1103, a synchronization message is sent with a line overhead that is control information.

Figure 14:
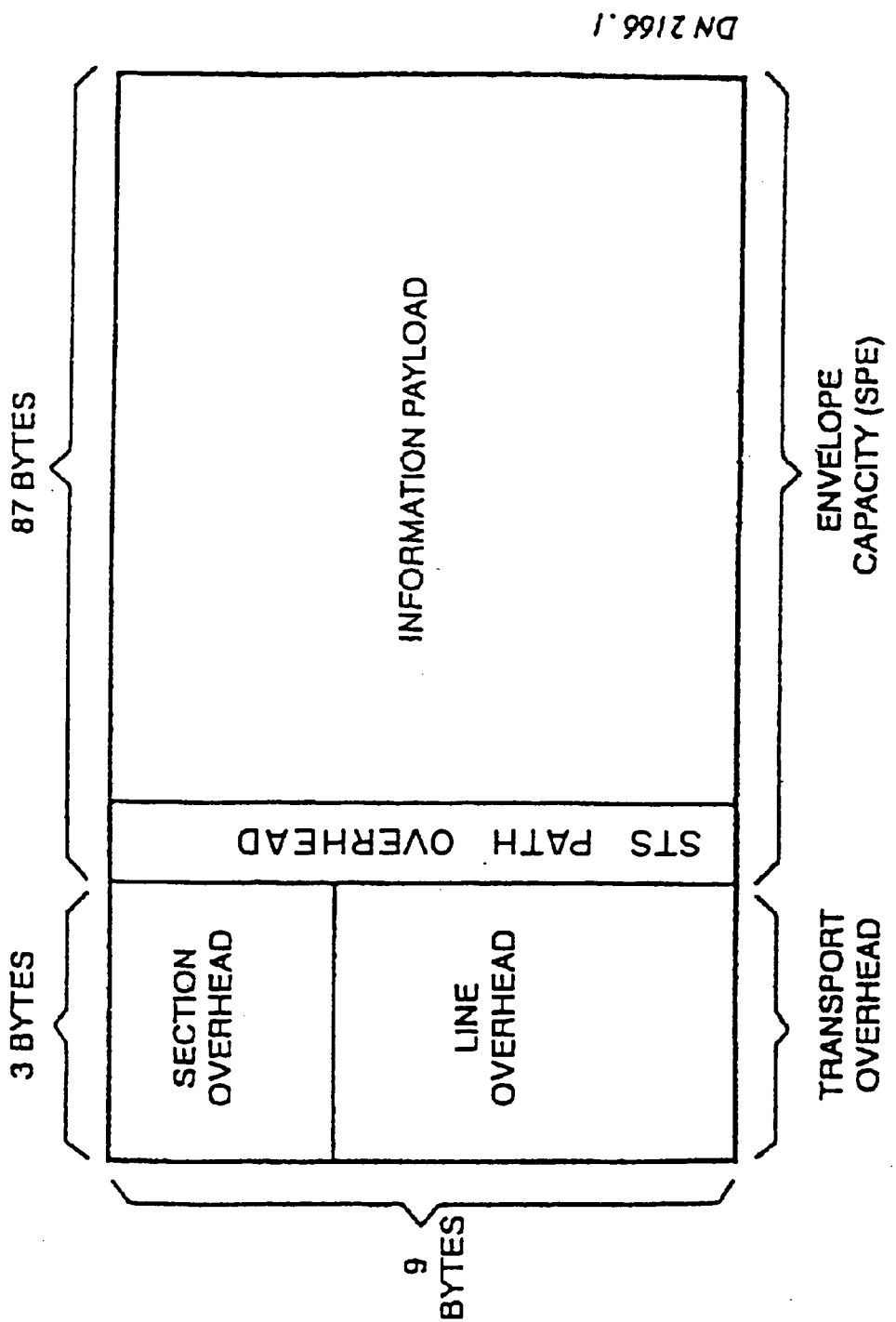
FIG. 14 is a schematic diagram showing a frame format of SONET.

FIG. 14 is a schematic diagram showing a frame format on a SONET optical transmission line. FIG. 15 is a schematic diagram showing a data format of each overhead in the frame format shown in FIG. 14. In FIG. 14, a SONET signal is sent in the order from the upper left data to the lower right data.

The SONET signal is composed of control information referred to as transport overhead and user information referred to as envelope capacity or SPE (Synchronous Payload Envelope). The envelope capacity has a path overhead.

The envelope capacity has an information payload that stores user data.

A path is a logical end-to-end connection between two points that generate and terminate an STS (synchronous transmission signal) that is a SONET signal sent among a plurality of physical connections. The path overhead shown in FIGS. 14 and 15 stores control information exchanged between the two points. In the synchronous transmission network shown in FIG. 11, the portion between the transmission unit 1101 connected directly to the exchange 1105 and the transmission unit 1101 connected to the repeating unit 1106 is a path. Thus, the path overhead stores only control information communicated between two transmission units 1101.

A line is one type of physical connection between two consecutive terminating elements. The line overhead shown in FIGS. 14 and 15 stores control information communicated between the two terminating elements. In the example of the synchronous transmission network shown in FIG. 11, a SONET optical transmission line 1103 between adjacent transmission units 1101 is a line. Thus, the line overhead stores control information communicated between the adjacent transmission units 1101.

A section is a connection between two network elements that are disposed on one line and that simply regenerate signals (optical signals and the like) so as to shape the waveforms, amplifying and equalizing them without terminating the signals that are sent on the line. The section overhead shown in FIGS. 14 and 15 stores control information communicated between the two network elements. In the synchronous transmission network shown in FIG. 11, the section is equivalent to a line.

Since a synchronization message represents the quality level of a clock reference sent between the adjacent transmission units 1101 through the SONET optical transmission lines 1103 that connect them, the synchronization message should be stored in the line overhead in the SONET frame format shown in FIGS. 14 and 15.

Thus, according to each of the preferred embodiments of the present invention, a synchronization message is sent with byte data and denoted by and "*" of the line overhead shown in FIG. 15 in the SONET optical transmission lines 1103. The byte data is referred to as the S1 byte.

FIG. 16 is a schematic diagram showing the contents of the quality level represented by a synchronization message. The quality level is defined in the units of ppm. In FIG. 16, the quality levels (1 to 7), and respective values of the DS1 ESF data link and S1 byte are shown in correspondence with the respective quality levels.

For example, "Stratum 1 Traceable" represents the highest quality level that accords with the quality level of the clock reference supplied from the BITS 1102 (see FIG. 11). "Stratus 3 Traceable" and "±20 ppm Clock Traceable" accords with the quality level of the internal clock of the transmission unit 1101. "Stratum 4 Traceable" accords with the quality level of the DS1 metal transmission line 1104. Since this quality level does not take place on the SONET optical transmission lines 1103, the value of the S1 byte has not been defined. "Don't Use for Synchronization" represents the quality level that represents that the clock reference is prohibited from being used for controlling the synchronization. "Network Provider Specific Synchronization" represents the quality level that has been reserved for future use.

<First Preferred Embodiment>

Next, based on the fundamental structures shown in FIGS. 11 to 16, a first preferred embodiment of the present invention will be described.

FIG. 17 is a schematic diagram showing the structure of the first preferred embodiment. This structure is disposed in each of the transmission units 1101 that compose the synchronous transmission network shown in FIG. 11.

An OC-N (Optical Carrier-Level N) signal, an STS-N (Synchronous Transport Signal-Level N) signal, or a DS1 signal is sent over a SONET optical transmission line 1103 and a DS1 metal transmission line 1104.

A SONET signal/DS1 reference signal receiving unit 001 receives the SONET signal or the DS1 signal from the SONET optical transmission line 1103 or the DS1 metal transmission line 1104 and extract a line overhead (see FIG. 14 or 15) from the SONET signal or a DS1 ESF data link (see FIG. 13) from the DS1 signal.

A synchronization message detecting unit 002 detects a synchronization message from the line overhead in the SONET signal or from the DS1 ESF data link in the DS1 signal, extracted by the SONET signal/DS1 reference signal receiving unit 001.

The SONET signal/DS1 reference signal receiving unit 001 and the synchronization message detecting unit 002 are disposed corresponding to each of the lines to which the transmission units 1101 (see FIG. 11) are terminated.

A synchronization message processing unit 004 is accomplished as a function in which a CPU 003 executes a control program. The synchronization message processing unit 004 compares the quality level represented by a synchronization message for each line detected by the synchronization message detecting unit 002 for each line and selects one of a plurality of clock references received from the plurality of lines so as to control the system timing of the local transmission unit 1101 or supply a timing signal to another unit. The detail of the operation of the synchronization message processing unit 004 will be described later.

A non-installed state detecting unit 1701 is accomplished as a function for which the CPU 003 executes a control program. The non-installed state detecting unit 1701 monitors a predetermined code on a microcomputer interface to which the synchronization message detecting unit 002 is terminated. When the non-installed state detecting unit 1701 detects the predetermined code, it determines that the synchronization message detecting unit 002 has been installed. In addition, when the non-installed state detecting unit 1071 detects other than the predetermined code, such as "00h" or "FFh", it determines that the synchronization message detecting unit 002 has not been installed and sends non-installed state information to the synchronization message processing unit 004.

When the synchronization message processing unit 004 receives the non-installed state information from the non-installed state detecting unit 1701, the synchronization message processing unit 004 prohibits the clock reference corresponding to the synchronization message detected by the synchronization message detecting unit 002, determined as a non-installed unit, from being selected.

With the above-described control operation, when the local transmission unit 1101 receives a synchronization message "DUS" (see FIG. 16) that represents the prohibition of the use of the clock reference from the adjacent transmission unit 1101, since the signal is prevented from being selected as the clock reference, the above-described first problem can be solved.

As examples of the method for prohibiting a clock reference from being selected, there is a method in which the synchronization message processing unit 004 designates the clock reference to the fault state, and a method in which the synchronization message corresponding to the clock reference is forcedly designated to the "DUS" state (see FIG. 16).

However, the above-described control operation is executed only when the mode for processing a synchronization message has been selected. Thus, when the mode for processing a synchronization message has not been selected, even if the non-installed state detecting unit 1701 outputs the non-installed state information, the clock reference corresponding to the synchronization message detected by the synchronization message detecting unit 002 determined as a non-installed unit is not prohibited from being selected.

<Second Preferred Embodiment>

Based on the fundamental structures shown in FIGS. 11 to 16, a second preferred embodiment of the present invention will be described.

Figure 18:
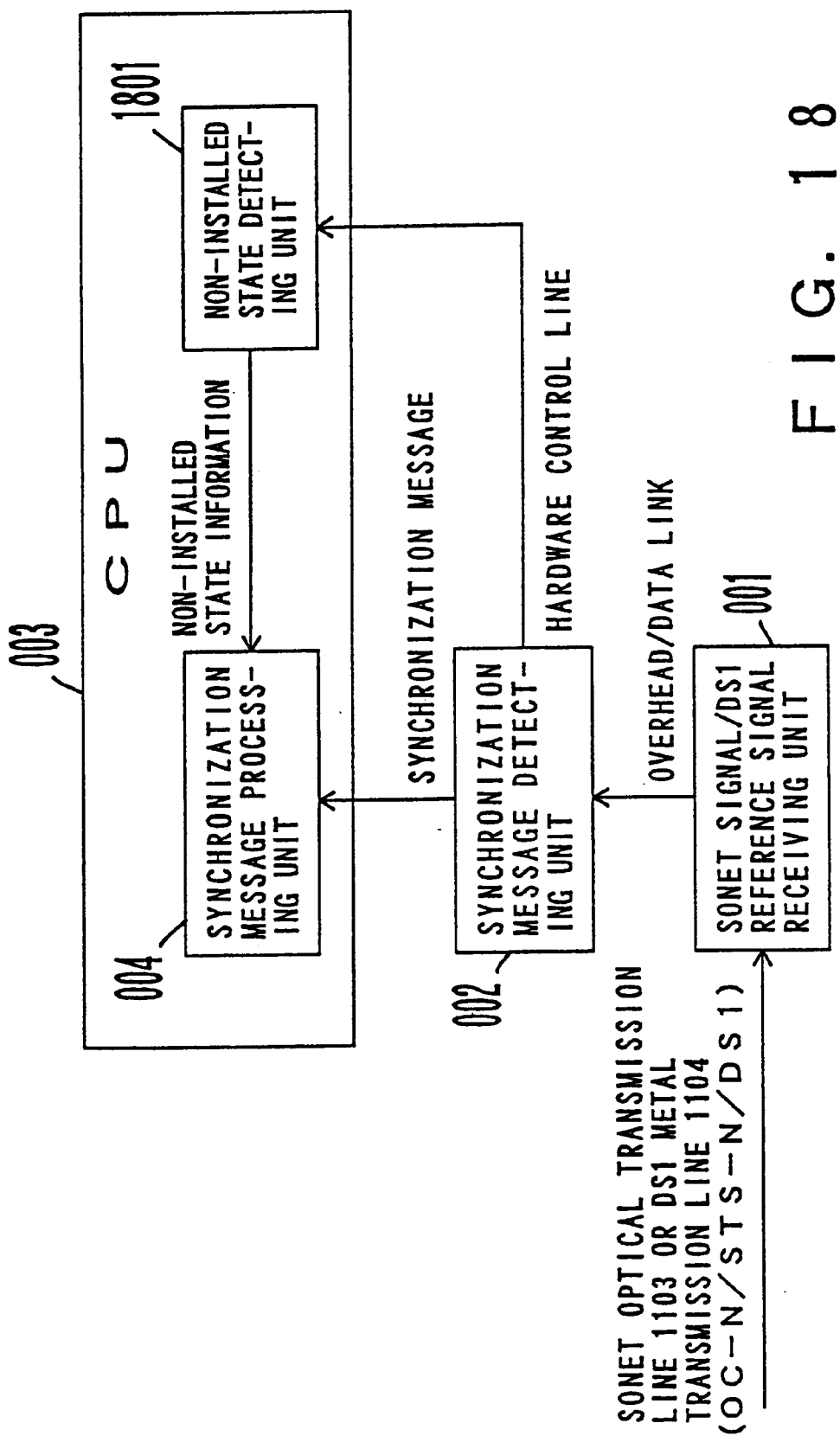
FIG. 18 is a schematic diagram showing the structure of a second preferred embodiment.

FIG. 18 is a schematic diagram showing the structure of the second preferred embodiment. As with the structure of the first preferred embodiment shown in FIG. 17, the structure shown in FIG. 18 is disposed in each of the transmission units 1101 that compose the synchronous transmission network shown in FIG. 11. For simplicity, in FIG. 18, similar units to those of the structure of the first preferred embodiment in FIG. 17 are denoted by similar reference numerals.

The difference between the structure of the second preferred embodiment shown in FIG. 18 and the structure of the first preferred embodiment shown in FIG. 17 is that a non-installed state detecting unit 1801, accomplished as a function for which a CPU 003 executes a control program, detects the non-installed state of a synchronization message detecting unit 002 through a hardware control line that connects the synchronization message detecting unit 002 and the CPU 003, rather than through a microcomputer interface.

In other words, when the level of a signal on the hardware control line is, for example, low, the non-installed state detecting unit 1801 determines that the synchronization message detecting unit 002 has been installed. When the level of the signal on the hardware control line is, for example, high, the non-installed state detecting unit 1801 determines that the synchronization message detecting unit 002 has not been installed and sends non-installed state information to a synchronization message processing unit 004.

With the above-described structure, as with the first preferred embodiment shown in FIG. 17, the above-described first problem can be solved.

<Third Preferred Embodiment>

Based on the fundamental structures shown in FIGS. 11 to 16, a third preferred embodiment of the present invention will be described.

Figure 19:
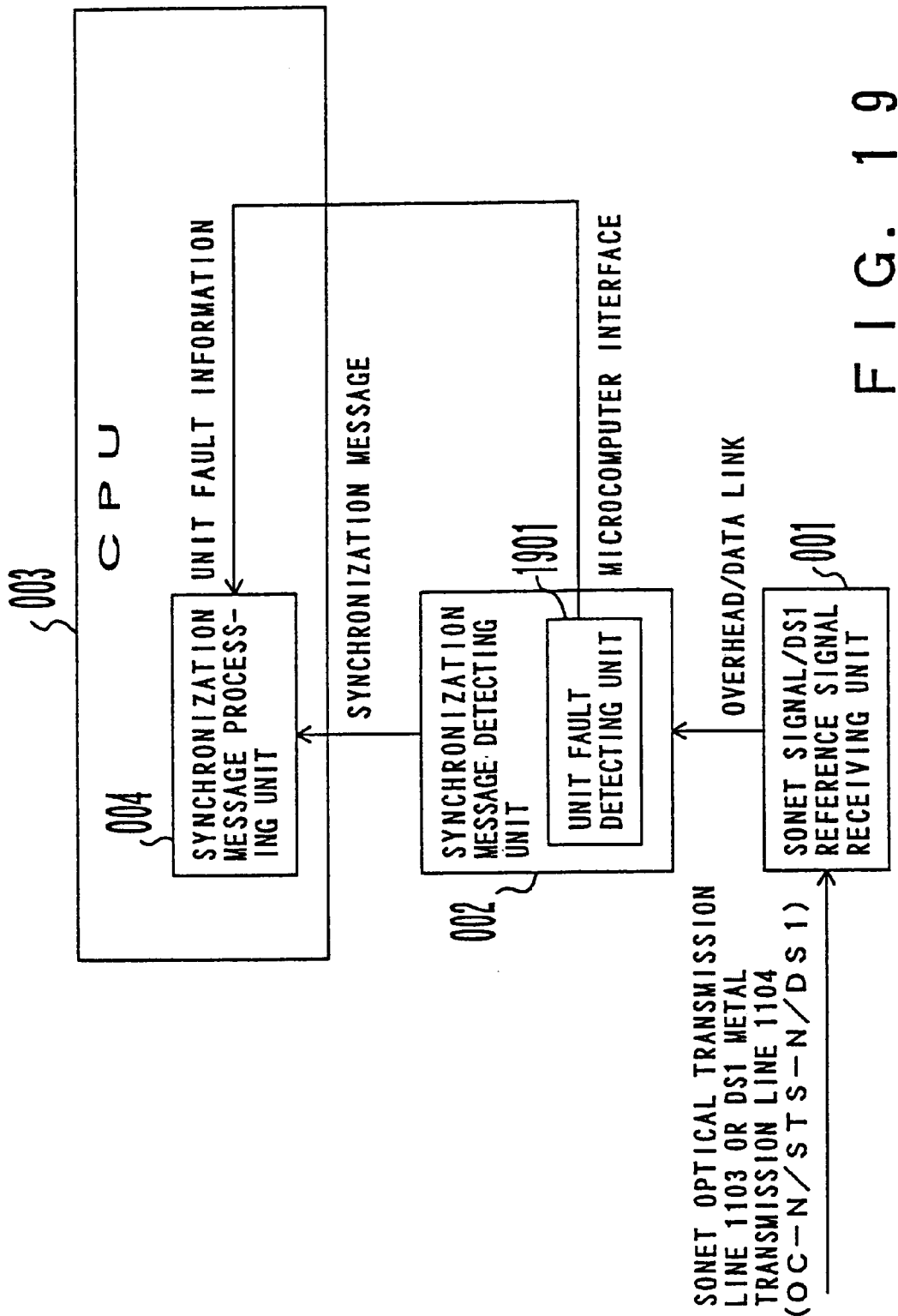
FIG. 19 is a schematic diagram showing the structure of a third preferred embodiment.

FIG. 19 is a schematic diagram showing the structure of the third preferred embodiment. As with the structure of the first preferred embodiment shown in FIG. 17, the structure shown in FIG. 19 is disposed in each of the transmission units 1101 that compose the synchronous transmission network shown in FIG. 11. For simplicity, in FIG. 19, similar units to those of the structure of the first preferred embodiment shown in FIG. 17 are denoted by similar reference numerals.

In the structure of the third preferred embodiment shown in FIG. 19, a unit fault detecting unit 1901 disposed in a synchronization message detecting unit 002 monitors a unit fault state of the synchronization message detecting unit 002. When the unit fault detecting unit 1901 detects the unit fault state of the synchronization message detecting unit 002, the unit fault detecting unit 1901 outputs unit fault information to a microcomputer interface to which the synchronization message detecting unit 002 is terminated.

After the CPU 003 receives the unit fault information, the unit fault information is sent to a synchronization message processing unit 004 that is accomplished as a function for which the CPU 003 executes a control program.

When the synchronization message processing unit 004 receives the unit fault information, it prohibits a clock reference corresponding to a synchronization message detected by the synchronization message detecting unit determined as being a faulty unit from being selected.

With such a control operation, when a synchronization message "DUS" (see FIG. 16) that represents the prohibition of the use of the clock reference has been received from an adjacent transmission unit 1101, this received signal is prevented from being selected as a clock reference. Thus, the above-described second problem can be solved.

As the method for prohibiting the clock reference from being selected, the same method as that of the first preferred embodiment can be used.

In addition, as with the first preferred embodiment, the control operation is executed only when the mode for processing a synchronization message has been selected.

<Fourth Preferred Embodiment>

Based on the fundamental structures shown in FIGS. 11 to 16, a fourth preferred embodiment of the present invention will be described.

Figure 20:
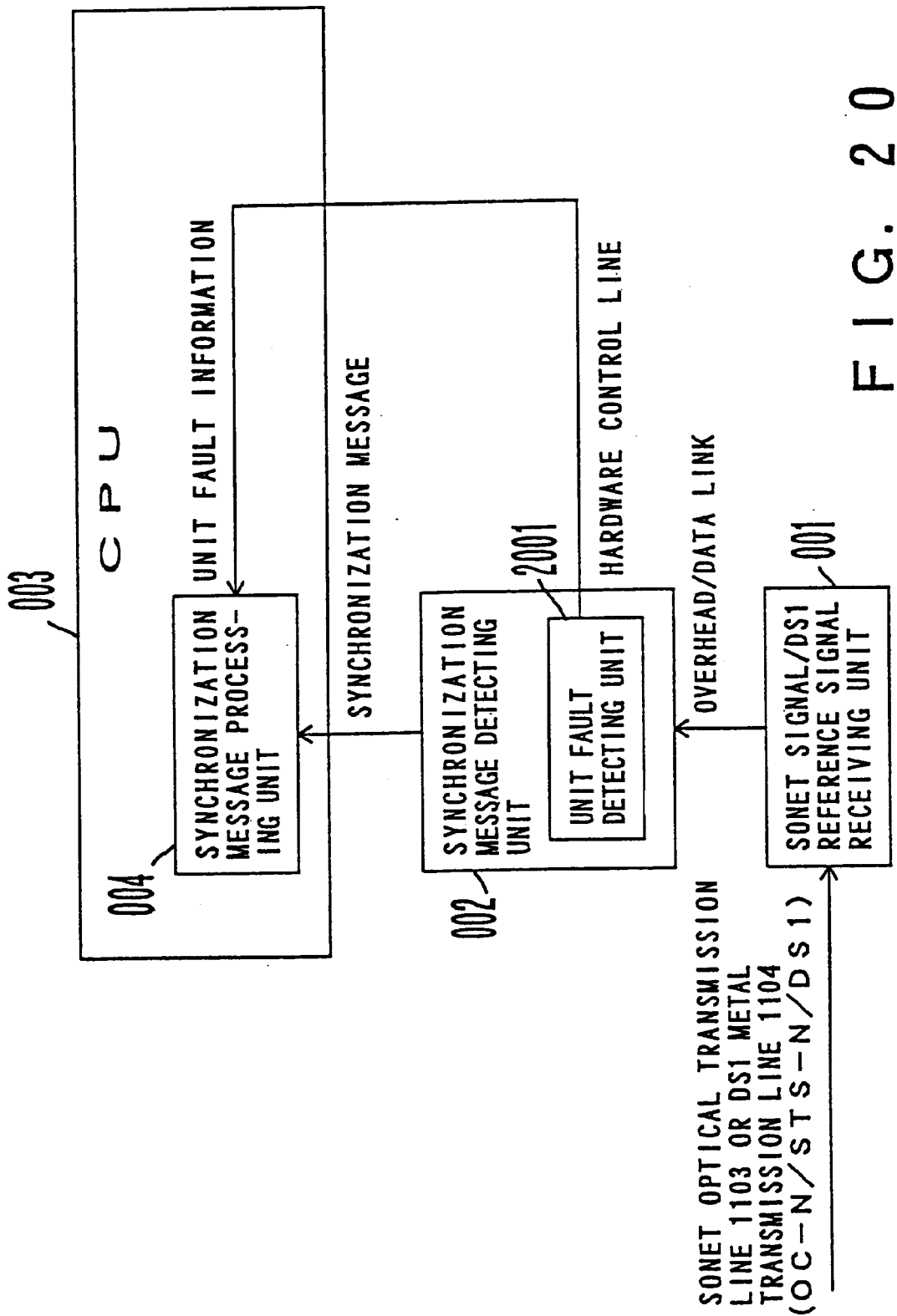
FIG. 20 is a schematic diagram showing the structure of a fourth preferred embodiment.

FIG. 20 is a schematic diagram showing the structure of the fourth preferred embodiment. As with the structure of the third preferred embodiment shown in FIG. 19, the structure shown in FIG. 20 is disposed in each of the transmission units 1101 that compose the synchronous transmission network shown in FIG. 11. For simplicity, in FIG. 20, similar units to those of the structure of the third preferred embodiment shown in FIG. 19 are denoted by similar reference numerals.

The difference between the structure of the fourth preferred embodiment shown in FIG. 20 and the structure of the third preferred embodiment shown in FIG. 19 is that a unit fault detecting unit 2001 in a synchronization message detecting unit 002 sends unit fault information that represents the fault state of the synchronization message detecting unit 002 to a CPU 003 through a hardware control line that connects the synchronization message detecting unit 002 and the CPU 003, rather than through a microcomputer interface.

In other words, when no fault takes place in the synchronization message detecting unit 002, the unit fault detecting unit 2001 designates a signal on the hardware control line to be, for example, a low level. When a fault takes place in the synchronization message detecting unit 002, the unit fault detecting unit 2001 designates the signal on the hardware control line to be, for example, a high level.

When the level of the signal on the hardware control line changes from the low level to the high level, a synchronization message processing unit 004, accomplished as a function for which the CPU 003 executes a control program, determines that unit fault information has been received and prohibits a clock reference corresponding to a synchronization message detected by the synchronization message detecting unit 002 determined as being a faulty unit from being selected.

With the above-described structure, as with the third preferred embodiment shown in FIG. 19, the second problem can be solved.

<Fifth Preferred Embodiment>

Based on the fundamental structures shown in FIGS. 11 to 16, a fifth preferred embodiment of the present invention will be described.

Figure 21:
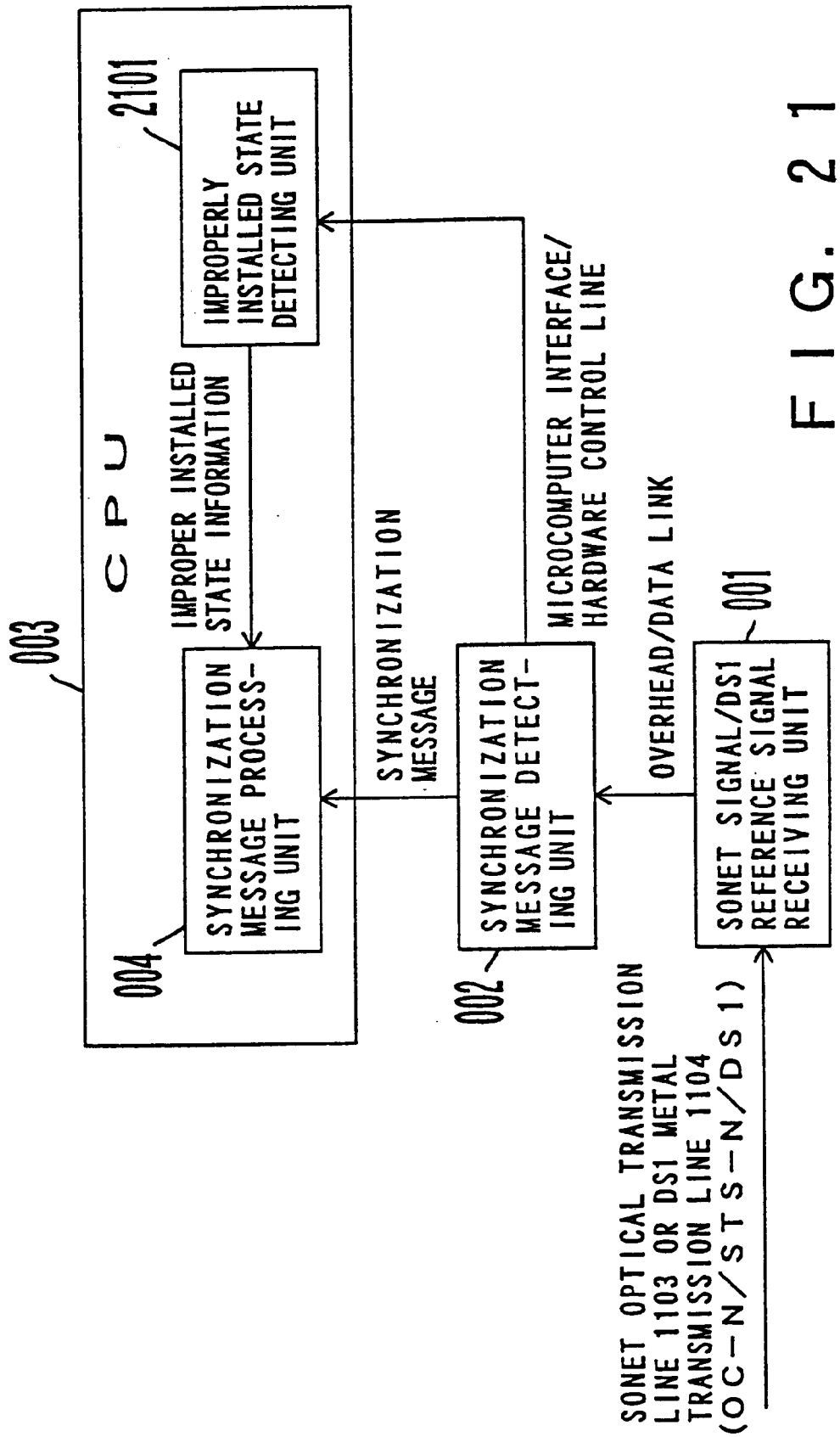
FIG. 21 is a schematic diagram showing the structure of a fifth preferred embodiment.

FIG. 21 is a schematic diagram showing the structure of the fifth preferred embodiment. As with the structure of the first preferred embodiment shown in FIG. 17, the structure shown in FIG. 21 is disposed in each of the transmission units 1101 that compose the synchronous transmission network shown in FIG. 11. For simplicity, in FIG. 21, similar units to those of the structure of the first preferred embodiment shown in FIG. 17 are denoted by similar reference numerals.

In the structure of the fifth preferred embodiment shown in FIG. 21, an improperly installed state detecting unit 2101 is accomplished as a function for which a CPU 003 executes a control program. The improperly installed state detecting unit 2101 monitors a predetermined code on a microcomputer interface to which a synchronization message detecting unit 002 is terminated. When the improperly installed state detecting unit 2101 detects the predetermined code, it determines that the synchronization message detecting unit 002 has been properly installed. When the improperly installed state detecting unit 1701 detects other than the predetermined code, it determines that the synchronization message detecting unit 002 has been improperly installed, and sends improperly installed state information to a synchronization message processing unit 004.

When the synchronization message processing unit 004 receives the improperly installed state information from the improperly installed state detecting unit 2101, the synchronization message processing unit 004 prohibits a clock reference corresponding to a synchronization message detected by the synchronization message detecting unit 002 determined as an improperly installed unit from being selected.

With the above-described control operation, when a synchronization message "DUS" (see FIG. 16) that represents the prohibition of the use of the clock reference has been received from the adjacent transmission unit 1101, since this signal is prevented from being selected as the clock reference, the above-described third problem can be solved.

Instead of the microcomputer interface, the above-described hardware control line may be used.

As a method for prohibiting a clock reference from being selected, the same method as the first preferred embodiment can be used.

In addition, as with the first preferred embodiment, the control operation is executed only when the mode for processing a synchronization message has been selected.

<Sixth Preferred Embodiment>

Based on the fundamental structures shown in FIGS. 11 to 16, a sixth preferred embodiment of the present invention will be described.

Figure 22:
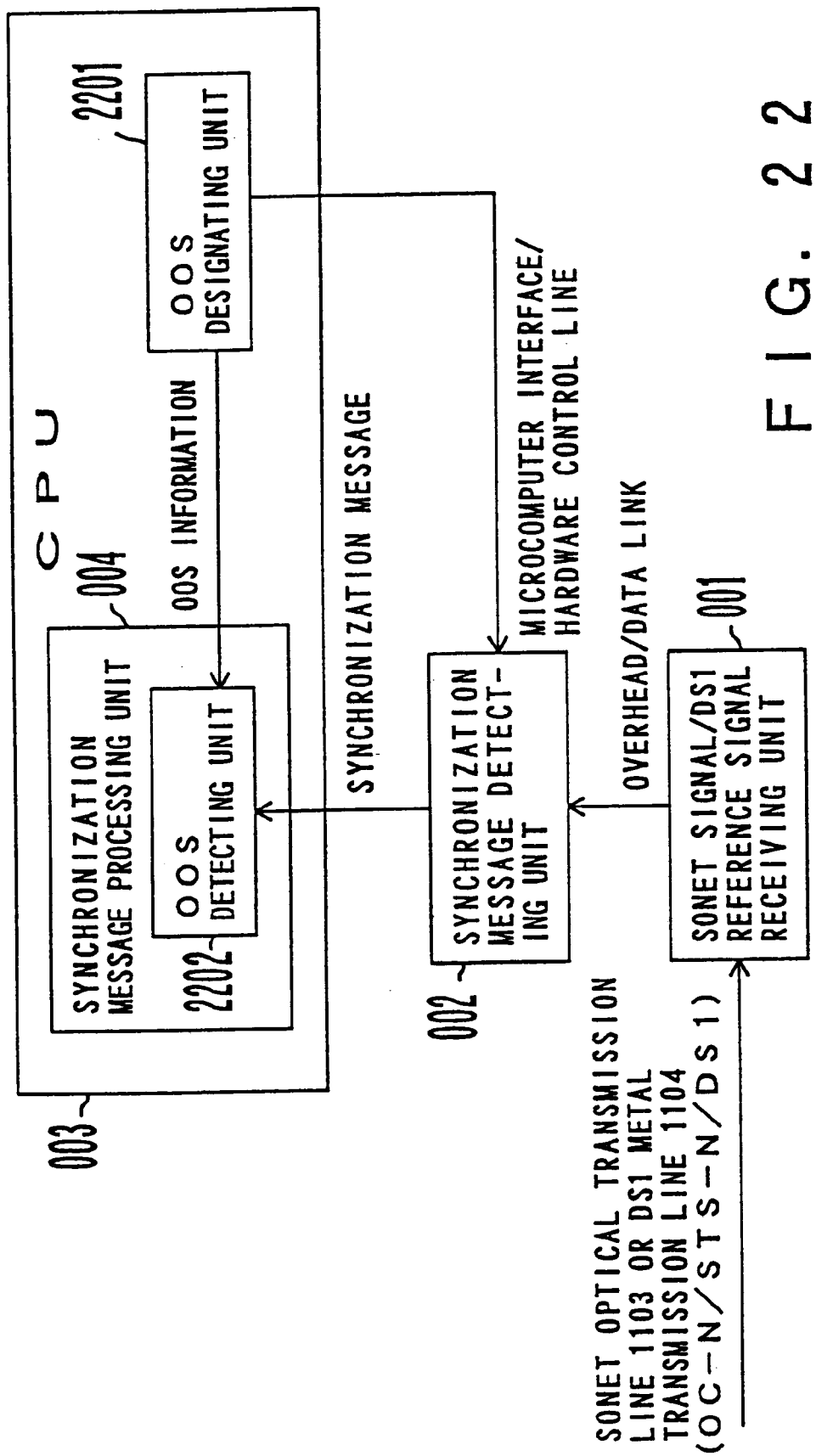
FIG. 22 is a schematic diagram showing the structure of a sixth preferred embodiment.

FIG. 22 is a schematic diagram showing the structure of the sixth preferred embodiment. As with the structure of the first preferred embodiment shown in FIG. 17, the structure shown in FIG. 22 is disposed in each of the transmission units 1101 that compose the synchronous transmission network shown in FIG. 11. For simplicity, in FIG. 22, similar units to those of the structure of the first preferred embodiment shown in FIG. 17 are denoted by similar reference numerals.

In the structure of the sixth preferred embodiment shown in FIG. 22, an OOS designating unit 2201 is accomplished as a function for which a CPU 003 executes a control program. When necessary, the OOS designating unit 2201 designates a synchronization message detecting unit 002 to the out-of-service state (OOS state) through a microcomputer interface or a hardware control line. In addition, the OOS designating unit 2201 sends OOS information to a synchronization message processing unit 004 that is accomplished as a function for which the CPU 003 executes a control program.

When an OOS detecting unit 2202 in the synchronization message processing unit 004 has received the OOS information from the OOS designating unit 2201, the OOS detecting unit 2202 prohibits a clock reference corresponding to a synchronization message detected by the synchronization message detecting unit 002 designated to the OOS state from being selected.

With the above-described control operation, when the synchronization message detecting unit 002 is in the OOS state, even if a unit fault alarm corresponding to a unit fault is not sent, an incorrect message can be prevented from being detected. Thus, the above-described fourth problem can be solved.

As a method for prohibiting a clock reference from being selected, the same method as the first preferred embodiment can be used.

In addition, as with the first preferred embodiment, the control operation is executed only when the mode for processing a synchronization message has been selected.

<Seventh Preferred Embodiment>

Based on the fundamental structures shown in FIGS. 11 to 16, a seventh preferred embodiment of the present invention will be described.

Figure 23:
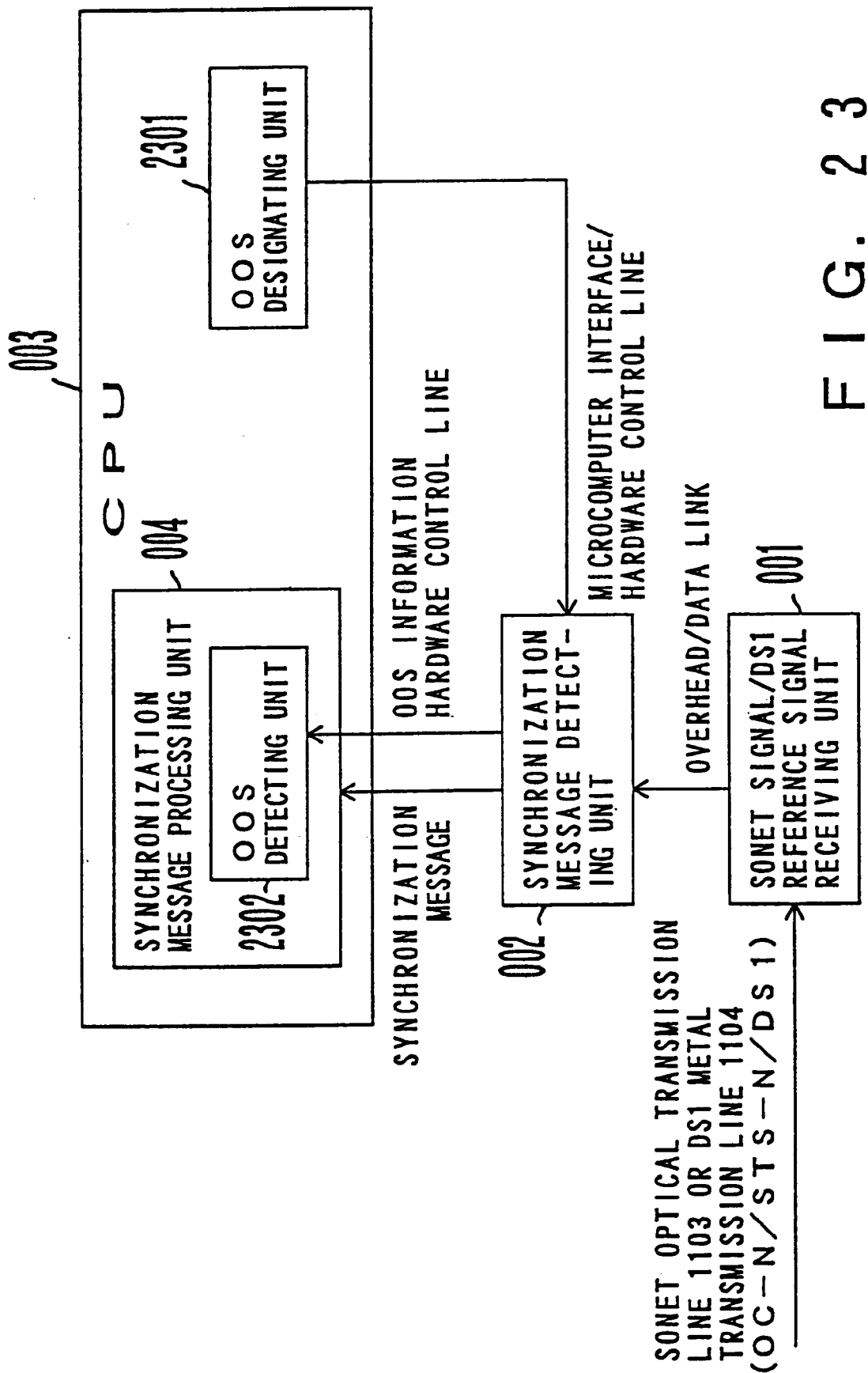
FIG. 23 is a schematic diagram showing the structure of a seventh preferred embodiment.

FIG. 23 is a schematic diagram showing the structure of the seventh preferred embodiment. As with the structure of the sixth preferred embodiment shown in FIG. 22, the structure shown in FIG. 23 is disposed in each of the transmission units 1101 that compose the synchronous transmission network shown in FIG. 11. For simplicity, in FIG. 23, similar units to those in the structure of the sixth preferred embodiment shown in FIG. 22 are denoted by similar reference numerals.

The difference between the structure of the seventh preferred embodiment shown in FIG. 23 and the structure of the sixth preferred embodiment shown in FIG. 22 is that after an OOS designating unit 2301 that is accomplished as a function for which a CPU 003 executes a control program has designated a synchronization message detecting unit 002 in the OOS state through a microcomputer interface or a hardware control line, a synchronization message detecting unit 002 sends OOS information that represents the OOS state thereof to a synchronization message processing unit 004 through a hardware control line that connects the synchronization message detecting unit 002 and the CPU 003. Thus, the OOS designating unit 2301 does not send the OOS information to the synchronization message processing unit 004.

When an OOS detecting unit 2302 in the synchronization message processing unit 004 receives the OOS information from the synchronization message detecting unit 002, the OOS detecting unit 2302 prohibits a clock reference corresponding to a synchronization message detected by the synchronization message detecting unit 002 designated to the OOS state from being selected.

With the above-described structure, as with the sixth preferred embodiment shown in FIG. 22, the above-described fourth problem can be solved.

<Eighth Preferred Embodiment>

Based on the fundamental structures shown in FIGS. 11 to 16, an eighth preferred embodiment of the present invention will be described.

Figure 24:
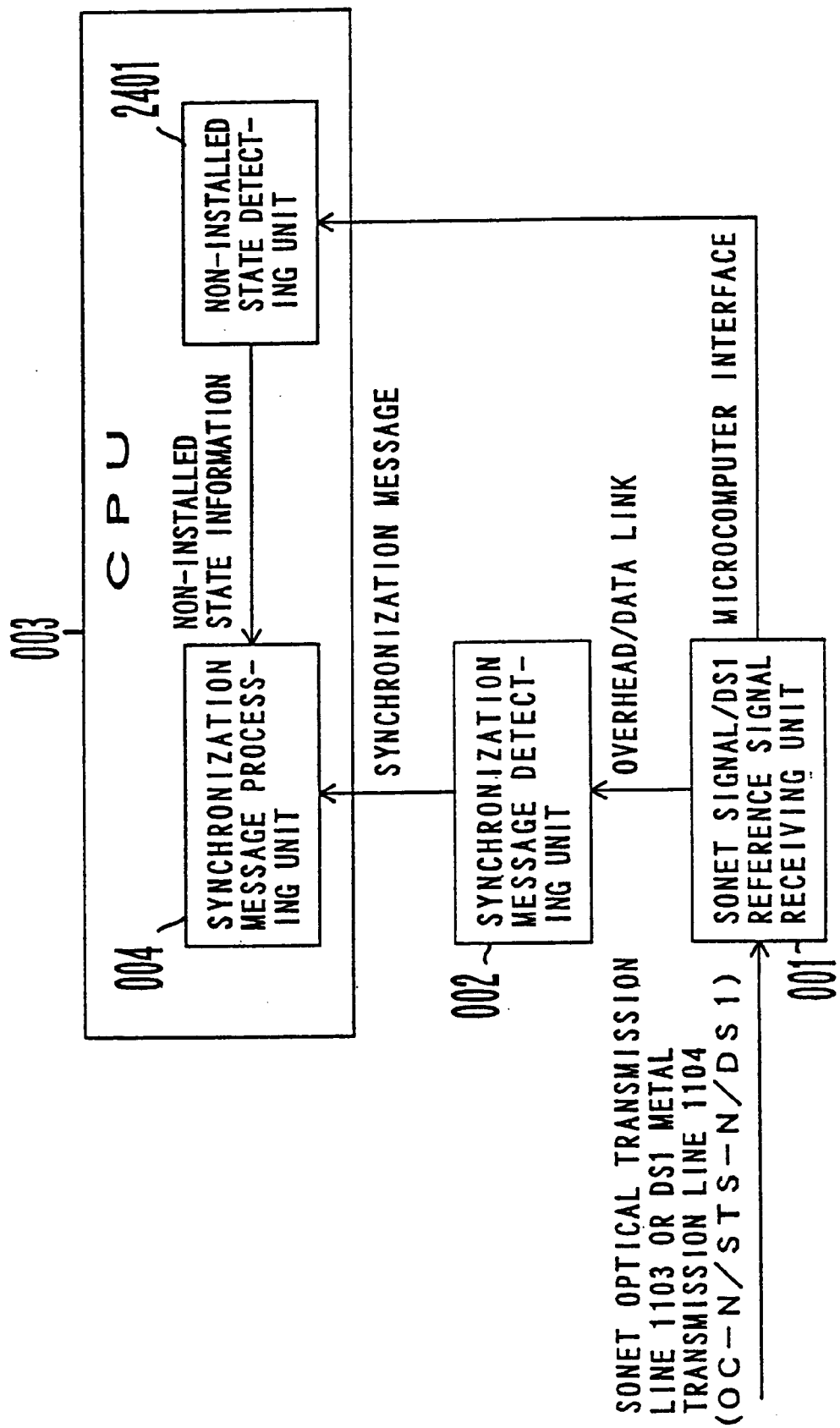
FIG. 24 is a schematic diagram showing the structure of an eighth preferred embodiment.

FIG. 24 is a schematic diagram showing the structure of the eighth preferred embodiment. As with the structure of the first preferred embodiment shown in FIG. 17, the structure shown in FIG. 24 is disposed in each of the transmission units 1101 that compose the synchronous transmission network shown in FIG. 11. For simplicity, in FIG. 24, similar units to those of the structure of the first preferred embodiment shown in FIG. 17 are denoted by similar reference numerals.

In the structure of the eighth preferred embodiment shown in FIG. 24, a non-installed state detecting unit 2401 is accomplished as a function for which a CPU 003 executes a control program. The non-installed state detecting unit 2401 monitors a predetermined code on a microcomputer interface to which a SONET signal/DS1 reference receiving unit 001 is terminated. When the non-installed state detecting unit 2401 detects the predetermined code, it determines that the SONET signal/DS1 reference signal receiving unit 001 has been installed. When the non-installed state detecting unit 2401 detects other than the predetermined code, it determined that the SONET signal/DS1 reference signal receiving unit 001 has not been installed, and sends non-installed state information to a synchronization message processing unit 004.

When the synchronization message processing unit 004 receives the non-installed state information from the non-installed state detecting unit 2401, the synchronization message processing unit 004 prohibits a clock reference corresponding to a synchronization message detected by the synchronization message detecting unit 002 through the SONET signal/DS1 reference signal receiving unit 001 determined as a non-installed unit from being selected.

With the above-described control operation, when a synchronization message "DUS" (see FIG. 16) that represents the prohibition of the use of the clock reference has been received from an adjacent transmission unit 1101, this received signal can be prevented from being selected as the clock reference. Thus, the above-described fifth problem can be solved.

As a method for prohibiting a clock reference from being selected, the same method as the first preferred embodiment can be used.

As with the first preferred embodiment, the control operation is executed only when the mode for processing the synchronization message has been selected.

<Ninth Preferred Embodiment>

Based on the fundamental structures shown in FIGS. 11 to 16, a ninth preferred embodiment of the present invention will be described.

Figure 25:
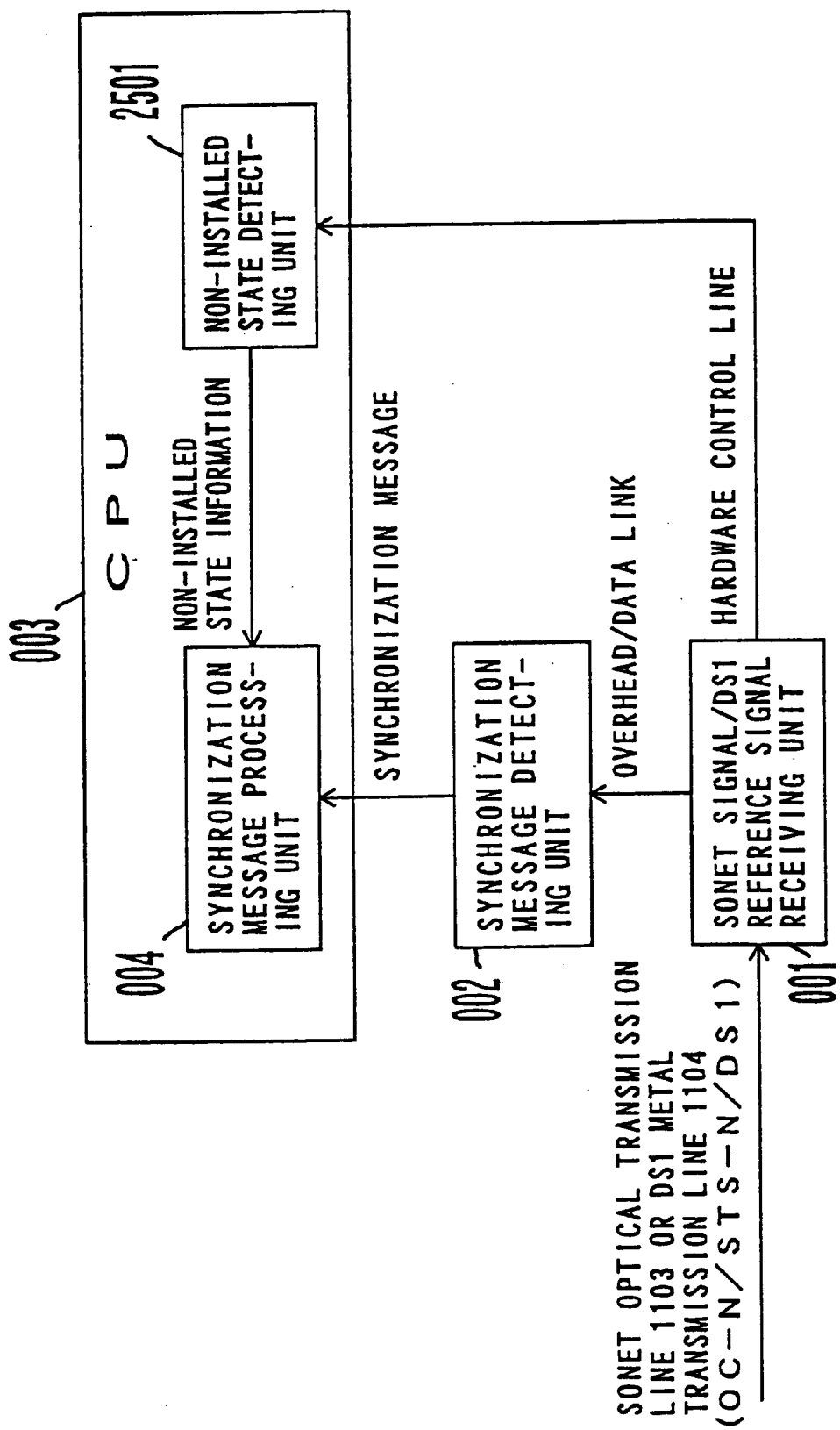
FIG. 25 is a schematic diagram showing the structure of a ninth preferred embodiment.

FIG. 25 is a schematic diagram showing the structure of the ninth preferred embodiment. As with the structure of the eighth preferred embodiment shown in FIG. 24, the structure shown in FIG. 25 is disposed in each of the transmission units that compose the synchronous transmission network shown in FIG. 11. For simplicity, in FIG. 25, similar units to those of the structure of the eighth preferred embodiment shown in FIG. 24 are denoted by similar reference numerals.

The difference between the structure of the ninth preferred embodiment shown in FIG. 25 and the structure of the eighth preferred embodiment shown in FIG. 24 is that a non-installed state detecting unit 2501 that is accomplished as a function for which a CPU 003 executes a control program detects the non-installed state of a SONET signal/DS1 reference signal receiving unit 001 through a hardware control line that connects the SONET signal/DS1 reference signal receiving unit 001 and the CPU 003, rather than a microcomputer interface.

In other words, when the level of a signal on the hardware control line is, for example, a low level, the non-installed state detecting unit 2501 determines that the SONET signal/DS1 reference signal receiving unit 001 has been installed. When the level of the signal on the hardware control line is, for example, a high level, the non-installed state detecting unit 2501 determines that the SONET signal/DS1 reference signal receiving unit 001 has not been installed and sends non-installed state information to a synchronization message processing unit 004.

With the above-described structure, as with the eighth preferred embodiment shown in FIG. 24, the above-described fifth problem can be solved.

<Tenth Preferred Embodiment>

Based on the fundamental structures shown in FIGS. 11 to 16, a tenth preferred embodiment will be described.

Figure 26:
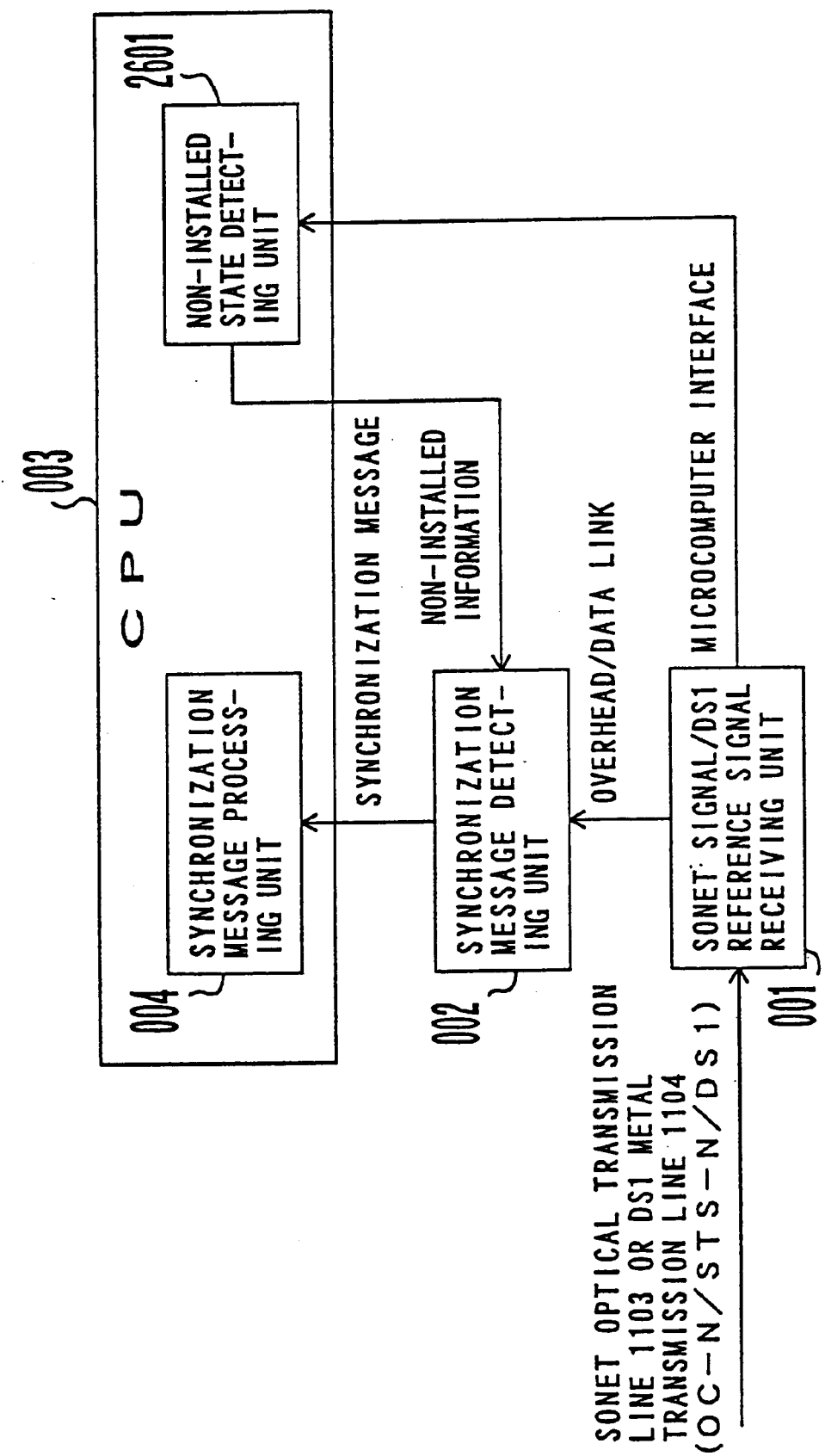
FIG. 26 is a schematic diagram showing the structure of a tenth preferred embodiment.

FIG. 26 is a schematic diagram showing the structure of the tenth preferred embodiment. As with the structure of the eighth preferred embodiment shown in FIG. 24, the structure shown in FIG. 26 is disposed in each of the transmission units 1101 that compose the synchronous transmission network shown in FIG. 11. For simplicity, in FIG. 26, similar units to those of the structure of the eighth preferred embodiment shown in FIG. 24 are denoted by similar reference numerals.

The difference between the structure of the tenth preferred embodiment shown in FIG. 26 and the structure of the eighth preferred embodiment shown in FIG. 24 is that when a non-installed state detecting unit 2601 that is accomplished as a function for which a CPU 003 executes a control program detects that a SONET signal/DS1 reference signal receiving unit 001 has not been installed through a microcomputer interface, the non-installed state detecting unit 2601 sends non-installed state information to a synchronization message detecting unit 002 rather than to a synchronization message processing unit 004.

When the synchronization message detecting unit 002 receives the non-installed state information, it designates the quality level represented by a synchronization message to a quality level "DUS" (see FIG. 16) that represents that the clock reference is prohibited from being used for controlling the synchronization.

Thus, the synchronization message processing unit 004 does not select a clock reference corresponding to the synchronization message.

With the above-described structure, as with the eighth preferred embodiment shown in FIG. 24, the above-described fifth problem can be solved.

<Eleventh Preferred Embodiment>

Based on the fundamental structures shown in FIGS. 11 to 16, an eleventh preferred embodiment will be described.

Figure 27:
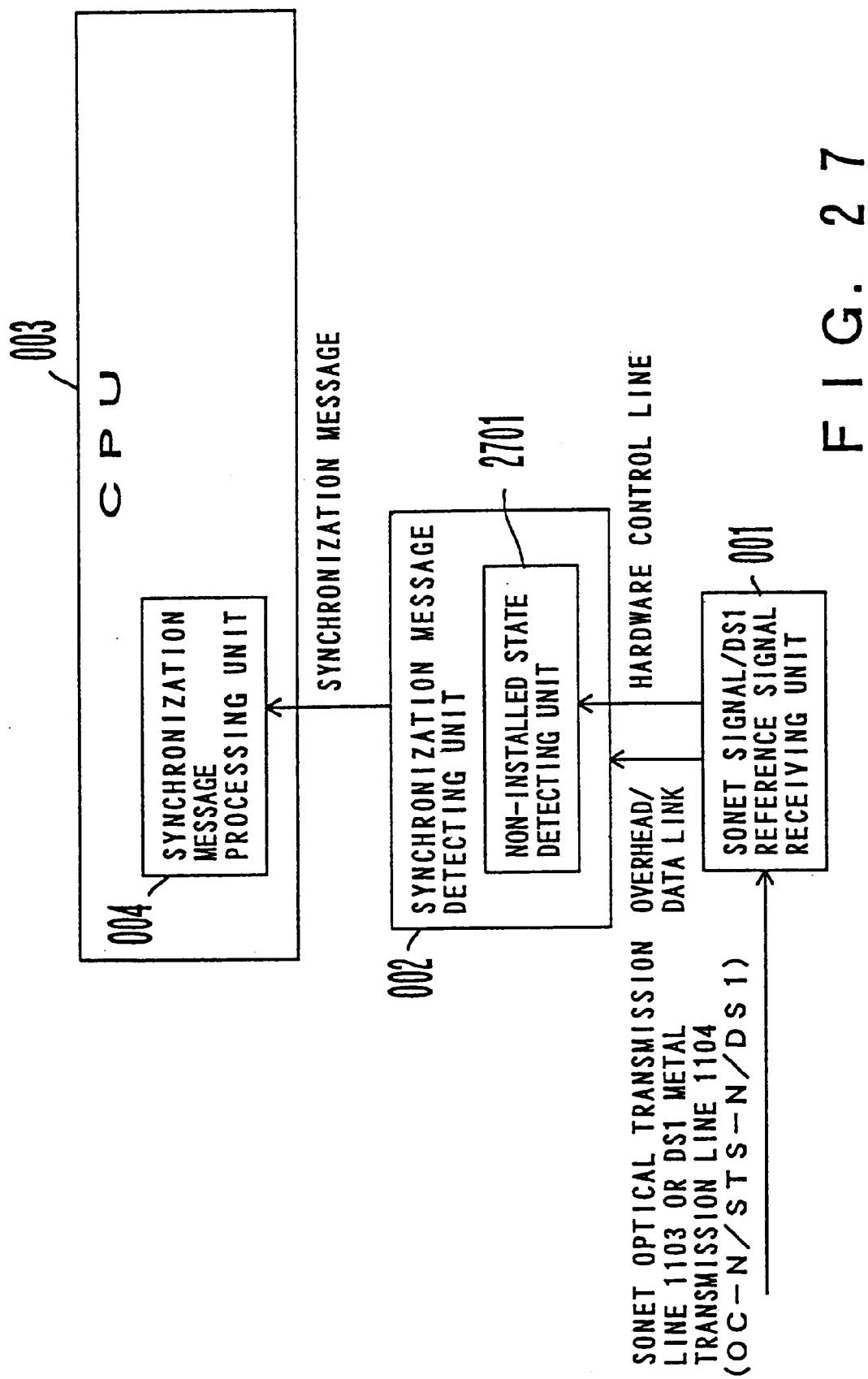
FIG. 27 is a schematic diagram showing the structure of an eleventh preferred embodiment.

FIG. 27 is a schematic diagram showing the structure of the eleventh preferred embodiment. As with the structure of the eighth preferred embodiment shown in FIG. 24, the structure shown in FIG. 27 is disposed in each of the transmission units 1101 that compose the synchronous transmission network shown in FIG. 11. For simplicity, in FIG. 27, similar units to those of the structure of the eighth preferred embodiment shown in FIG. 24 are denoted by similar reference numerals.

In the eleventh preferred embodiment shown in FIG. 27, when the level of a signal on a hardware control line that connects a synchronization message detecting unit 002 and a SONET signal/DS1 reference signal receiving unit 001 is, for example, a low level, a non-installed state detecting unit 2701 in a synchronization message detecting unit 002 determines that the SONET signal/DS1 reference signal receiving unit 001 has been installed. When the level of the signal is, for example, a high level, the non-installed state detecting unit 2701 determines that the SONET signal/DS1 reference signal receiving unit 001 has not been installed.

When the non-installed state detecting unit 2701 has determined that the SONET signal/DS1 reference signal receiving unit 001 has been installed, as with the tenth preferred embodiment, the synchronization message detecting unit 002 designates the quality level represented by a synchronization message to a quality level "DUS" that represents that the clock reference is prohibited from being used for controlling the synchronization.

Thus, the synchronization message processing unit 004 does not select a clock reference corresponding to the synchronization message.

With the above-described structure, as with the eighth preferred embodiment shown in FIG. 24, the above-described fifth problem can be solved.

In addition, as with the first preferred embodiment, the control operation is executed only when the mode for processing a synchronization message has been selected.

<Twelfth Preferred Embodiment>

Based on the fundamental structures shown in FIGS. 11 to 16, a twelfth preferred embodiment will be described.

Figure 28:
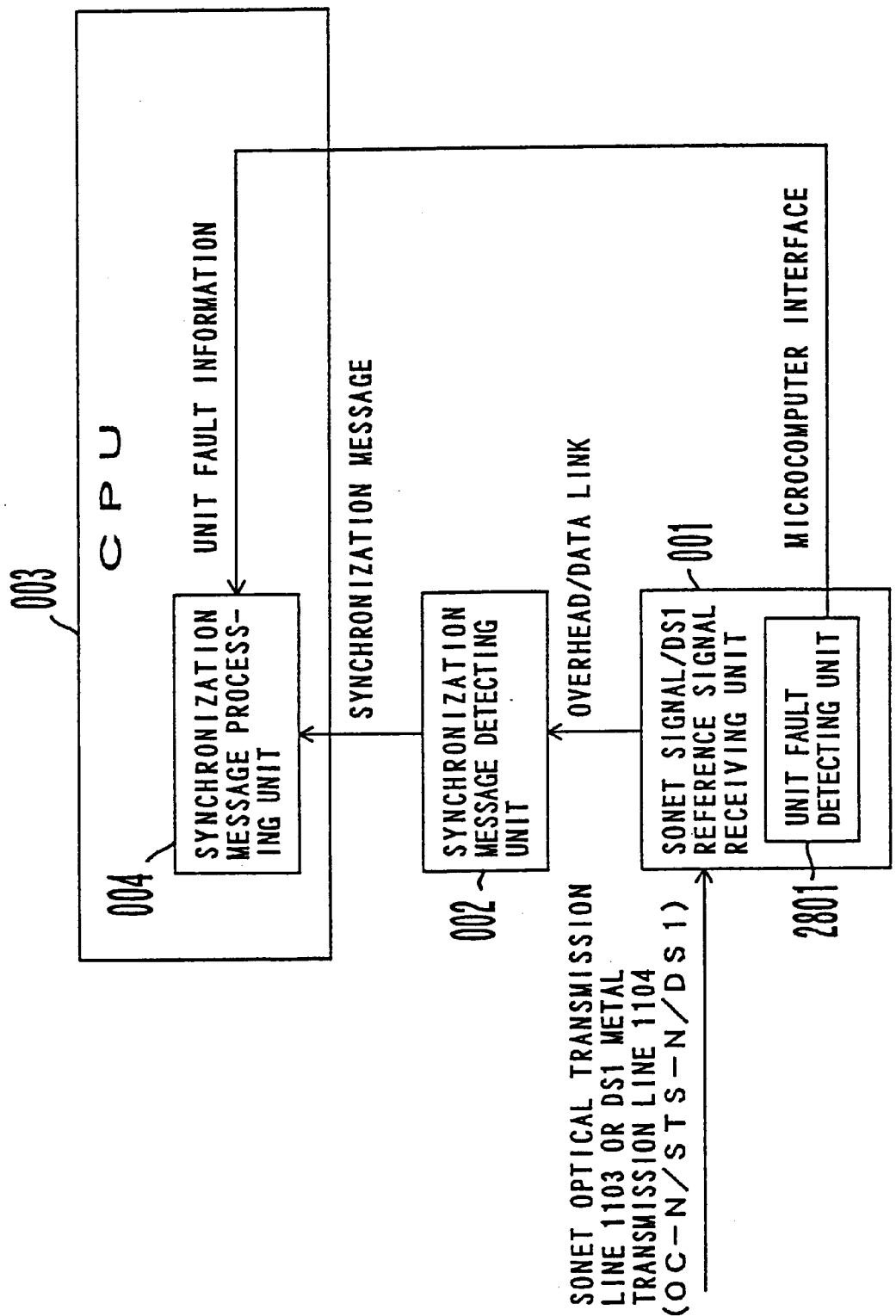
FIG. 28 is a schematic diagram showing the structure of a twelfth preferred embodiment.

FIG. 28 is a schematic diagram showing the structure of the twelfth preferred embodiment. As with the structure of the first preferred embodiment shown in FIG. 17, the structure shown in FIG. 28 is disposed in each of the transmission units 1101 that compose the synchronous transmission network shown in FIG. 11. For simplicity, in FIG. 28, similar units to those of the structure of the first preferred embodiment shown in FIG. 17 are denoted by similar reference numerals.

In the structure of the twelfth preferred embodiment shown in FIG. 28, a unit fault detecting unit 2801 in a SONET signal/DS1 reference signal receiving unit 001 monitors the unit fault state of the SONET signal/DS1 reference signal receiving unit 001. When the unit fault detecting unit 2801 detects the fault state of the SONET signal/DS1 reference signal receiving unit 001, the unit fault detecting unit 2801 sends unit fault information to a microcomputer interface to which the SONET signal/DS1 reference signal receiving unit 001 is terminated.

After a CPU 003 receives the unit fault information, the unit fault information is sent to a synchronization message processing unit 004, that is accomplished as a function for which the CPU 003 executes a control program.

When the synchronization message processing unit 004 receives the unit fault information, it prohibits a clock reference corresponding to a synchronization message detected by the synchronization message detecting unit 002 through the SONET signal/DS1 reference signal receiving unit 001 determined as being a faulty unit, from being selected.

With the above-described control operation, when a synchronization message "DUS" (see FIG. 16) that represents the prohibition of the use of the clock reference has been received from an adjacent transmission unit 1101, since this signal is prevented from being selected as the clock reference, the above-described sixth problem can be solved.

Instead of the microcomputer interface, the above-described hardware control line may be used.

As a method for prohibiting a clock reference from being selected, the same method as the first preferred embodiment can be used.

In addition, as with the first preferred embodiment, the control operation is executed only when the mode for processing a synchronization message has been selected.

<Thirteenth Preferred Embodiment>

Based on the fundamental structures shown in FIGS. 11 to 16, a thirteenth preferred embodiment will be described.

Figure 29:
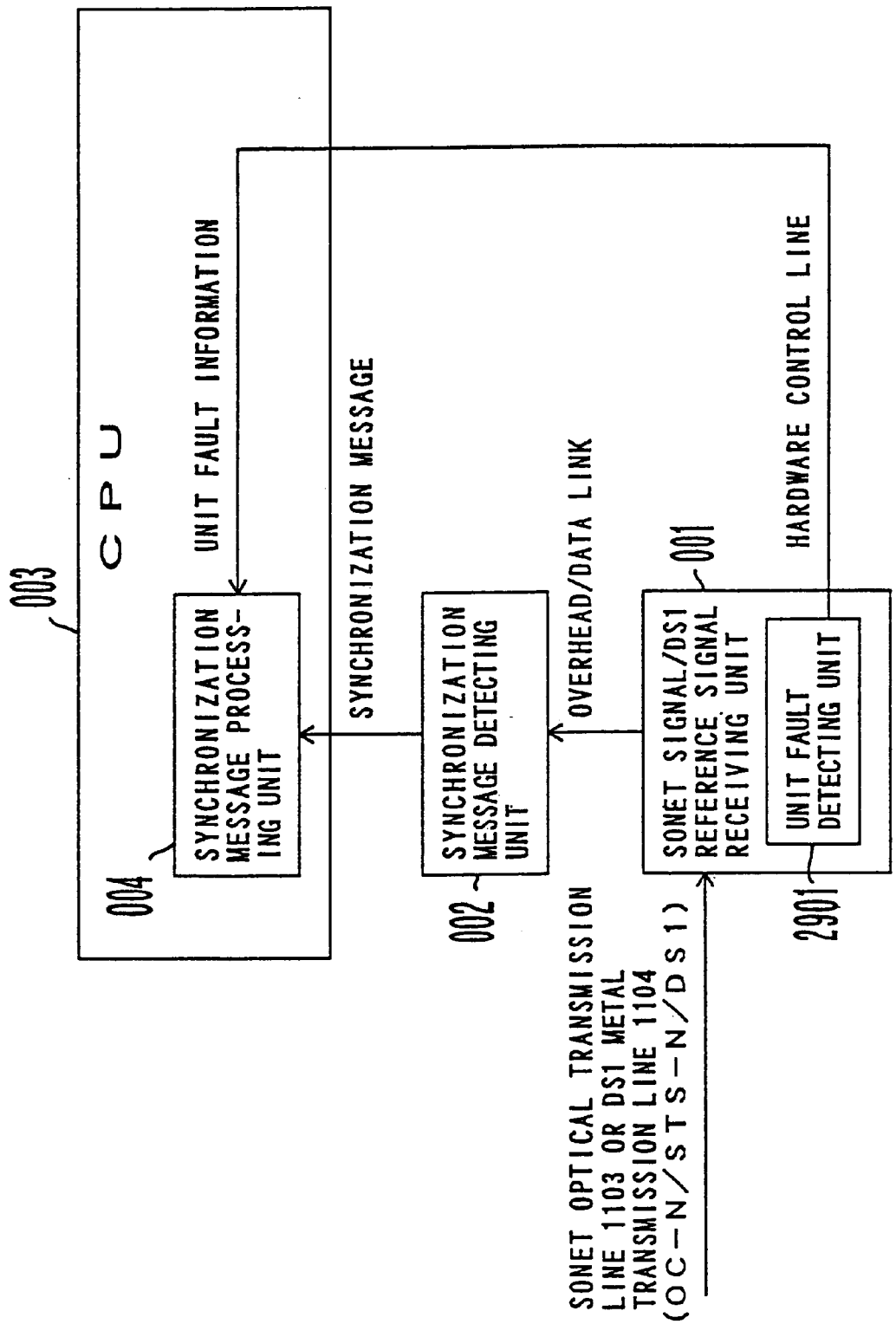
FIG. 29 is a schematic diagram showing the structure of a thirteenth preferred embodiment.

FIG. 29 is a schematic diagram showing the structure of the thirteenth preferred embodiment. As with the structure of the twelfth preferred embodiment shown in FIG. 28, the structure shown in FIG. 29 is disposed in each of the transmission units 1101 that compose the synchronous transmission network shown in FIG. 11. For simplicity, in FIG. 29, similar units to those of the structure of the twelfth preferred embodiment shown in FIG. 28 are denoted by similar reference numerals.

The difference between the structure of the thirteenth preferred embodiment shown in FIG. 29 and the structure of the twelfth preferred embodiment shown in FIG. 28 is that a unit fault detecting unit 2901 in a SONET signal/DS1 reference signal receiving unit 001 sends unit fault information that represents the fault state of the SONET signal/DS1 reference signal receiving unit 001 to a CPU 003 through a hardware control line that connects the SONET signal/DS1 reference signal receiving unit 001 and the CPU 003, rather than through a microcomputer interface.

In other words, when a fault does not take place in the SONET signal/DS1 reference signal receiving unit 001, the unit fault detecting unit 2901 designates a signal on the hardware control line to be, for example, a low level. When a fault takes place in the SONET signal/DS1 reference signal receiving unit 001, the unit fault detecting unit 2901 designates the signal to be, for example, a high level.

When the level of the signal on the hardware control line has changed from the low level to the high level, a synchronization message processing unit 004 that is accomplished as a function for which the CPU 003 executes a control program determines that unit fault information has been received and prohibits a clock reference corresponding to a synchronization message detected by the synchronization message detecting unit 002 through the SONET signal/DS1 reference signal receiving unit 001 determined as being a faulty unit, from being selected.

With the above-described structure, as with the twelfth preferred embodiment shown in FIG. 28, the above-described sixth problem can be solved.

<Fourteenth Preferred Embodiment>

Based on the fundamental structures shown in FIGS. 11 to 16, a fourteenth preferred embodiment will be described.

Figure 30:
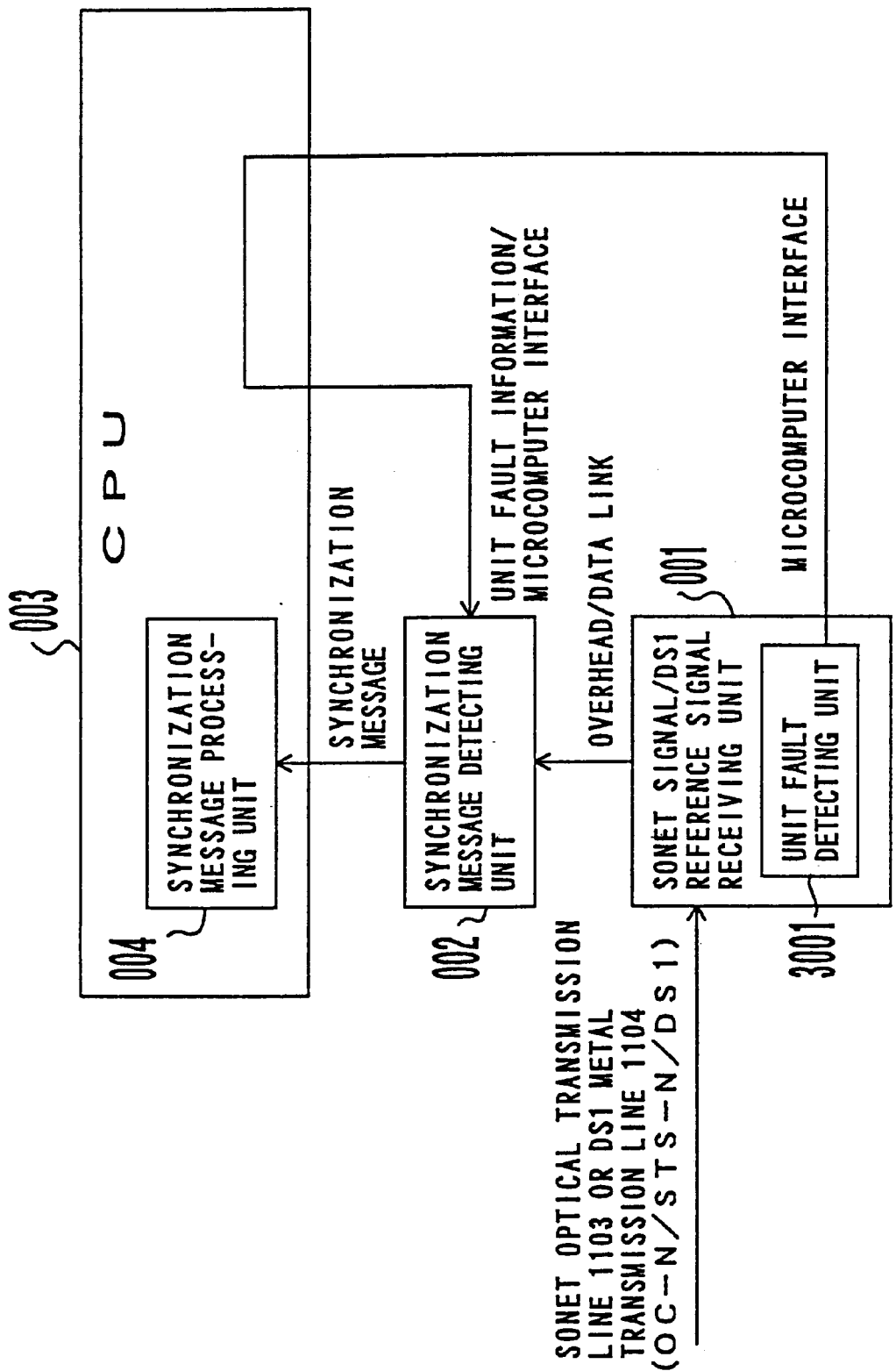
FIG. 30 is a schematic diagram showing the structure of a fourteenth preferred embodiment.

FIG. 30 is a schematic diagram showing the structure of the fourteenth preferred embodiment. As with the structure of the twelfth preferred embodiment shown in FIG. 28, the structure shown in FIG. 30 is disposed in each of the transmission units 1101 that compose the synchronous transmission network shown in FIG. 11. For simplicity, in FIG. 30, similar units to those of the structure of the twelfth preferred embodiment shown in FIG. 28 are denoted by similar reference numerals.

The difference between the structure of the fourteenth preferred embodiment shown in FIG. 30 and the structure of the twelfth preferred embodiment shown in FIG. 28 is that after a unit fault detecting unit 3001 in a SONET signal/DS1 reference signal receiving unit 001 temporarily sends unit fault information to a CPU 003 through a microcomputer interface, the CPU 003 sends the unit fault information to a synchronization message detecting unit 002.

When the synchronization message detecting unit 002 receives the unit fault information, it designates the quality level represented by the synchronization message to a quality level "DUS" (see FIG. 16) that represents that the clock reference is prohibited from being used for controlling the synchronization.

Thus, the synchronization message processing unit 004 does not select a clock reference corresponding to the synchronization message.

With the above-described structure, as with the twelfth preferred embodiment shown in FIG. 28, the above-described sixth problem can be solved.

In addition, as with the first preferred embodiment, the control operation is executed only when the mode for processing a synchronization message has been selected.

<Fifteenth Preferred Embodiment>

Based on the fundamental structures shown in FIGS. 11 to 16, a fifteenth preferred embodiment will be described.

Figure 31:
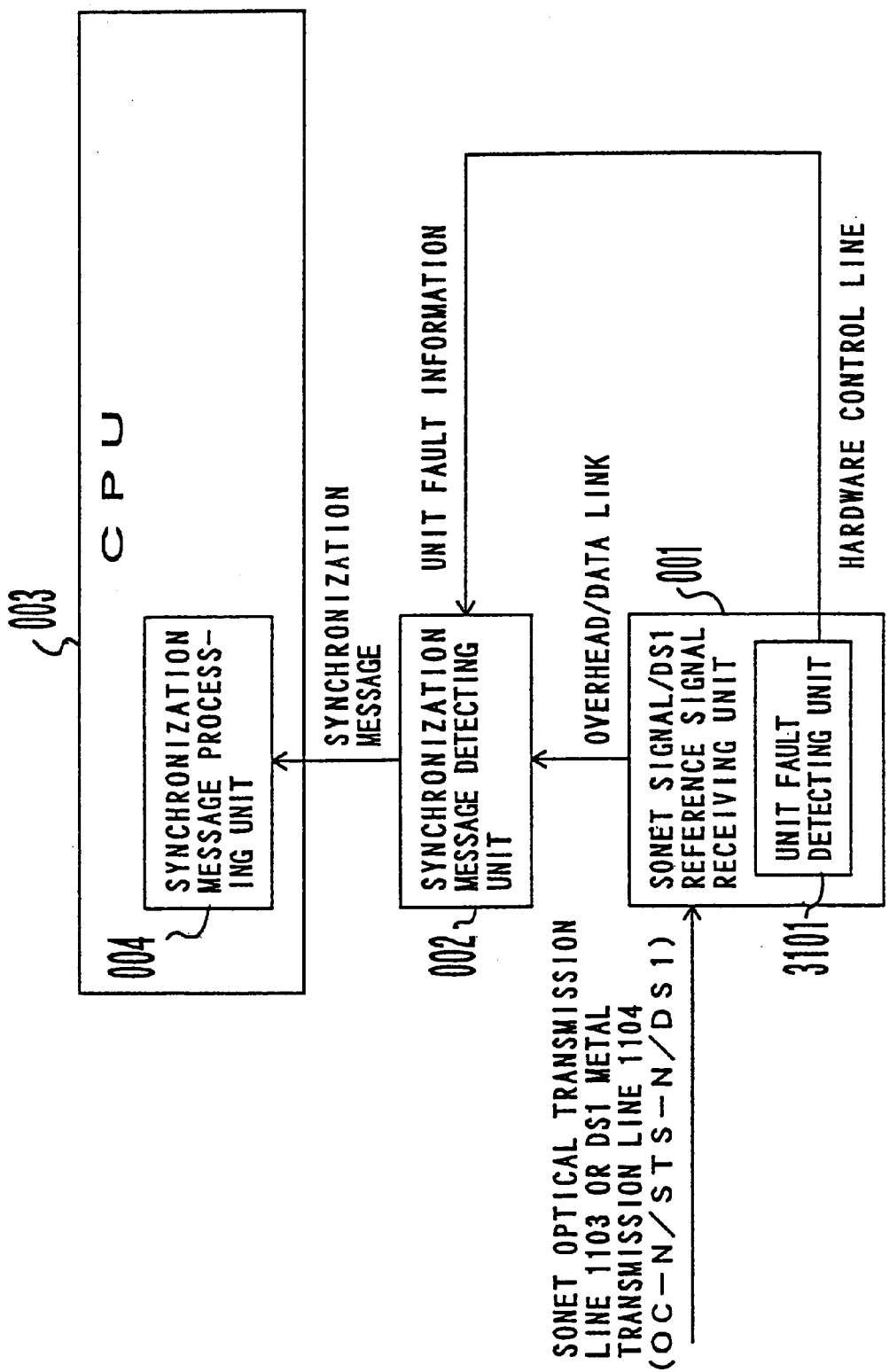
FIG. 31 is a schematic diagram showing the structure of a fifteenth preferred embodiment.

FIG. 31 is a schematic diagram showing the structure of the fifteenth preferred embodiment. As with the structure of the fourteenth preferred embodiment shown in FIG. 30, the structure shown in FIG. 31 is disposed in each of the transmission units 1101 that compose the synchronous transmission network shown in FIG. 11. For simplicity, in FIG. 31, similar units to those of the structure of the fourteenth preferred embodiment shown in FIG. 30 are denoted by similar reference numerals.

The difference between the structure of the fifteenth preferred embodiment shown in FIG. 31 and the structure of the fourteenth preferred embodiment shown in FIG. 30 is that a unit fault detecting unit 3101 in a SONET signal/DS1 reference signal receiving unit 001 directly sends unit fault information to a synchronization message detecting unit 002 through a hardware control line, rather than a microcomputer interface and a CPU 003.

In other words, when no fault takes place in the SONET signal/DS1 reference signal receiving unit 001, the unit fault detecting unit 3101 designates a signal on the hardware control line to be, for example, a low level. When a fault takes place in the SONET signal/DS1 reference signal receiving unit 001, the unit fault detecting unit 3101 designates the signal to be, for example, a high level.

When the signal level of the hardware control line has changed from the low level to the high level, the synchronization message detecting unit 002 determines that unit fault information has been received and designates the quality level represented by the synchronization message to a quality level "DUS" that represents that the clock reference is prohibited from being used for controlling the synchronization.

Thus, the synchronization message processing unit 004 does not select a clock reference corresponding to the synchronization message.

With the above-described structure, as with the twelfth preferred embodiment shown in FIG. 28, the above-described sixth problem can be solved.

<Sixteenth Preferred Embodiment>

Based on the fundamental structures shown in FIGS. 11 to 16, a sixteenth preferred embodiment will be described.

Figure 32:
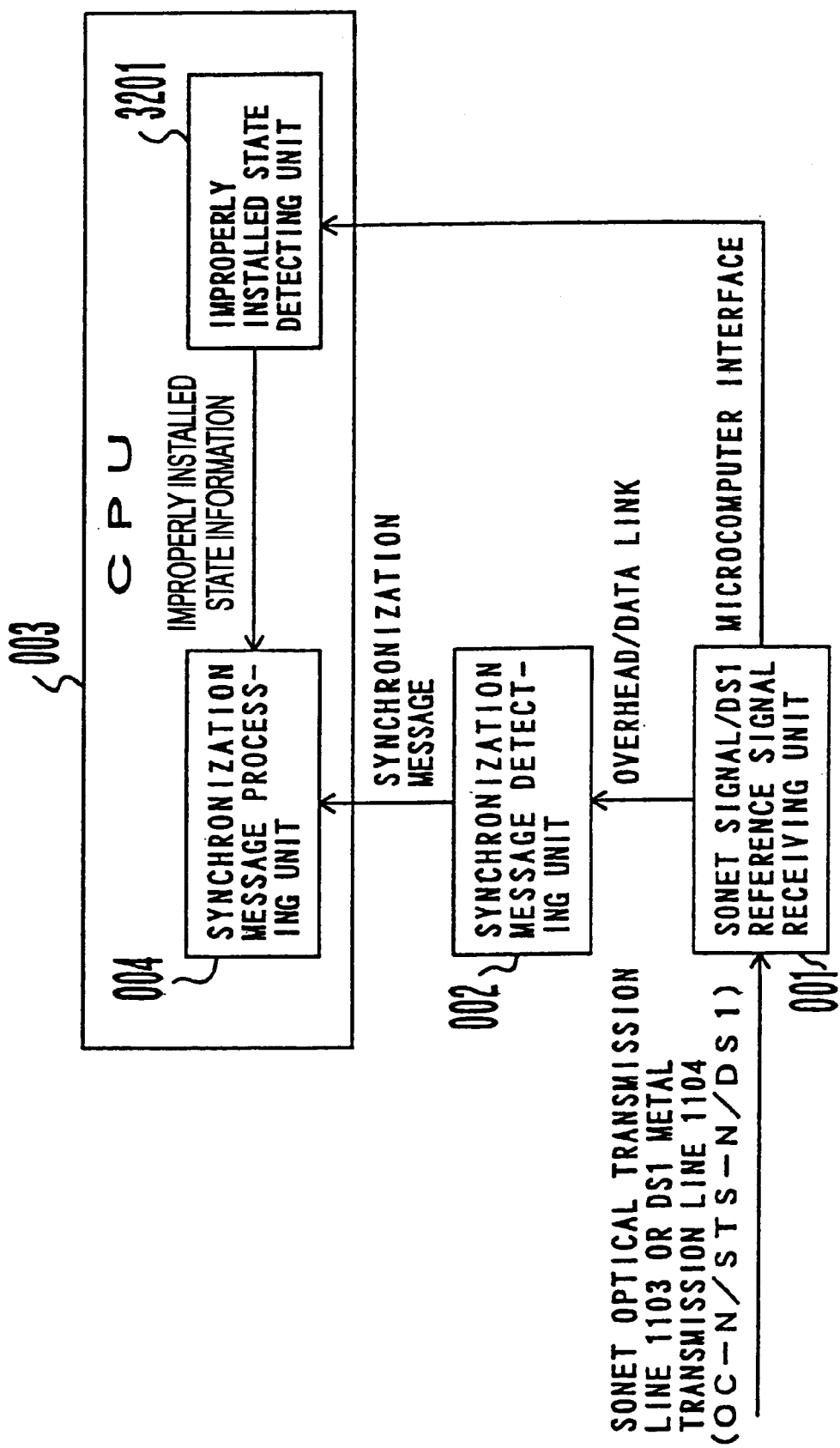
FIG. 32 is a schematic diagram showing the structure of a sixteenth preferred embodiment.

FIG. 32 is a schematic diagram showing the structure of the sixteenth preferred embodiment. As with the structure of the first preferred embodiment shown in FIG. 17, the structure shown in FIG. 32 is disposed in each of the transmission units 1101 that compose the synchronous transmission network shown in FIG. 11. For simplicity, in FIG. 32, similar units to those of the structure of the first preferred embodiment shown in FIG. 17 are denoted by similar reference numerals.

In the structure of the sixteenth preferred embodiment shown in FIG. 32, an improperly installed state detecting unit 3201 is accomplished as a function for which a CPU 003 executes a control program. The improperly installed state detecting unit 3201 monitors a predetermined code on a microcomputer interface to which a SONET signal/DS1 reference signal receiving unit 001 is terminated. When the improperly installed state detecting unit 3201 detects the predetermined code, it determines that the SONET signal/DS1 reference signal receiving unit 001 has been properly installed. When the improperly installed state detecting unit 3201 detects other than the predetermined code, it determines that the SONET signal/DS1 reference signal receiving unit 001 has been improperly installed, and sends improperly installed state information to a synchronization message processing unit 004.

When the synchronization message processing unit 004 receives the improperly installed state information from the improperly installed state detecting unit 3201, the synchronization message processing unit 004 prohibits a clock reference corresponding to a synchronization message detected by the synchronization message detecting unit 002 through the SONET signal/DS1 reference signal receiving unit 001 determined as an improperly installed unit, from being selected.

With the above-described control operation, when a synchronization message "DUS" (see FIG. 16) that represents the prohibition of the use of the clock reference has been received from the adjacent transmission unit 1101, since the signal is prevented from being selected as the clock reference, the above-described seventh problem can be solved.

Instead of the microcomputer interface, the above-described hardware control line may be used.

As a method for prohibiting a clock reference from being selected, the same method as the first preferred embodiment can be used.

In addition, as with the first preferred embodiment, the control operation is executed only when the mode for processing a synchronization message has been selected.

<Seventeenth Preferred Embodiment>

Based on the fundamental structures shown in FIGS. 11 to 16, a seventeenth preferred embodiment will be described.

FIG. 33 is a schematic diagram showing the structure of the seventeenth preferred embodiment. As with the structure of the sixteenth preferred embodiment shown in FIG. 32, the structure shown in FIG. 33 is disposed in each of the transmission units 1101 that compose the synchronous transmission network shown in FIG. 11. For simplicity, in FIG. 33, similar units to those of the structure of the sixteenth preferred embodiment shown in FIG. 32 are denoted by similar reference numerals.

The difference between the structure of the seventeenth preferred embodiment shown in FIG. 33 and the structure of the sixteenth preferred embodiment shown in FIG. 32 is that when an improperly installed state detecting unit 3301 that is accomplished as a function for which a CPU 003 executes a control program detects the improperly installed state of a SONET signal/DS1 reference signal receiving unit 001 through a microcomputer interface, the improperly installed state detecting unit 3301 sends improperly installed state information to a synchronization message detecting unit 002, rather than to a synchronization message processing unit 004.

When the synchronization message detecting unit 002 receives the improperly installed state information, it designates the quality level represented by the synchronization message to a quality level "DUS" (see FIG. 16) that represents that the clock reference is prohibited from being used for controlling the synchronization.

Thus, the synchronization message processing unit 004 does not select a clock reference corresponding to the synchronization message.

With the above-described structure, as with the sixteenth preferred embodiment shown in FIG. 32, the above-described seventh problem can be solved.

<Eighteenth Preferred Embodiment>

Based on the fundamental structures shown in FIGS. 11 to 16, an eighteenth preferred embodiment will be described.

Figure 34:
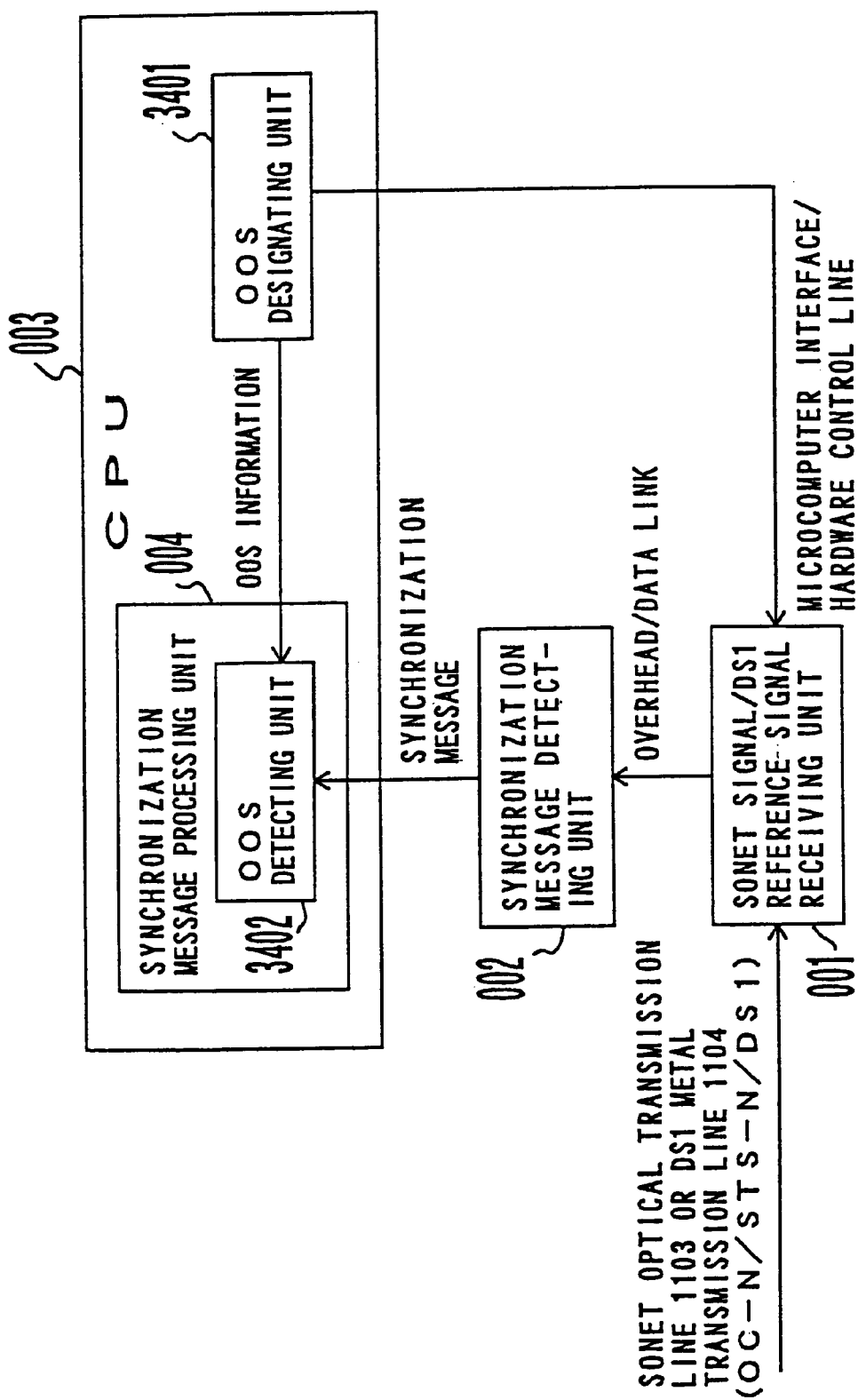
FIG. 34 is a schematic diagram showing the structure of an eighteenth preferred embodiment.

FIG. 34 is a schematic diagram showing the structure of the eighteenth preferred embodiment. As with the structure of the first preferred embodiment shown in FIG. 17, the structure shown in FIG. 34 is disposed in each of the transmission units 1101 that compose the synchronous transmission network shown in FIG. 11. For simplicity, in FIG. 34, similar units to those of the structure of the First preferred embodiment shown in FIG. 17 are denoted by similar reference numerals.

In the structure of the eighteenth preferred embodiment shown in FIG. 34, an OOS designating unit 3401 is accomplished as a function for which a CPU 003 executes a control program. Where necessary, the OOS designating unit 3401 designates a SONET signal/DS1 reference signal receiving unit 001 to the out-of-service (OOS) state through a microcomputer interface or a hardware control line. In addition, the OOS designating unit 3401 sends OOS information to a synchronization message processing unit 004 that is accomplished as a function for which the CPU 003 executes a control program.

When an OOS detecting unit 3402 in the synchronization message processing unit 004 receives OOS information from the OOS designating unit 3401, the OOS detecting unit 3402 prohibits a clock reference corresponding to a synchronization message detected by the synchronization message detecting unit 002 through the SONET signal/DS1 reference signal receiving unit 001 designated in the OOS state, from being selected.

With the above-described control operation, when the SONET signal/DS1 reference signal receiving unit 001 is in the OOS state, even if a unit fault alarm corresponding to the unit fault state of the SONET signal/DS1 reference signal receiving unit 001 is not received, an incorrect message can be prevented from being detected. Thus, the above-described eighth problem can be solved.

As a method for prohibiting a clock reference from being selected, the same method as the first preferred embodiment can be used.

In addition, as with the first preferred embodiment, the control operation is executed only when the mode for processing a synchronization message has been selected.

<Nineteenth Preferred Embodiment>

Based on the fundamental structures shown in FIGS. 11 to 16, a nineteenth preferred embodiment will be described.

FIG. 35 is a schematic diagram showing the structure of the nineteenth preferred embodiment. As with the structure of the eighteenth preferred embodiment shown in FIG. 34, the structure shown in FIG. 35 is disposed in each of the transmission units 1101 that compose the synchronous transmission network shown in FIG. 11. For simplicity, in FIG. 35, similar units to those of the structure of the eighteenth preferred embodiment shown in FIG. 34 are denoted by similar reference numerals.

The difference between the structure of the nineteenth preferred embodiment shown in FIG. 35 and the structure of the eighteenth preferred embodiment shown in FIG. 34 is that after an OOS designating unit 3501 that is accomplished as a function for which a CPU 003 executes a control program has designated a SONET signal/DS1 reference signal receiving unit 001 to the OOS state through a microcomputer interface or a hardware control line, a SONET signal/DS1 reference signal receiving unit 001 sends OOS information that represents that it is in the OOS state to a synchronization message processing unit 004 through a hardware control line that connects the SONET signal/DS1 reference signal receiving unit 001 and the CPU 003. Thus, the OOS designating unit 3501 does not send the OOS information to the synchronization message processing unit 004.

When an OOS detecting unit 3502 in the synchronization message processing unit 004 has received the OOS information from the SONET signal/DS1 reference signal receiving unit 001, an OOS detecting unit 3502 prohibits a clock reference corresponding to the synchronization message detected by the synchronization message detecting unit 002 through the SONET signal/DS1 reference signal receiving unit 001 designated in the OOS state, from being selected.

With the above-described structure, as with the eighteenth preferred embodiment shown in FIG. 34, the above-described eighth problem can be solved.

In addition, as with the first preferred embodiment, the control operation is executed only when the mode for processing a synchronization message has been selected.

<Twentieth Preferred Embodiment>

Based on the fundamental structures shown in FIGS. 11 to 16, a twentieth preferred embodiment will be described.

Figure 36:
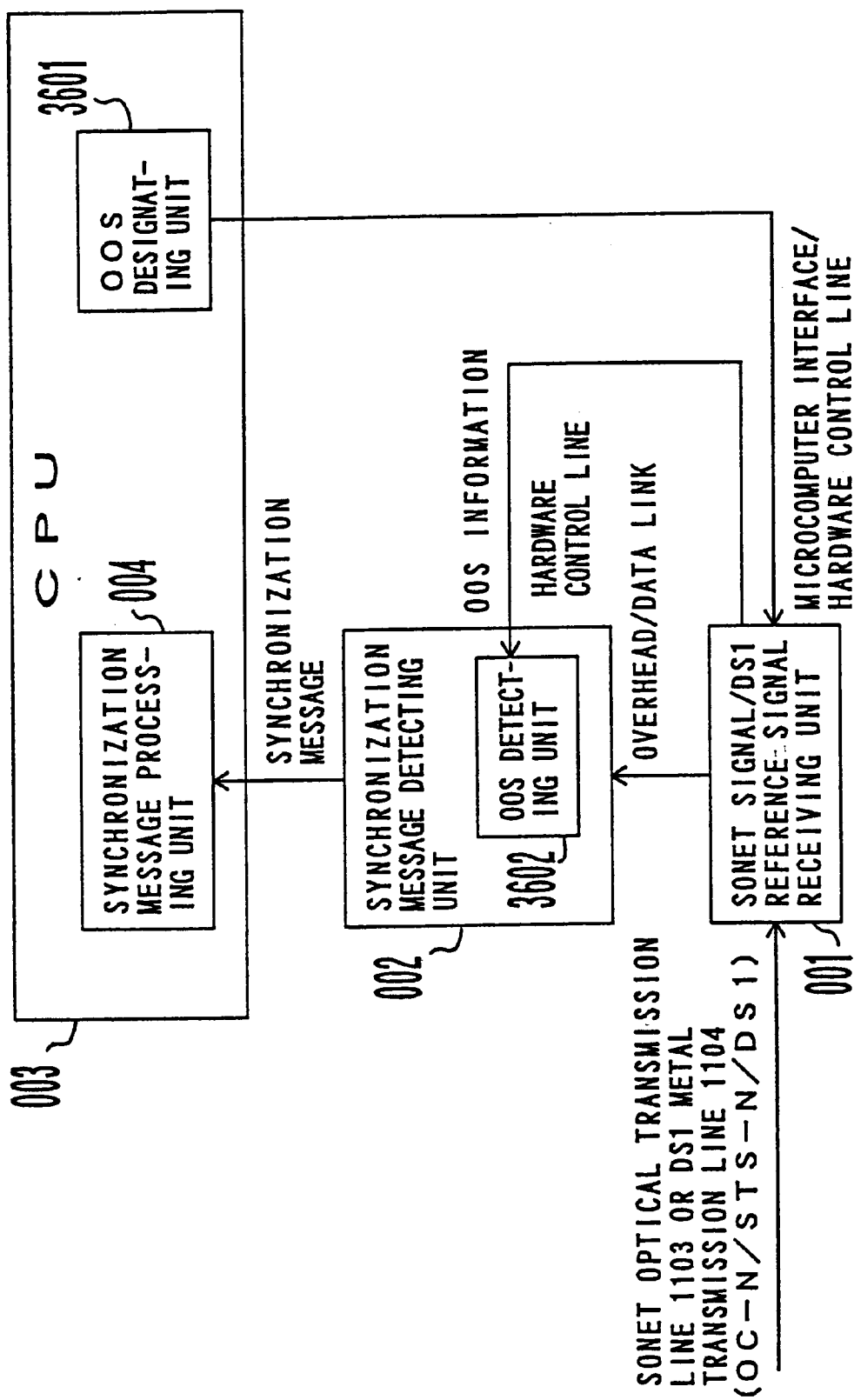
FIG. 36 is a schematic diagram showing the structure of a twentieth preferred embodiment.

FIG. 36 is a schematic diagram showing the structure of the twentieth preferred embodiment. As with the structure of the nineteenth preferred embodiment shown in FIG. 35, the structure shown in FIG. 36 is disposed in each of the transmission units 1101 that compose the synchronous transmission network shown in FIG. 11. For simplicity, in FIG. 36, similar units to those of the structure of the nineteenth preferred embodiment shown in FIG. 35 are denoted by similar reference numerals.

The difference between the structure of the twentieth preferred embodiment shown in FIG. 36 and the structure of the nineteenth preferred embodiment shown in FIG. 35 is that after an OOS designating unit 3601 that is accomplished as a function for which a CPU 003 executes a control program designates a SONET signal/DS1 reference signal receiving unit 001 to the OOS state through a microcomputer interface or a hardware control line, the SONET signal/DS1 reference signal receiving unit 001 sends OOS information that represents that it is in the OOS state to a synchronization message detecting unit 002 rather than a synchronization message processing unit 004.

When an OOS detecting unit 3602 in the synchronization message detecting unit 002 receives the OOS information from the SONET signal/DS1 reference signal receiving unit 001, the OOS detecting unit 3602 designates the quality level represented by the synchronization message to a quality level "DUS" that represents that the clock reference is prohibited from being used for controlling the synchronization.

Thus, the synchronization message processing unit 004 does not select a clock reference corresponding to the synchronization message.

With the above-described structure, as with the eighteenth preferred embodiment shown in FIG. 34, the above-described eighth problem can be solved.

In addition, as with the first preferred embodiment, the control operation is executed only when the mode for processing a synchronization message has been selected.

<Twenty-First Preferred Embodiment>

Based on the fundamental structures shown in FIGS. 11 to 16, a twenty-first preferred embodiment will be described.

Figure 37:
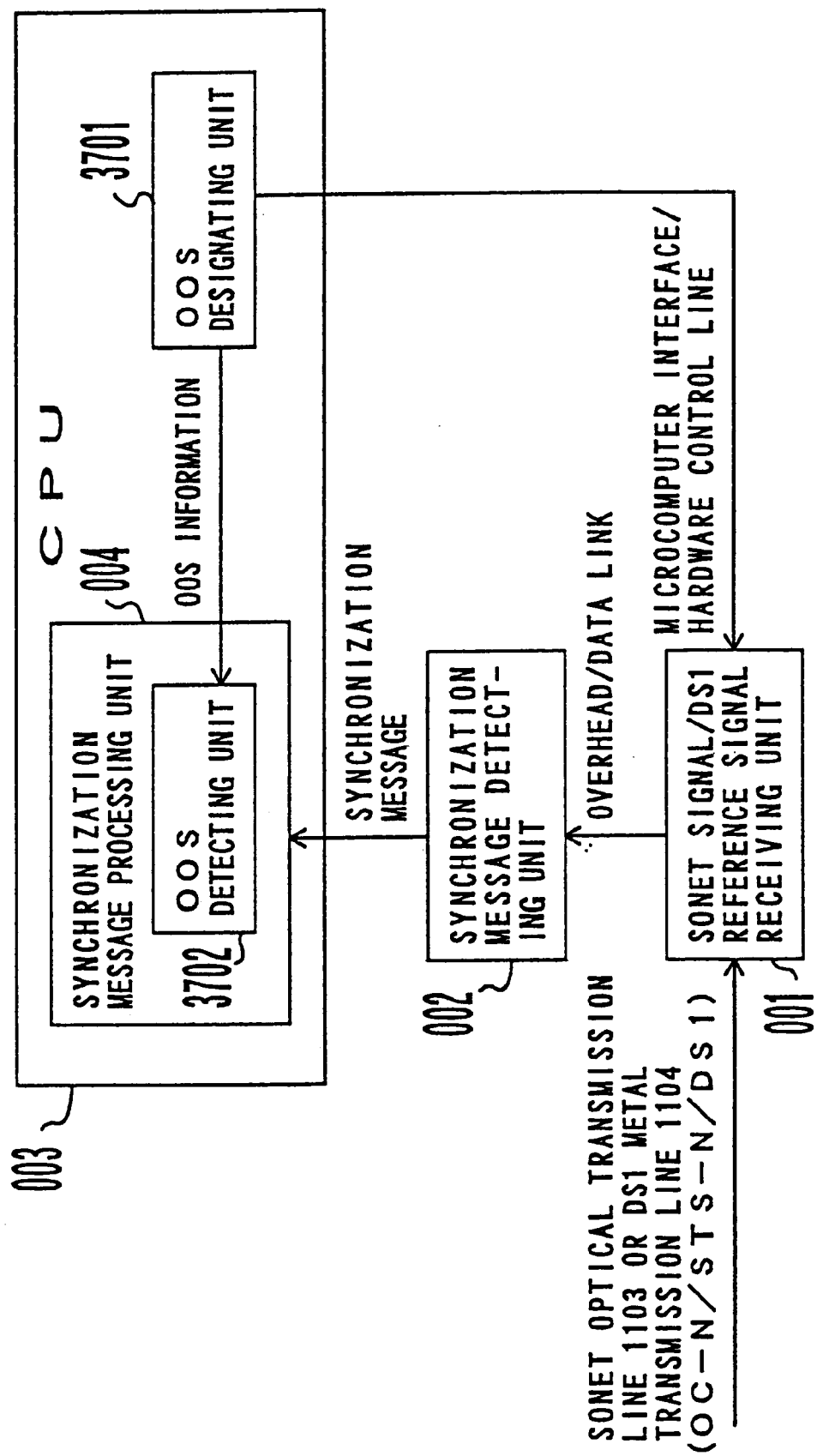
FIG. 37 is a schematic diagram showing the structure of a twenty-first preferred embodiment.

FIG. 37 is a schematic diagram showing the structure of the twenty-first preferred embodiment. As with the structure of the first preferred embodiment shown in FIG. 17, the structure shown in FIG. 37 is disposed in each of the transmission units 1101 that compose the synchronous transmission network shown in FIG. 11. For simplicity, in FIG. 37, similar units to those of the structure of the first preferred embodiment shown in FIG. 17 are denoted by similar reference numerals.

In the structure of the twenty-first preferred embodiment shown in FIG. 37, an OOS designating unit 3701 is accomplished as a function for which a CPU 003 executes a control program. When necessary, the OOS designating unit 3701 designates a line (a SONET optical transmission line 1103 or a DS1 metal transmission line 1104) to which a SONET signal/DS1 reference signal receiving unit 001 is terminated to the out-of-service (OOS) state through a microcomputer interface or a hardware control line. In addition, the OOS designating unit 3701 sends OOS information to a synchronization message processing unit 004 that is accomplished as a function for which the CPU 003 executes a control program.

When an OOS detecting unit 3702 in the synchronization message processing unit 004 receives the OOS information from the OOS designating unit 3701, the OOS detecting unit 3702 prohibits a clock reference corresponding to a synchronization message detected by the synchronization message detecting unit 002 from the line designated in the OOS state through the SONET signal/DS1 reference signal receiving unit 001, from being selected.

With the above-described control operation, when the line is in the OOS state, even if a line fault alarm corresponding to the fault state of the line is not received, an incorrect message can be prevented from being detected. Thus, the above-described ninth problem can be solved.

As a method for prohibiting a clock reference from being selected, the same method as the first preferred embodiment can be used.

In addition, as with the first preferred embodiment, the control operation is executed only when the mode for processing a synchronization message has been selected.

<Twenty-Second Preferred Embodiment>

Based on the fundamental structures shown in FIGS. 11 to 16, a twenty-second preferred embodiment will be described.

FIG. 38 is a schematic diagram showing the structure of the twenty-second preferred embodiment. As with the structure of the twenty-first preferred embodiment shown in FIG. 37, the structure shown in FIG. 38 is disposed in each of the transmission units 1101 that compose the synchronous transmission network shown in FIG. 11. For simplicity, in FIG. 38, similar units to those of the structure of the twenty-first preferred embodiment shown in FIG. 37 are denoted by similar reference numerals.

The difference between the structure of the twenty-second preferred embodiment shown in FIG. 38 and the structure of the twenty-first preferred embodiment shown in FIG. 37 is that after an OOS designating unit 3801 that is accomplished as a function for which a CPU 003 executes a control program has designated a line to which a SONET signal/DS1 reference signal receiving unit 001 is terminated to the OOS state through a microcomputer interface or a hardware control line, the SONET signal/DS1 reference signal receiving unit 001 sends OOS information that represents that the line to which the unit 001 terminates is. in the OOS state to the synchronization message processing unit 004 through a hardware control line that connects the SONET signal/DS1 reference signal receiving unit 001 and the CPU 003. Thus, the OOS designating unit 3801 does not send OOS information to the synchronization message processing unit 004.

When an OOS detecting unit 3802 in the synchronization message processing unit 004 has received the OOS information from the SONET signal/DS1 reference signal receiving unit 001, the OOS detecting unit 3802 prohibits a clock reference corresponding to a synchronization message detected by the synchronization message detecting unit 002 from the line in the OOS state through the SONET signal/ DS1 reference signal receiving unit 001, from being selected.

With the above-described structure, as with the twenty-first preferred embodiment shown in FIG. 37, the above-described ninth problem can be solved.

In addition, as with the first preferred embodiment, the control operation is executed only when the mode for processing a synchronization message has been selected.

<Twenty-Third Preferred Embodiment>

Based on the fundamental structures shown in FIGS. 11 to 16, a twenty-third preferred embodiment will be described.

FIG. 39 is a schematic diagram showing the structure of the twenty-third preferred embodiment. As with the structure of the twenty-second preferred embodiment shown in FIG. 38, the structure shown in FIG. 39 is disposed in each of the transmission units 1101 that compose the synchronous transmission network shown in FIG. 11. For simplicity, in FIG. 39, similar units to those of the structure of the twenty-second preferred embodiment shown in FIG. 38 are denoted by similar reference numerals.

The difference between the structure of the twenty-third preferred embodiment shown in FIG. 39 and the structure of the twenty-second preferred embodiment shown in FIG. 38 is that after an OOS designating unit 3901 that is accomplished as a function for which a CPU 003 executes a control program designates a line to which a SONET signal/DS1 reference signal receiving unit 001 is terminated to the OOS state through a microcomputer interface or a hardware control line, the SONET signal/DS1 reference signal receiving unit 001 sends OOS information to a synchronization message detecting unit 002, rather than a synchronization message processing unit 004.

When an OOS detecting unit 3902 in the synchronization message detecting unit 002 receives the OOS information from the SONET signal/DS1 reference signal receiving unit 001, the OOS detecting unit 3902 designates the quality level represented by the synchronization message to a quality level "DUS" that represents that the clock reference is prohibited from being used for controlling the synchronization.

Thus, the synchronization message processing unit 004 does not select a clock reference corresponding to the synchronization message.

With the above-described structure, as with the twenty-first preferred embodiment shown in FIG. 37, the above-described ninth problem can be solved.

In addition, as with the first preferred embodiment, the control operation is executed only when the mode for processing a synchronization message has been selected.

<Twenty-Fourth Preferred Embodiment>

Based on the fundamental structures shown in FIGS. 11 to 16, a twenty-fourth preferred embodiment will be described.

Figure 40:
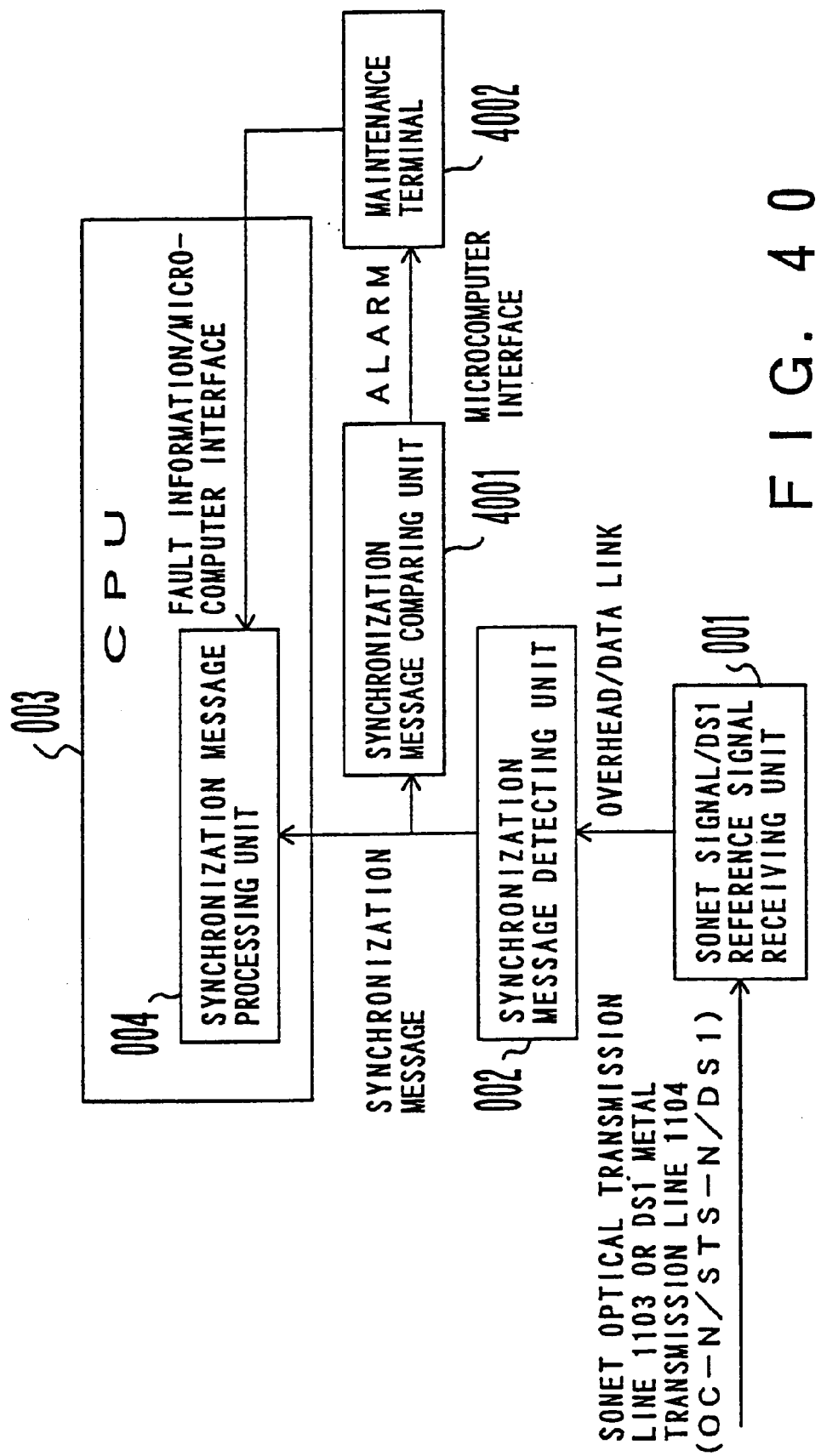
FIG. 40 is a schematic diagram showing the structure of a twenty-fourth preferred embodiment.

FIG. 40 is a schematic diagram showing the structure of the twenty-fourth preferred embodiment. As with the structure of the first preferred embodiment shown in FIG. 17, the structure shown in FIG. 40 is disposed in each of the transmission units 1101 that compose the synchronous transmission network shown in FIG. 11. For simplicity, in FIG. 40, similar units to those of the structure of the first preferred embodiment shown in FIG. 17 are denoted by similar reference numerals.

In the structure of the twenty-fourth preferred embodiment shown in FIG. 40, a synchronization message comparing unit 4001 compares the quality level of a synchronization message detected by a synchronization message detecting unit 002 with the accuracy of the internal clock of the local transmission unit 1101.

When the quality level represented by the synchronization message is lower than the accuracy of the internal clock, the synchronization message comparing unit 4001 sends an alarm to a maintenance terminal 4002 connected to the local transmission unit 1101.

When the maintenance terminal 4002 receives the alarm, it sends fault information to a synchronization message processing unit 004 that is accomplished as a function for which a CPU 003 executes a control program through a microprocessor interface.

When the synchronization message processing unit 004 has received the fault information, it prohibits a clock reference corresponding to a synchronization message detected by the synchronization message detecting unit 002 from which an alarm has been detected, from being selected.

With the above-described control operation, the clock reference with a lower accuracy than the internal clock can be prevented from being mistakenly selected. Thus, the quality of the clock of the entire synchronous network can be prevented from deteriorating. Consequently, the above-described tenth problem can be solved.

As a method for prohibiting a clock reference from being selected, the same method as the first preferred embodiment can be used.

<Twenty-Fifth Preferred Embodiment>

Based on the fundamental structures shown in FIGS. 11 to 16, a twenty-fifth preferred embodiment will be described.

Figure 41:
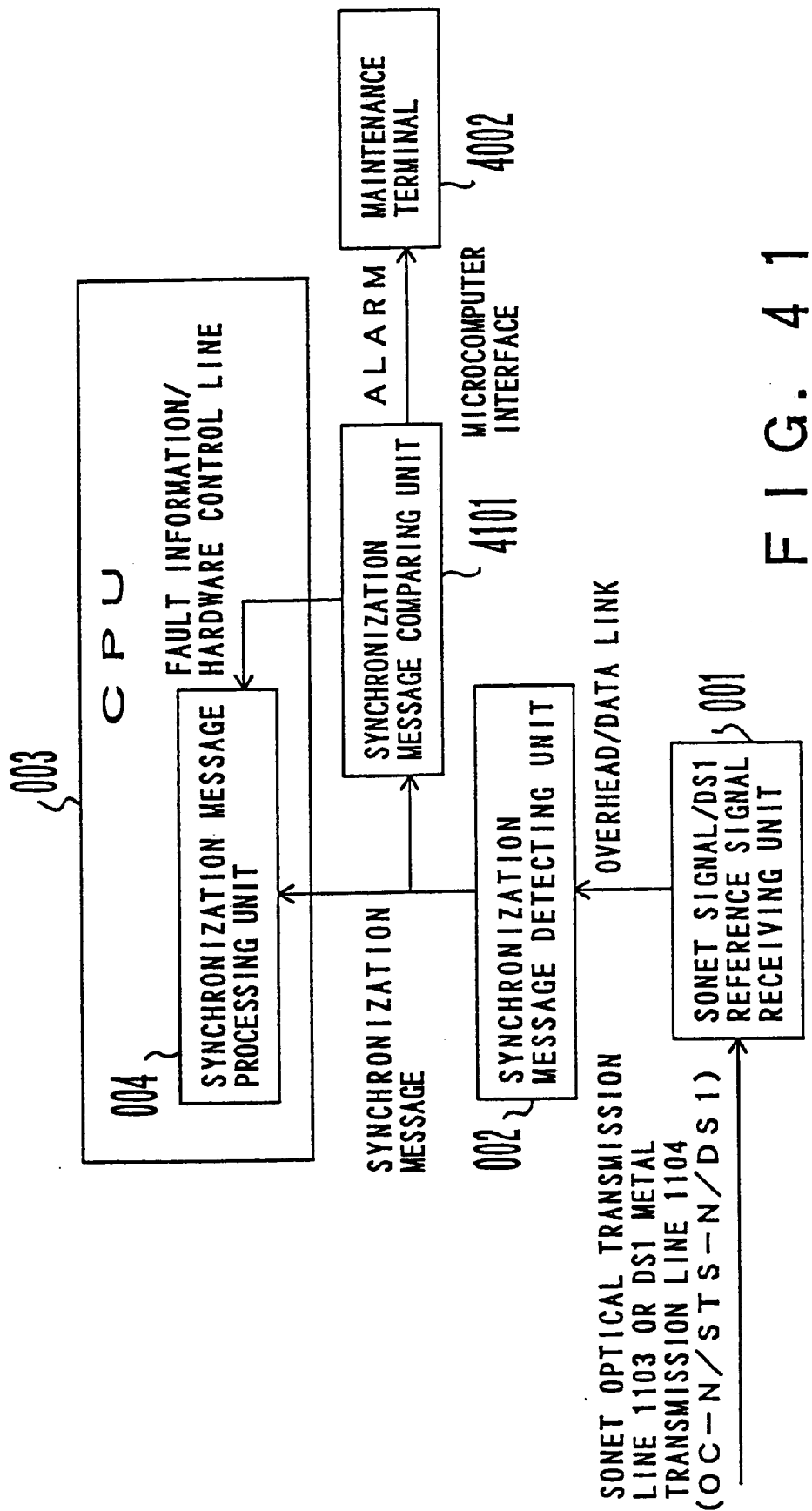
FIG. 41 is a schematic diagram showing the structure of a twenty-fifth preferred embodiment.

FIG. 41 is a schematic diagram showing the structure of the twenty-fifth preferred embodiment. As with the structure of the twenty-fourth preferred embodiment shown in FIG. 40, the structure shown in FIG. 41 is disposed in each of the transmission units 1101 that compose the synchronous transmission network shown in FIG. 11. For simplicity, in FIG. 41, similar units to those of the structure of the twenty-fourth preferred embodiment shown in FIG. 40 are denoted by similar reference numerals.

The difference between the structure of the twenty-fifth preferred embodiment shown in FIG. 41 and the structure of the twenty-fourth preferred embodiment shown in FIG. 40 is that when the quality level represented by the synchronization message is lower than the accuracy of the internal clock, fault information is sent to a synchronization message processing unit 004 from a synchronization message comparing unit 4101 through a hardware control line that connects a CPU 003 and a synchronization message comparing unit 4101 rather than from a maintenance terminal 4002.

With the above-described structure, as with the twenty-fourth preferred embodiment shown in FIG. 40, the above-described tenth problem can be solved.

<Twenty-Sixth Preferred Embodiment>

Based on the fundamental structures shown in FIGS. 11 to 16, a twenty-sixth preferred embodiment will be described.

Figure 42:
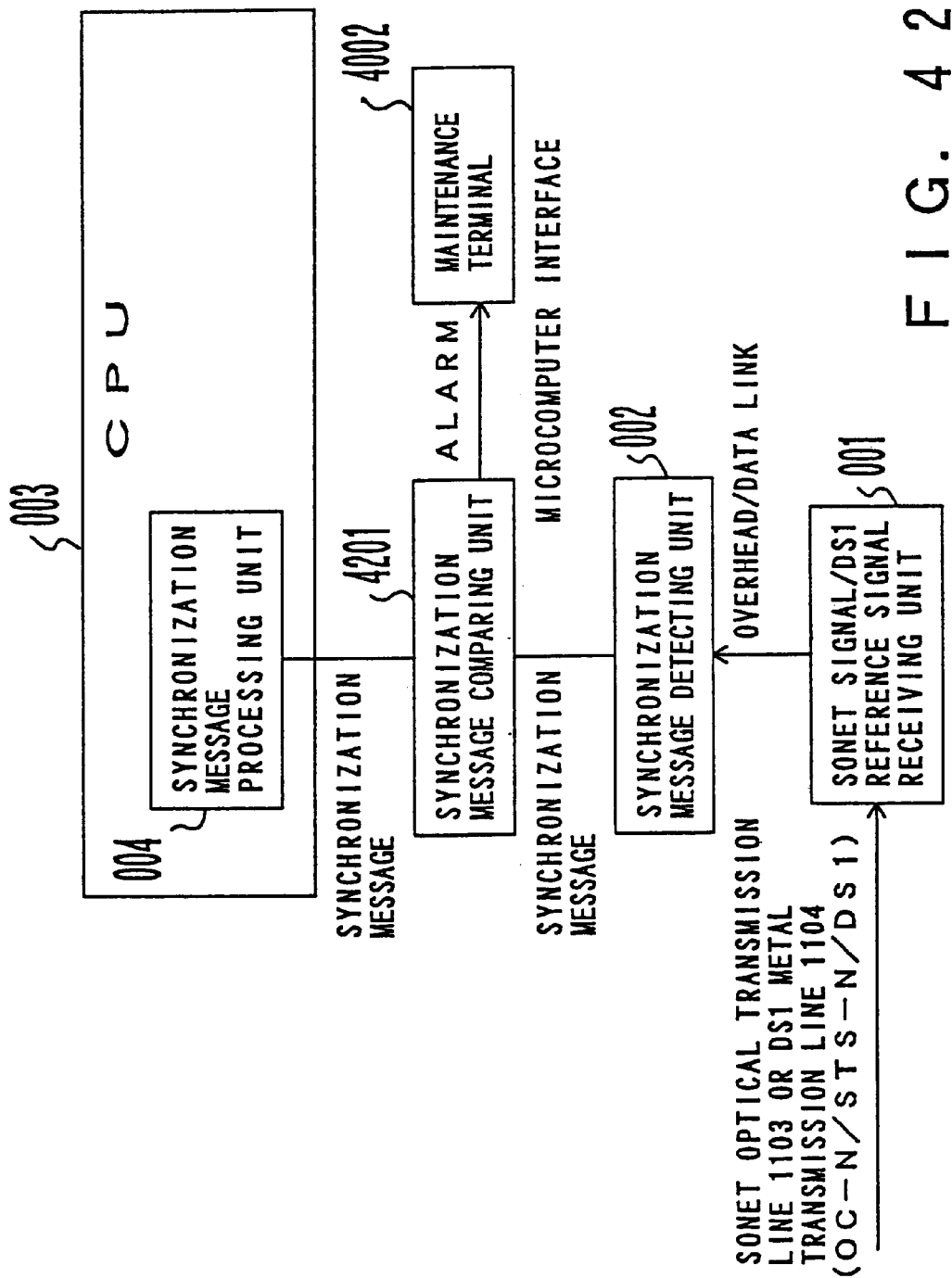
FIG. 42 is a schematic diagram showing the structure of a twenty-sixth preferred embodiment.

FIG. 42 is a schematic diagram showing the structure of the twenty-sixth preferred embodiment. As with the structure of the twenty-fourth preferred embodiment shown in FIG. 40, the structure shown in FIG. 42 is disposed in each of the transmission units 1101 that compose the synchronous transmission network shown in FIG. 11. For simplicity, in FIG. 42, similar units to those of the structure of the twenty-fourth preferred embodiment shown in FIG. 40 are denoted by similar reference numerals.

In the structure of the twenty-sixth preferred embodiment shown in FIG. 42, when the quality level represented by the synchronization message is lower than the accuracy of the internal clock, an alarm is sent to a maintenance terminal 4002 connected to the local transmission unit 1101. In addition, the quality level of a synchronization message detected by a synchronization message detecting unit 002 is designated to a quality level that represents that the clock reference is prohibited from being used for controlling the synchronization. The fault information is sent to a synchronization message processing unit 004. As a value of the synchronization message that represents the quality level designated, "DUS" (see FIG. 16) or one of non-designated codes (for example, "0011" for S1 byte or "0000111011111111" for DS1 ESF data link) (see FIG. 16) is designated so that it represents an accuracy lower than the internal clock. The resultant code is used.

Thus, the synchronization message processing unit 004 does not select a clock reference corresponding to the synchronization message.

With the above-described structure, as with the twenty-fourth preferred embodiment shown in FIG. 40, the above-described tenth problem can be solved.

<Description of Synchronization Message Processing Unit 004>

Next, a real example of the operation of the synchronization message processing unit 004 corresponding to the first to twenty-sixth preferred embodiments will be described.

Figure 43:
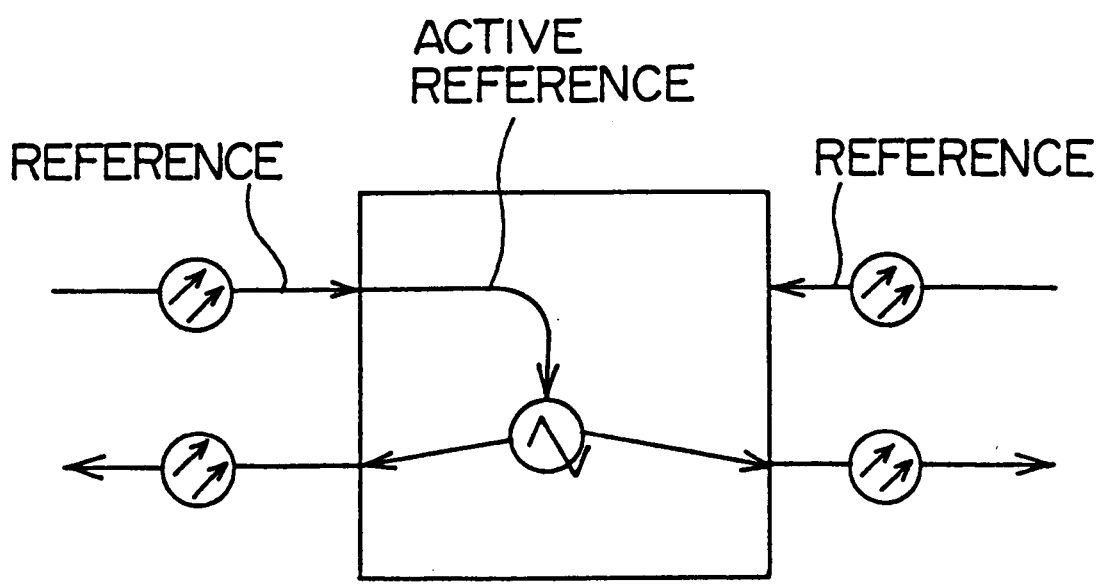
FIG. 43 is a schematic diagram for explaining an active reference (No. 1)
Figure 44:
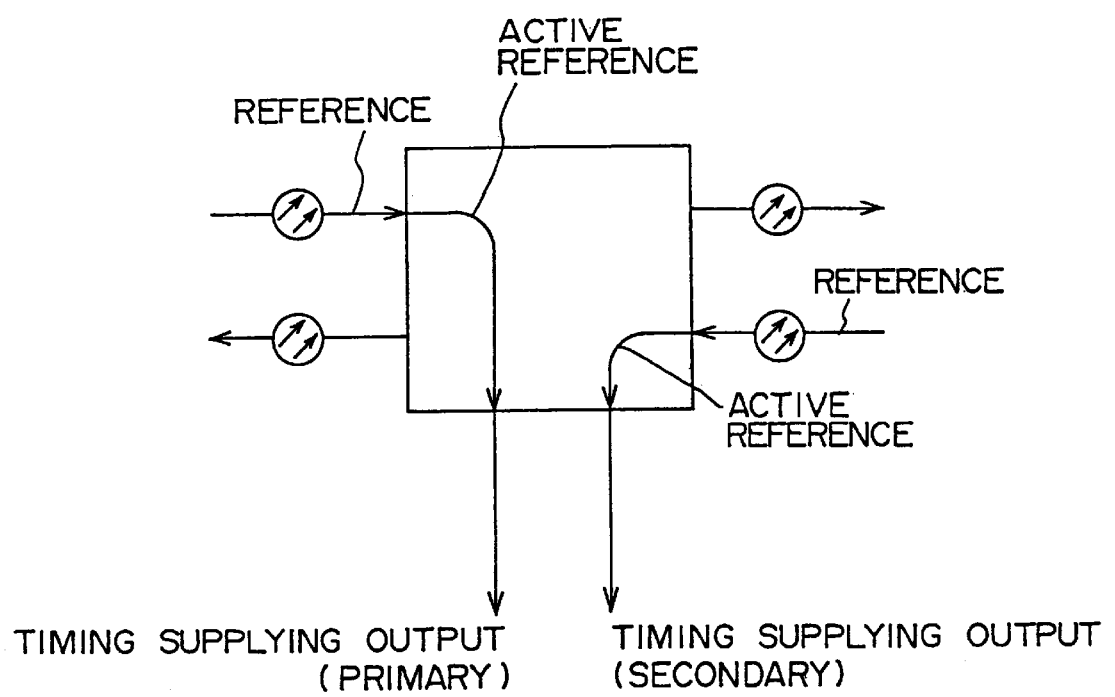
FIG. 44 is a schematic diagram for explaining an active reference (No. 2)

In the following description, as shown in FIGS. 43 and 44, a clock reference actively used by the transmission unit 1101 (shown in FIG. 11) for controlling the timing of the system and for supplying the timing for another unit is referred to as an active reference.

Figure 45:
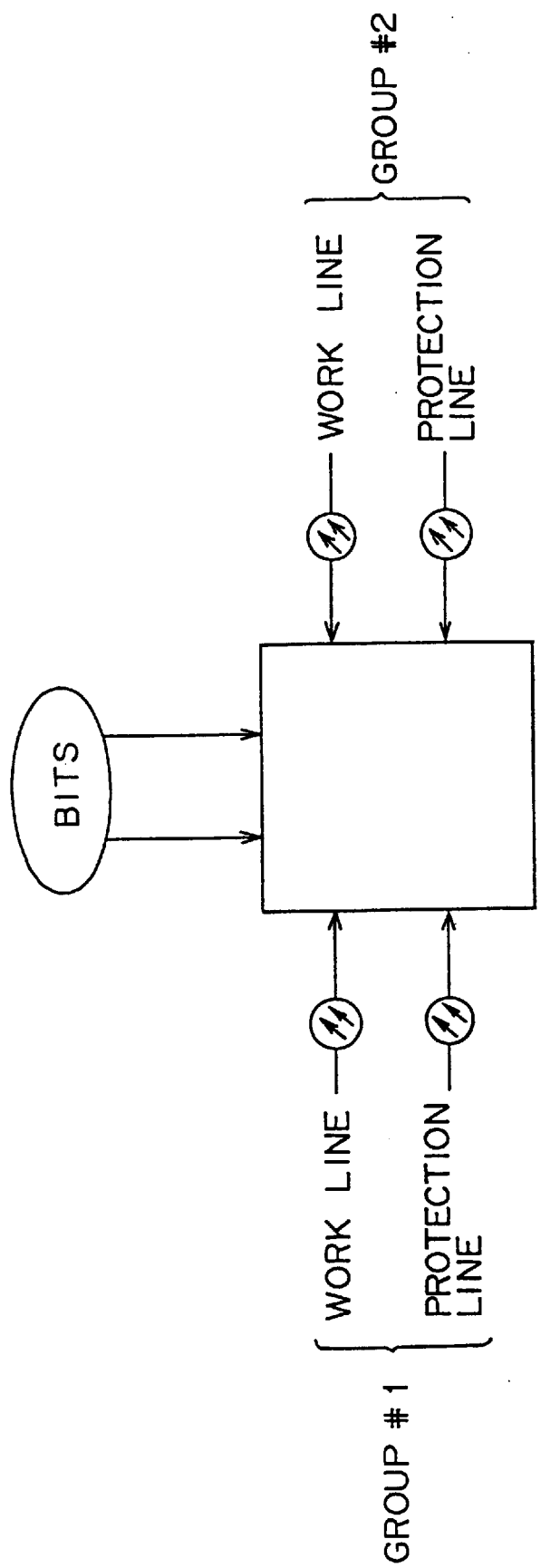
FIG. 45 is a schematic diagram for explaining clock references.

In one transmission unit 1101, as shown in FIG. 45, as selectable sources of clock references for the active reference, there are BITS input primary, BITS input secondary, group #1 work line, group #1 protection line, group #2 work line, and group #2 protection line. In addition, as the selectable clock references, there are hold over clock, internal clock, and so forth (not shown).

The hold over clock is a clock that the transmission unit 1101 outputs in synchronization with the preceding active reference when it cannot be used. The internal clock is a clock that the transmission unit 1101 outputs from an internal clock generating unit at a unique timing. The work line is a SONET optical transmission line 1103 that is normally used. The protection line is a backup SONET optical transmission line 1103.

In the preferred embodiments of the present invention, clock references for the active reference can be freely registered and deleted. When a plurality of references with the same quality level are present, the priority of clock references to be selected can be freely designated. A source priority list as shown in FIG. 46 is stored in the transmission unit 1101.

In FIG. 46, clock references that can be selected as the active reference are BITS input primary, BITS input secondary, group #1 work line, group #1 protection line, group #2 work line, group #2 protection line, and hold over clock, designated higher priority levels in that order (namely, the BITS input primary has the highest priority level, whereas the hold over clock has the lowest priority level).

The transmission unit 1101 switches the active reference corresponding to the contents of the source priority list. Only clock references registered in the source priority list are treated as clock references that can be selected as the active reference.

Among the clock references, a clock reference that has the highest quality level and that is effective is selected as the active reference. If there are a plurality of clock references that have the same quality level, one that has the highest priority level in the source priority list is selected. If a clock reference that has a higher quality level than the one selected as the active reference and that is registered in the source priority level is present, this clock reference is selected as the active reference. In the example shown in FIG. 46, when the clock reference that has the highest quality level is the group #1 work line, it is selected as the active reference. When the BITS input primary, the BITS input secondary, and the group #2 work line have the same highest quality level, the BITS input primary is selected as the active reference corresponding to the priority level in the source priority list shown in FIG. 46. When a fault takes place in the clock reference that has been selected as the active reference, a clock reference with the highest quality level is selected among the remaining clock references registered in the source priority list.

In such a structure, since clock references with high quality levels have been registered in the source priority list, an active reference with a high quality level can be always selected. Thus, the entire network can be always synchronized with a clock having a high quality level.

Since a clock reference that cannot be selected as the active reference is deleted from the source priority list, a timing loop can be prevented from taking place in the network.

When a plurality of clock references are registered in the source priority list, clock references can be redundantly selected. Since the active reference is not affected by the hold over clock and the internal clock, the entire network can be prevented from synchronizing with a clock having a low quality level.

The source priority list can be defined for each of the primary side and the secondary side for controlling the system timing of the local transmission unit 1101, and for supplying the timing for another unit connected to the local transmission unit 1101.

In addition, the contents of the source primary list can be designated with commands from a maintenance terminal.

Figure 47:
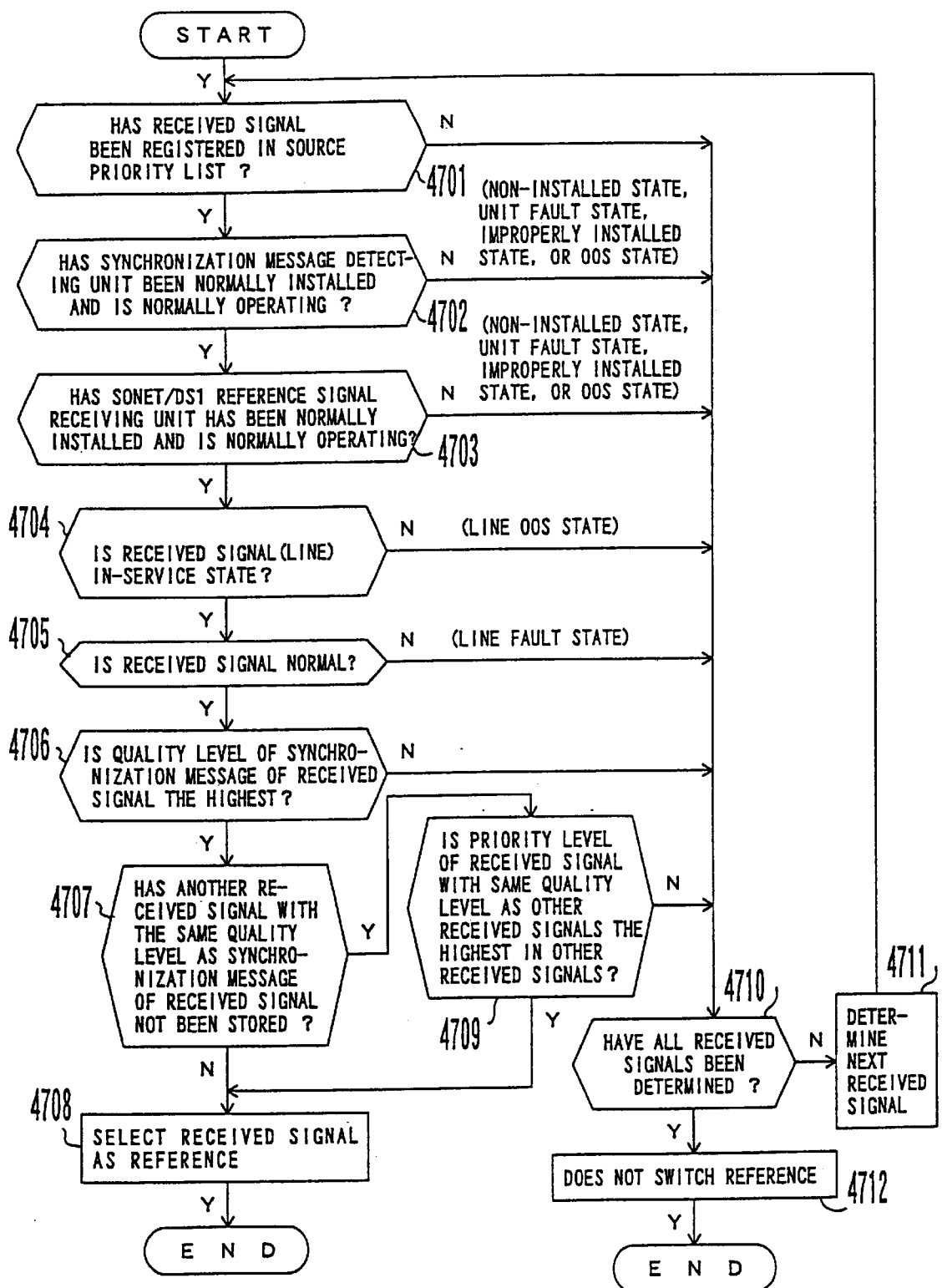
FIG. 47 is a flowchart showing an operation for selecting a clock reference.

FIG. 47 is a flowchart showing the control process of the transmission unit 1101 that switches the active reference corresponding to the contents of the source priority list.

The function of the flowchart shown in FIG. 47 is accomplished by a combination of the functions shown in FIG. 17 or 18, the functions shown in FIG. 19 or 20, the function shown in FIG. 21, the functions shown in FIG. 22 or 23, the functions shown in FIG. 24 or 25, the functions shown in FIG. 28 or 29, the function shown in FIG. 32, the functions shown in FIG. 34 or 35, and the functions shown in FIG. 37 or 38.

At step 4701, when a cause for switching a clock reference takes place due to a change of quality level, one of the clock references received by the transmission unit 1101 is selected as an objective clock reference. It is determined whether or not the objective clock reference has been registered in the source priority list.

When the objective clock reference has not been registered in the source priority list thereby the determined result at step 4701 is No (branch denoted by N), the process advances to step 4710.

When the objective clock reference has been registered in the source priority list thereby the determined result at step 4701 is YES (branch denoted by Y), the flow advances to step 4702. At step 4702, it is determined whether or not the synchronization message detecting unit 002 (see FIG. 17 or the like) has been normally installed and is normally operating (non-installed state, unit fault state, improperly installed state, or OOS state).

When the synchronization message detecting unit 002 has not been normally installed and is not normally operating thereby the determined result at step 4702 is No, the flow advances to step 4710.

When the synchronization message detecting unit 002 has been normally installed and is normally operating thereby the determined result at step 4702 is YES, the flow advances to step 4703. At step 4703, it is determined whether or not the SONET signal/DS1 reference signal receiving unit 001 (see FIG. 17 or the like) has been normally installed and is normally operating (non-installed state, unit fault state, improperly installed state, or OOS state).

When the SONET signal/DS1 reference signal receiving unit 001 has not been normally installed or is not normally operating thereby the determined result at step 4703 is NO, the flow advances to step 4710.

When the SONET signal/DS1 reference signal receiving unit 001 has been normally installed and is normally operating thereby the determined result at step 4703 is YES, the flow advances to step 4704. At step 4704, it is determined whether or not a received signal (line) is in the in-service (IS) state.

When the received signal (line) is in the out-of-service (OOS) state thereby the determined result at step 4704 is NO, the flow advances to step 4710.

When the received signal (line) is in the in-service (IS) state thereby the determined result at step 4704 is YES, the flow advances to step 4705. At step 4705, it is determined whether or not the received signal (line) is normal.

When a fault takes place in the received signal (line) thereby the determined result at step 4705 is No, the flow advances to step 4710.

As described above, when the objective clock reference has not been registered in the source priority list thereby the determined result at step 4701 is NO or when the determined result at one of steps 4702 to 4705 is NO and thereby the clock reference is not valid, the next objective clock reference is extracted and the above-described determinations are repeated (returning to step 4701 through steps 4710 and 4711) until all the clock references have been determined, at step 4710.

When the objective clock reference has been registered in the source priority list thereby the determined result at step 4701 is YES, the determined results at steps 4702 to 4705 are YES, and thereby the clock reference is valid, the flow advances to step 4706. At step 4706, it is determined whether or not the quality level of the objective clock reference corresponding to the synchronization message is the highest among the clock references registered in the source priority list.

When the quality level of the objective clock reference is not highest among the clock references registered in the source priority list thereby the determined result at step 4706 is NO, the next objective clock reference is extracted and the determinations at step 4701 and later (returning to step 4701 through steps 4710 and 4711) are repeated until all the clock references have been determined, at step 4710.

When the quality level of the objective clock reference is the highest among the clock references registered in the source priority list thereby the determined result at step 4706 is YES, the flow advances to step 4707. At step 4707, it is determined whether or not another clock reference with the same quality level as the objective clock reference has been registered in the source priority list.

When another clock reference with the same quality level as the objective clock reference has not been registered in the source priority list thereby the determined result at step 4707 is NO, the flow advances to step 4708. At step 4708, the objective clock reference is selected as the active reference. Thus, the switching process for the active reference is completed.

When another clock reference with the same quality level as the objective clock reference has been registered in the source priority list thereby the determined result at step 4707 is YES, the flow advances to step 4709. At step 4709, it is determined whether or not the priority level of the objective clock reference is higher than the priority levels of other clock references with the same quality level as the objective clock reference.

When the priority level of the objective clock reference is higher than the priority levels of other clock references that have been registered in the source priority list and that have the same quality level as the objective clock reference thereby the determined result at step 4709 is YES, the flow advances to step 4708. At step 4708, the objective clock reference is selected as the active reference. Thus, the switching process for the active reference is completed.

When the priority level of the objective clock reference is not higher than the priority levels of other clock references that have been registered in the source priority list and that have the same quality level as the objective clock reference thereby the determined result at step 4709 is NO, the next objective clock reference is extracted and the determinations at step 4701 and later (returning to step 4701 through steps 4710 and 4711) are repeated until all the clock references have been determined, at step 4710.

In the process sequence, when all the clock references have been determined thereby the determined result at step 4710 is YES, the flow advances to step 4712. Thus, the active reference is not switched.

<Real Hardware Structure of the Preferred Embodiments (No. 1)>

Figure 48:
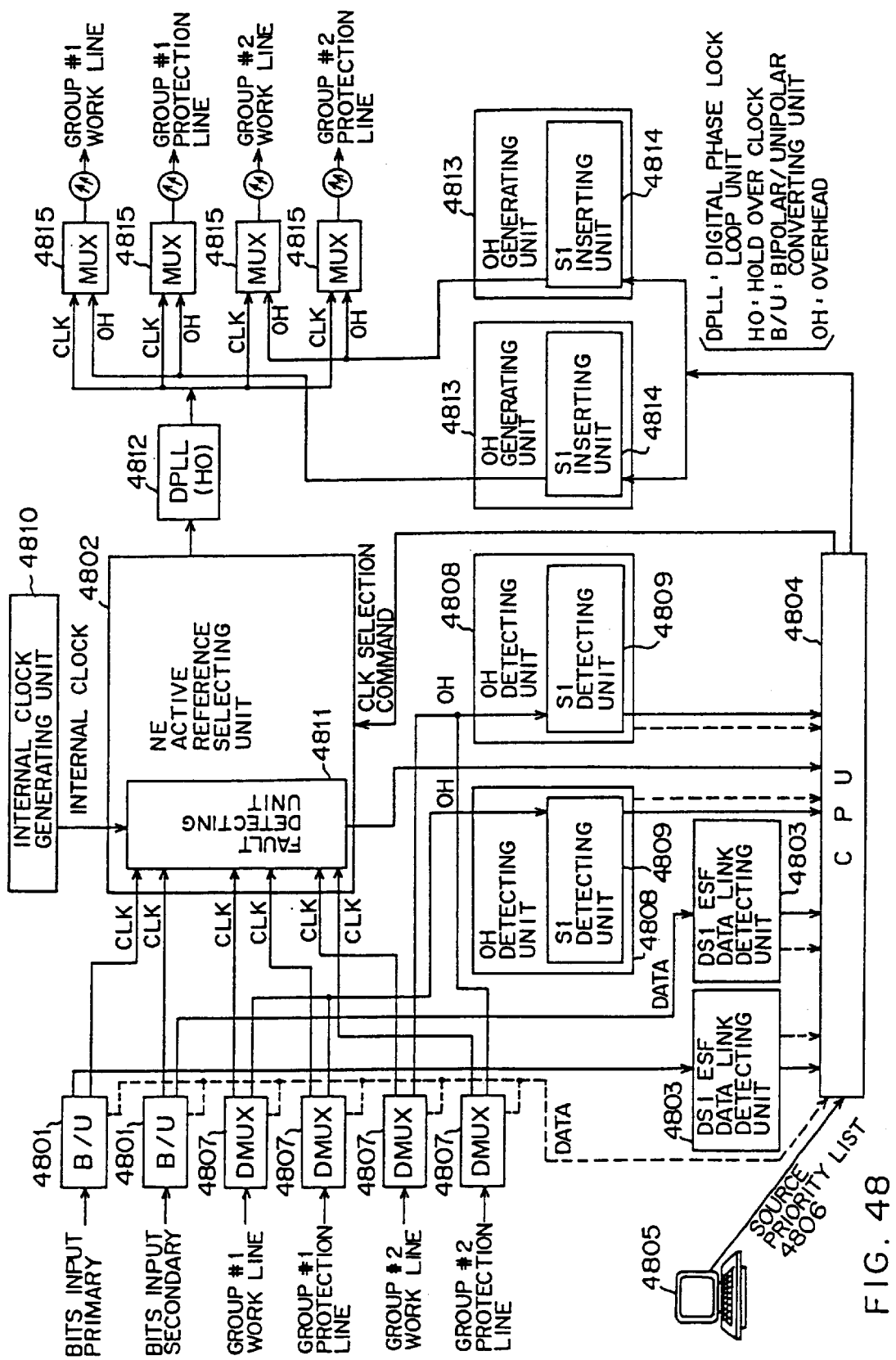
FIG. 48 is a schematic diagram showing the hardware structure of each of the preferred embodiments (No. 1)

FIG. 48 is a block diagram showing the structure for accomplishing a selection of the local active reference in the transmission unit 1101 (see FIG. 11) of each preferred embodiment.

BITS input primary and BITS input secondary are supplied from an external BITS 1102 (see FIG. 11) to respective B/U units (Bipolar/Unipolar converting units) 4801 through respective DS1 metal transmission lines 1104. The B/U units 4801 each separate the BITS input primary and BITS input secondary into a clock reference CLK and a data link DATA.

As denoted by dashed lines with an arrow in FIG. 48, each of the B/U units 4801 and the CPU 4804 are connected through a microcomputer interface. The CPU 4804 detects the non-installed state, unit fault state, and improperly installed. state of each of the B/U units 4801 through the microcomputer interface. In addition, the CPU 4804 designates each of the B/U units 4801 to the out-of-service (OOS) state.

The clock references CLK are supplied to an NE active reference selecting unit 4802 that is a circuit that selects a clock reference with which the transmission unit 1101 synchronizes.

The data links DATA are sent to respective DS1 ESF data link detecting units 4803. The DS1 ESF data link detecting units 4803 detect respective DS1 ESF data links (corresponding to DL shown in FIG. 14). Synchronization messages contained in the DS1 ESF data links are sent to the CPU 4804.

As denoted by the dashed lines in FIG. 48, the DS1 ESF data link detecting units 4803 and CPU 4804 are connected through the microcomputer interface. The CPU 4804 detects the non-installed state, unit fault state, and improperly installed state of each of the data link detecting units 4803 through the microcomputer interface. In addition, the CPU 4804 designates each of the data link detecting units 4803 to the out-of-service (OOS) state.

On the other hand, SONET signals that are received from the group #1 work line, the group #1 protection line, the group #2 work line, and the group #2 protection line are supplied to respective DMUX units (demultiplexer units) 4807. Each SONET signal is separated into a clock reference CLK and an overhead OH (see FIG. 15) by each DMUX unit 4807.

The DMUX units 4807 and the CPU 4804 are connected through the microcomputer interface. The CPU 4804 detects the non-installed state, unit fault state, and improperly installed state of each of the DMUX units 4807 through the microcomputer interface. In addition, the CPU 4804 designates each of the DMUX units 4807 to out-of-service state through the microcomputer interface.

The clock references CLK are supplied to the NE active reference selecting unit 4802.

The overheads OH are supplied to respective overhead detecting units (OH detecting units) 4808. An S1 detecting unit 4809 of each of the overhead detecting units 4808 detects an S1 byte (see FIGS. 15 and 16). The quality level represented by the synchronization message contained in the S1 byte is sent to the CPU 4804.

As denoted by dashed lines of FIG. 48, the OH detecting units 4808 and the CPU 4804 are connected through the microcomputer interface. The CPU 4804 detects the non-installed state, unit fault state, and improperly installed state of each of the OH detecting units 4808 through the microcomputer interface. In addition, the CPU 4804 designates each of the OH detecting units 4808 to the out-of-service (OOS) state through the microcomputer interface.

A fault detecting unit 4811 of the NE active reference selecting unit 4802 monitors clock faults (input loss) of the clock references CLK that are received from the two B/U units 4801 and the four DMUX units 4807. When the fault detecting unit 4811 detects a clock fault, it sends information representing the clock fault to the CPU 4804.

When each of the S1 detecting units 4809 of the OH detecting units 4808 detects a bit sequence that has not been defined instead of the S1 byte, it detects this as a fault and sends information representing the occurrence of the fault to the CPU 4804.

When each of the DS1 ESF data link detecting units 4803 detects a bit sequence that has not been defined (see FIG. 16) in the data links, it recognizes the bit sequence as a fault and sends information representing the occurrence of the fault to the CPU 4804.

Next, a source priority list 4806 is supplied from a maintenance terminal 4805 to the CPU 4804. The CPU 4804 stores the source priority list 4806 in a storing unit thereof.

The CPU 4804 determines an NE active reference with reference to the fault information or quality level received from the two DS1 ESF data link detecting units 4803 and the two S1 detecting units 4809 and above described source priority list 4806, corresponding to the flowchart shown in FIG. 47.

At this point, as described above, the CPU 4804 determines whether or not each of the B/U units 4801, the DS1 ESF data link detecting units 4803, the DMUX units 4807, and the OH detecting units 4808 has been normally installed and is normally operating, and controls the determining process of the NE active reference corresponding to the determined results (see steps 4702 to 4705 shown in FIG. 47).

The CPU 4804 sends the determined NE active reference to the NE active reference selecting unit 4802 with a CLK selection command. When the CPU 4804 fails to determine a clock reference CLK as the active reference, it sends a CLK selection command for selecting the internal clock of the internal clock generating unit 4810 to the NE active reference selecting unit 4802.

At this point, the CPU 4804 designates a synchronization message to be written to the S1 byte of the overhead OH of the SONET signal on the output side for each of SI inserting units 4814 in overhead generating units (OH generating units) 4813. The synchronization message contains the quality level of the active reference.

The NE active reference selecting unit 4802 selects a clock reference CLK as the NE active reference from clock references CLK received from the two B/U units 4801 and the four DMUX units 4807 corresponding to the CLK selection command received from the CPU 4804, and sends the selected clock reference CLK to a DPLL (Digital Phase Locked Loop) unit 4812 (referred to as hold over HO).

The DPLL unit 4812 synchronously stores the NE active reference CLK received from the NE active reference selecting unit 4802 and sends it to the four MUX units (multiplexer units) 4815.

On the other hand, each of the S1 inserting units 4814 of the OH generating units 4813 writes the synchronization message received from the CPU 4804 to the S1 byte in the overhead OH. The first OH generating unit 4813 sends the overhead OH to the two MUX units 4815 of the group #1. The second OH generating unit 4813 sends the overhead OH to the two MUX units 4815 of the group #2.

The MUX unit 4815 multiplexes the NE active reference CLK received from the DPLL unit 4812 and the overhead OH received from the OH generating unit 4813 with the SONET signal, and sends the resultant SONET signal to each of the SONET optical transmission lines 1103.

The four MUX units 4815 terminate the group #1 work line, the group #1 protection line, the group #2 work line, and the group #2 protection line, respectively.

<Real Hardware Structure of Each Preferred embodiment (No. 2)>

Figure 49:
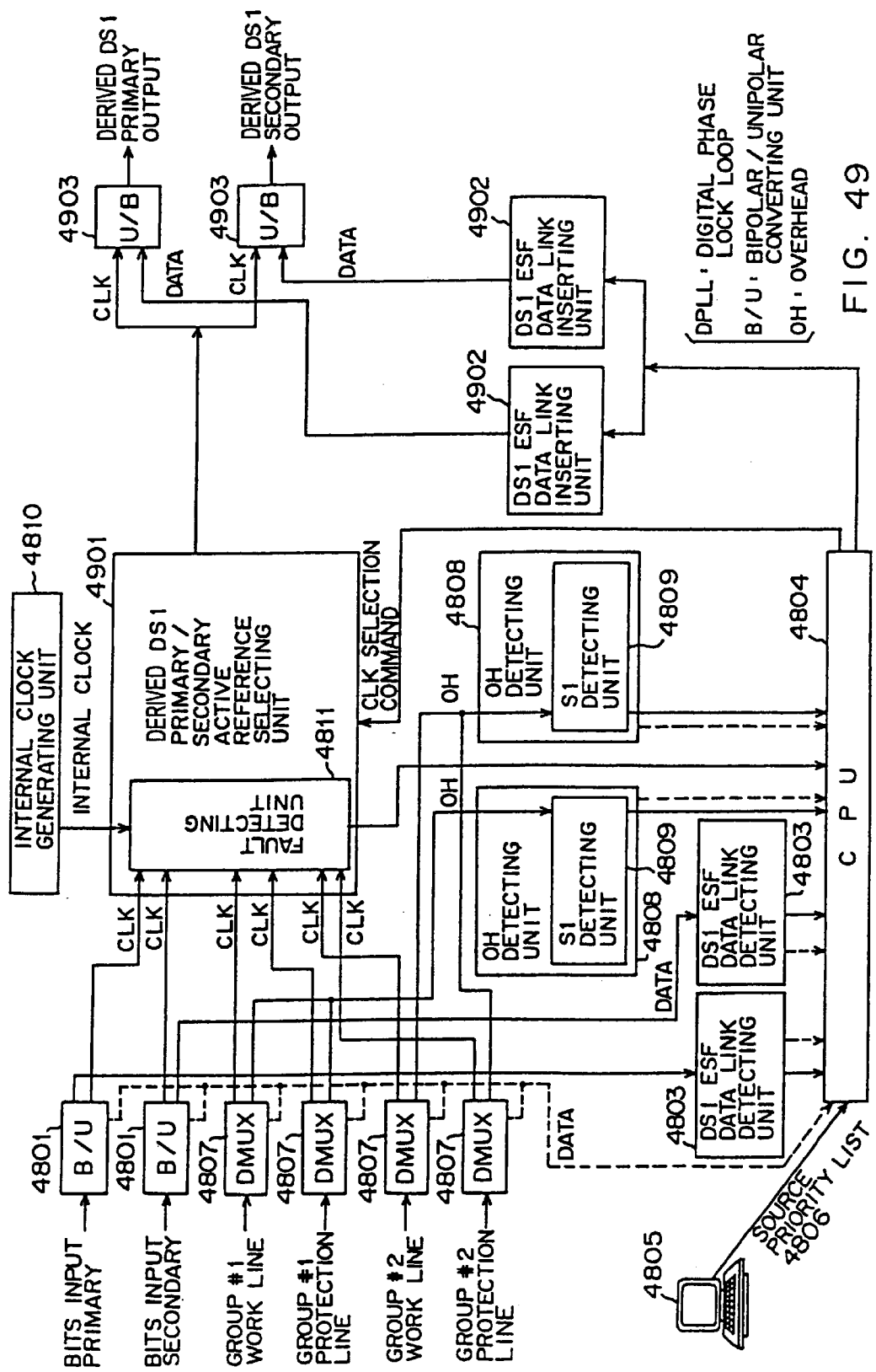
FIG. 49 is a schematic diagram showing the hardware structure of each of the preferred embodiments (No. 2).

FIG. 49 is a block diagram showing the structure for accomplishing a selection of the derived DS1 primary/secondary active references for timing supply in the transmission unit 1101 (see FIG. 11) of each preferred embodiment.

For simplicity, in FIG. 49, similar units to those in the structure shown in FIG. 48 are denoted by similar reference numerals. In other words, the structure shown in FIG. 49 is the same as the structure shown in FIG. 48 regarding that the derived DS1 primary/secondary active references are selected. In this case, a derived DS1 primary/secondary active reference selecting unit 4901 shown in FIG. 49 has substantially the same function as the NE active reference selecting unit 4802 shown in FIG. 48.

The difference between the structure shown in FIG. 49 and the structure shown in FIG. 48 is that the CPU 4804 sends a synchronization message to be written to a data link signal on output side to DS1 ESF data link inserting units 4902.

The two DS1 ESF data link inserting units 4902 write the synchronization message received from the CPU 4804 to DS1 ESF data links (data links DATA). The two DS1 ESF data link inserting units 4902 send the data links DATA to two U/B units (Unipolar/Bipolar converting units) 4903.

Next, a derived DS1 primary/secondary active reference selecting unit 4901 selects clock references CLK designated as derived DS1 primary/secondary active references from clock references CLK received from two B/U units 4801 and four DMUX units 4807 corresponding to a CLK selecting command received from a CPU 4804, and directly sends the selected clock references CLK to the two U/B units 4903. It should be noted that the above-described derived DS1 primary/secondary active references may be one common reference or two discrete references for the two U/B units 4903.

Each of the U/B units 4903 multiplexes the derived DS1 primary/secondary active references CLK received from the derived DS1 primary/secondary active reference selecting unit 4901 and the data link DATA received from the DS1 ESF data link inserting unit 4902 with the DS1 signal, and sends the resultant DS1 signal to each of the DS1 metal transmission lines 1104.

The two U/B units 4903 correspond to the derived DS1 primary output and the derived DS1 secondary output, respectively.

Although the present invention has been shown and described with respect to best mode preferred embodiments thereof, it should be understood by those skilled in the art that the foregoing and various other changes, omissions, and additions in the form and detail thereof may be made therein without departing from the spirit and scope of the present invention.

What is claimed is:

1. An apparatus, disposed in a transmission unit that composes a network, for selecting one of a plurality of clock references received by the transmission unit as an active reference for controlling the transmission unit or as an active reference for supplying a timing to an external unit connected to the transmission unit corresponding to a quality level of each of the clock references sent with a corresponding synchronization message, comprising:

synchronization message detecting means for detecting the synchronization message from a received signal;

synchronization message processing means for controlling whether or not to select a clock reference received corresponding to the quality level of the clock reference sent with the synchronization message as the active reference; and state detecting means for detecting the state of said synchronization message detecting means, wherein said synchronization message processing means does not select the clock reference corresponding to the synchronization message detected by said synchronization message detecting means as the active reference when said state detecting means has determined that said synchronization message detecting means is not in a normal state.

2. The apparatus as set forth in claim 1, wherein said state detecting means detects at least one of non-installed state, fault state, and improperly installed state of said synchronization message detecting means, and wherein said synchronization message processing means does not select the clock reference corresponding to the synchronization message detected by said synchronization message detecting means as the active reference when said state detecting means has detected one of the non-installed state, the fault state, and the improperly installed state of said synchronization message detecting means.

3. An apparatus, disposed in a transmission unit that composes a network, for selecting one of a plurality of clock references received by the transmission unit as an active reference for controlling the transmission unit or as an active reference for supplying a timing to an external unit connected to the transmission unit corresponding to a quality level of each of the clock references sent with a corresponding synchronization message, comprising:

synchronization message detecting means for detecting the synchronization message from a received signal;

synchronization message processing means for controlling whether or not to select a clock reference received corresponding to the quality level of the synchronization message as the active reference; and service state designating means for designating a service state of said synchronization message detecting means, wherein said synchronization message processing means does not select the clock reference corresponding to the synchronization message detected by said synchronization message detecting means as the active reference when said service state designating means has designated said synchronization message detecting means to be in an out-of-service state.

4. An apparatus, disposed in a transmission unit that composes a network, for selecting one of a plurality of clock references received by the transmission unit as an active reference for controlling the transmission unit or as an active reference for supplying a timing to an external unit connected to the transmission unit corresponding to a quality level of each of the clock references sent with a corresponding synchronization message, comprising:

line terminating means for terminating a line;

synchronization message detecting means for detecting the synchronization message from a line signal received from the line by said line terminating means;

synchronization message processing means for controlling whether or not to select a clock reference received from the line corresponding to the quality level represented by the synchronization message detected by said synchronization message detecting means; and state detecting means for detecting the state of said line terminating means, wherein said synchronization message processing means does not select the clock reference corresponding to the synchronization message detected by said synchronization message detecting means through said line terminating means when said state detecting means has determined that said line terminating means is not in a normal state.

5. The apparatus as set forth in claim 4, wherein said state detecting means detects one of non-installed state, fault state, and improperly installed state of said line terminating means, and wherein said synchronization message processing means does not select the clock reference corresponding to the synchronization message detected by said synchronization message detecting means through said line terminating means when said state detecting means has detected at least one of the non-installed state, the fault state, and the improperly installed state of said line terminating means.

6. An apparatus, disposed in a transmission unit that composes a network, for selecting one of a plurality of clock references received by the transmission unit as an active reference for controlling the transmission unit or as an active reference for supplying a timing to an external unit connected to the transmission unit corresponding to a quality level of each of the clock references sent with a corresponding synchronization message, comprising:

line terminating means for terminating a line;

synchronization message detecting means for detecting the synchronization message from a line signal received from the line by said line terminating means;

synchronization message processing means for controlling whether or not to select a clock reference received from the line corresponding to the quality level represented by the synchronization message detected by said synchronization message detecting means; and service state designating means for designating a service state of said line terminating means, wherein said synchronization message processing means does not select the clock reference corresponding to the synchronization message detected by said synchronization message detecting means through said line terminating means as the active reference when said service state designating means has designated said line terminating means to be in an out-of-service state.

7. An apparatus, disposed in a transmission unit that composes a network, for selecting one of a plurality of clock references received by the transmission unit as an active reference for controlling the transmission unit or as an active reference for supplying a timing to an external unit connected to the transmission unit corresponding to a quality level of each of the clock references sent with a corresponding synchronization message, comprising:

line terminating means for terminating a line;

synchronization message detecting means for detecting the synchronization message from a line signal received from the line by said line terminating means;

synchronization message processing means for controlling whether or not to select a clock reference received from the line corresponding to the quality level represented by the synchronization message detected by said synchronization message detecting means; and service state designating means for designating a service state of the line, wherein said synchronization message processing means does not select the clock reference corresponding to the synchronization message detected by said synchronization message detecting means through the line and said line terminating means as the active reference when said service state designating means has designated the line to the out-of-service state.

8. An apparatus, disposed in a transmission unit that composes a network, for selecting one of a plurality of clock references received by the transmission unit as an active reference for controlling the transmission unit or as an active reference for supplying a timing to an external unit connected to the transmission unit corresponding to a quality level of each of the clock references sent with a corresponding synchronization message, comprising:

line terminating means for terminating a line;

synchronization message detecting means for detecting the synchronization message from a line signal received from the line by said line terminating means;

synchronization message processing means for controlling whether or not to select a clock reference received from the line corresponding to the quality level of the clock reference sent with the synchronization message detected by said synchronization message detecting means; and synchronization message comparing means for comparing the quality level of the clock reference sent with the synchronization message detected by said synchronization message detecting means with the accuracy of an internal clock of a local transmission unit and outputting an alarm to a maintenance terminal connected to the local transmission unit when the quality level of the clock reference sent with the synchronization message is lower than the accuracy of the internal clock, wherein said synchronization message processing means does not select the clock reference corresponding to the synchronization message detected by said synchronization message detecting means as the active reference when said synchronization message comparing means has detected that the quality level of the clock reference sent with the synchronization message detected by said synchronization message detecting means is lower than the accuracy of the internal clock of the local transmission unit.

9. A method, used for making a network synchronized by using a synchronization message in a received signal, for selecting one of a plurality of clock references received by a transmission unit that composes said network as an active reference for controlling the transmission unit or as an active reference for supplying a timing to an external unit connected to the transmission unit corresponding to a quality level of each of the clock references sent with a corresponding synchronization message, comprising the steps of:

detecting the synchronization message from the received signal;

controlling whether or not to select a clock reference received corresponding to the quality level of the synchronization message as the active reference;

judging a detecting state of the synchronization message; and stopping a clock reference selection corresponding to the synchronization message as the active reference when it has been judged that said detecting state of the synchronization message is not in a normal state or is in an out-of-service state by designating the clock reference to a fault state or designating the synchronization message corresponding to the clock reference to a don't use for synchronization state, forcedly.

10. An apparatus, disposed in a transmission unit that composes a network, for selecting one of a plurality of clock references received by the transmission unit as an active reference for controlling the transmission unit or as an active reference for supplying a timing to an external unit connected to the transmission unit corresponding to a quality level of each of the clock references sent with a corresponding synchronization message, comprising:

a synchronization message detecting unit detecting the synchronization message from a received signal;

a synchronization message processing unit controlling whether or not to select a clock reference received corresponding to the quality level of the synchronization message as the active reference; and a state detecting unit detecting the state of said synchronization message detecting unit, wherein said synchronization message processing unit does not select the clock reference corresponding to the synchronization message detected by said synchronization message detecting unit as the active reference when said state detecting unit has determined that said synchronization message detecting unit is not in a normal state.

11. The apparatus as set forth in claim 10, wherein said state detecting unit detects at least one of non-installed state, fault state, and improperly installed state of said synchronization message detecting unit, and wherein said synchronization message processing unit does not select the clock reference corresponding to the synchronization message detected by said synchronization message detecting unit as the active reference when said state detecting unit has detected one of the non-installed state, the fault state, and the improperly installed state of said synchronization message detecting unit.

12. An apparatus, disposed in a transmission unit that composes a network, for selecting one of a plurality of clock references received by the transmission unit as an active reference for controlling the transmission unit or as an active reference for supplying a timing to an external unit connected to the transmission unit corresponding to a quality level of each of the clock references sent with a corresponding synchronization message, comprising:

a synchronization message detecting unit detecting the synchronization message from a received signal;

a synchronization message processing unit controlling whether or not to select a clock reference received corresponding to the quality level of the synchronization message as the active reference; and a service state designating unit designating a service state of said synchronization message detecting unit, wherein said synchronization message processing unit does not select the clock reference corresponding to the synchronization message detected by said synchronization message detecting unit as the active reference when said service state designating unit has designated said synchronization message detecting unit to be in an out-of-service state.

13. An apparatus, disposed in a transmission unit that composes a network, for selecting one of a plurality of clock references received by the transmission unit as an active reference for controlling the transmission unit or as an active reference for supplying a timing to an external unit connected to the transmission unit corresponding to a quality level of each of the clock references sent with a corresponding synchronization message, comprising:

a line terminating unit terminating a line;

a synchronization message detecting unit detecting the synchronization message from a line signal received from the line by said line terminating unit;

a synchronization message processing unit controlling whether or not to select a clock reference received from the line corresponding to the quality level represented by the synchronization message detected by said synchronization message detecting unit; and a state detecting unit detecting the state of said line terminating unit, wherein said synchronization message processing unit does not select the clock reference corresponding to the synchronization message detected by said synchronization detecting unit through said line terminating unit when said state detecting unit has determined that said line terminating unit is not in a normal state.

14. The apparatus as set forth in claim 13, wherein said state detecting unit detects one of non-installed state, fault state, and improperly installed state of said line terminating unit, and wherein said synchronization message processing unit does not select the clock reference corresponding to the synchronization message detected by said synchronization message detecting unit through said line terminating unit when said state detecting unit has detected at least one of the non-installed state, the fault state, and the improperly installed state of said line terminating unit.

15. An apparatus, disposed in a transmission unit that composes a network, for selecting one of a plurality of clock references received by the transmission unit as an active reference for controlling the transmission unit or as an active reference for supplying a timing to an external unit connected to the transmission unit corresponding to a quality level of each of the clock references sent with a corresponding synchronization message, comprising:

a line terminating unit terminating a line;

a synchronization message detecting unit detecting the synchronization message from a line signal received from the line by said line terminating unit;

a synchronization message processing unit controlling whether or not to select a clock reference received from the line corresponding to the quality level represented by the synchronization message detected by said synchronization message detecting unit; and a service state designating unit designating a service state of said line terminating unit, wherein said synchronization message processing unit does not select the clock reference corresponding to the synchronization message detected by said synchronization message detecting unit through said line terminating unit as the active reference when said service state designating unit has designated said line terminating unit to be in an out-of-service state.

16. An apparatus, disposed in a transmission unit that composes a network, for selecting one of a plurality of clock references received by the transmission unit as an active reference for controlling the transmission unit or as an active reference for supplying a timing to an external unit connected to the transmission unit corresponding to a quality level of each of the clock references sent with a corresponding synchronization message, comprising:

a line terminating unit terminating a line;

a synchronization message detecting unit detecting the synchronization message from a line signal received from the line by said line terminating unit;

a synchronization message processing unit controlling whether or not to select a clock reference received from the line corresponding to the quality level represented by the synchronization message detected by said synchronization message detecting unit; and a service state designating unit designating a service state of the line, wherein said synchronization message processing unit does not select the clock reference corresponding to the synchronization message detected by said synchronization message detecting unit through the line and said line terminating unit as the active reference when said service state designating unit has designated the line to the out-of-service state.

17. An apparatus, disposed in a transmission unit that composes a network, for selecting one of a plurality of clock references received by the transmission unit as an active reference for controlling the transmission unit or as an active reference for supplying a timing to an external unit connected to the transmission unit corresponding to a quality level of each of the clock references sent with a corresponding synchronization message, comprising:

a line terminating unit terminating a line;

a synchronization message detecting unit detecting the synchronization message from a line signal received from the line by said line terminating unit;

a synchronization message processing unit controlling whether or not to select a clock reference received from the line corresponding to the quality level represented by the synchronization message detected by said synchronization message detecting unit; and a synchronization message comparing unit comparing the quality level represented by the synchronization message detected by said synchronization message detecting unit with the accuracy of an internal clock of a local transmission unit and outputting an alarm to a maintenance terminal connected to the local transmission unit when the quality level represented by the synchronization message is lower than the accuracy of the internal clock, wherein said synchronization message processing unit does not select the clock reference corresponding to the synchronization message detected by said synchronization message detecting unit as the active reference when said synchronization message comparing unit has detected that the quality level represented by the synchronization message detected by said synchonization message detecting unit is lower than the accuracy of the internal clock of the local transmission unit.

* * * * *